US007171646B2

(12) United States Patent
Charisius et al.

(10) Patent No.: US 7,171,646 B2
(45) Date of Patent: Jan. 30, 2007

(54) GENERATING SOURCE CODE FOR OBJECT ORIENTED ELEMENTS WITH LANGUAGE NEUTRAL TRANSIENT META MODEL AND CORRELATING DISPLAY OF NAMES, SYMBOLS AND CODE

(75) Inventors: Dietrich Charisius, Stuttgart (DE); Peter Coad, Raleigh, NC (US)

(73) Assignee: Borland Software Corporation, Cupertino, CA (US)

( * ) Notice: Subject to any disclaimer, the term of this patent is extended or adjusted under 35 U.S.C. 154(b) by 882 days.

(21) Appl. No.: 09/839,045

(22) Filed: Apr. 20, 2001

(65) Prior Publication Data

US 2002/0032900 A1    Mar. 14, 2002

Related U.S. Application Data

(63) Continuation-in-part of application No. 09/680,063, filed on Oct. 4, 2000, now Pat. No. 6,851,107.

(60) Provisional application No. 60/199,046, filed on Apr. 21, 2000, provisional application No. 60/157,826, filed on Oct. 5, 1999.

(51) Int. Cl.
*G06F 9/44* (2006.01)
(52) U.S. Cl. ............... 717/100; 717/108; 717/116
(58) Field of Classification Search ............... 717/106, 717/100, 109, 108, 116
See application file for complete search history.

(56) References Cited

U.S. PATENT DOCUMENTS

| 5,581,760 | A | 12/1996 | Atkinson et al. |
|---|---|---|---|
| 5,680,619 | A | 10/1997 | Gudmundson et al. |
| 5,682,536 | A | 10/1997 | Atkinson et al. |
| 5,761,511 | A | 6/1998 | Gibbons et al. |
| 5,924,098 | A | 7/1999 | Kluge |
| 6,018,627 | A * | 1/2000 | Iyengar et al. ............... 717/103 |
| 6,038,393 | A * | 3/2000 | Iyengar et al. ............... 717/104 |
| 6,292,933 | B1 * | 9/2001 | Bahrs et al. ................. 717/107 |
| 6,405,364 | B1 * | 6/2002 | Bowman-Amuah ......... 717/101 |
| 6,550,057 | B1 * | 4/2003 | Bowman-Amuah ......... 717/126 |
| 6,601,233 | B1 * | 7/2003 | Underwood ................. 717/102 |
| 6,785,882 | B1 * | 8/2004 | Goiffon et al. .............. 717/120 |
| 7,072,934 | B2 * | 7/2006 | Helgeson et al. ........... 709/203 |

(Continued)

FOREIGN PATENT DOCUMENTS

EP    1 030 242 A2    8/2000

(Continued)

OTHER PUBLICATIONS

SNAP User's Guide Development Environment, Version 7, Template Software, 1995, pp. 3-1 to 3-30.*

(Continued)

*Primary Examiner*—Todd Ingberg
(74) *Attorney, Agent, or Firm*—MacCord Mason PLLC

(57) ABSTRACT

Methods and systems consistent with the present invention provide an improved software development tool that allows a programmer to develop source code by receiving an indication to form a link, receiving an indication of a first of the plurality of elements, receiving an indication of a second of the plurality of elements, and adding new code to the first element to reflect the link to the second element.

110 Claims, 54 Drawing Sheets

U.S. PATENT DOCUMENTS 7,089,583 B2 * 8/2006 Mehra et al. .................. 726/3

FOREIGN PATENT DOCUMENTS

EP 1 030 252 A1 8/2000

OTHER PUBLICATIONS

SNAP Foundation Template Using the SNAP Development Environment, Template Software 1997, Chapters 1-4.*
Template Software Rolls Out Corporate and Product Growth Strategies at Solutions '97 Conference, PR Newswirte, Apr. 3, 1997, 2 pages.*
Template Software Stregthens Core Product Family With Ease-of-Use and Functional enhancement that Promotes Unparalled Software Reuse, Jun. 23, 1997, PR Newswire, 2 pages.*
James Martin, "Principles of Object-Oriented Analysis and Design," Prentice Hall, Oct. 29, 1992, Chapters 1-22.
M.M. Burnett, et al., "Visual Object-Oriented Programming Concepts and Environments," Manning Publishing, 1994, Chapters 1-12.
Erich Gamma, et al., "Design Patterns Elements of Reusable Object-Oriented Software," Addison-Wesley, 1994, Chapter 1.
Wayne Citrin, et al., "A Formal Definition of Control Semantics in a Completely Visual Language," Sep. 1993, Mac World.
RR Software Inc., "JANUS/ADA 95 Compiler User Manual," Version 5.1 Dec. 1995, pp. 6-1 to 6-48.
F. Penz, "Visual Programming in the ObjectWorld," Journal of Visual Languages and Computing, Mar. 1991, vol. 2, p. 17-41.
L. Vanhelsuwe, "Mastering JAVABEANS," Sybex, Chapter 2.
David Withey McIntrye, "A Visual Method for Generating Iconic Programming Environments," UMI Dissertation Services.
Unified Modeling Language (UML) UML Booch & OMT Quick Reference for Rational Rose 4.0.
Rational Rose Corporation, Rational Rose Release 4.0 (Nov. 1996) "Using Rational Rose 4.0" Chapters 3-11, pp. 11-207.
Object-Oriented Software Engineering, A Use Case Driven Approach 1996 Jacobson, Ivar Part I Chapters 1-5, Part II Chapters 6-12, Part III Chapters 13-16, pp. 1-500.

* cited by examiner

GENERATING SOURCE CODE FOR OBJECT ORIENTED ELEMENTS WITH LANGUAGE NEUTRAL TRANSIENT META MODEL AND CORRELATING DISPLAY OF NAMES, SYMBOLS AND CODE

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, now U.S. Pat. No. 6,851,107 which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements," filed on Oct. 4, 2000;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," and filed on the same date herewith U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,580, entitled "Diagrammatic Control of a Software in a Version Control System," and filed on the same date herewith;

U.S. patent application Ser. No. 09/838,578, entitled "Navigation Links in Generated Documentation," and filed on the same date herewith U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates to a method and system for developing software. More particularly, the invention relates to a method and system for generating source code in an object-oriented element to reflect an added link to another object-oriented element.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language,* Addison-Wesley (1999); (2) Booch, Rumbaugh, and Jacobson, *The Unified Modeling Language User Guide,* Addison-Wesley (1998); (3) Peter Coad, Jeff DeLuca, and Eric Lefebvre, *Java Modeling in Color with UML: Enterprise Components and Process,* Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the portion of the source code 104 that is not protected from being overwritten is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. In addition, the software development tool is designed for use with more than one programming language.

The software development tool also saves a developer time and effort in producing error free code. The software development tool enables the developer to graphically designate a desired link between a source and a destination element in a software project and then automatically adds source code in the respective element to reflect the link. The link can be a generalization link that identifies an inheritance relationship, resulting in the source element (the source of the link) inheriting all the attributes and methods of the destination element (the destination of the link). The link can also be an implementation link that identifies a specification relationship, resulting in the source of the link implementing all the methods contained in an interface, the destination of the link. To ensure error free coding, the software development tool determines whether the desired link adheres to object-oriented programming rules. In addition, the software development tool saves a developer time and effort in correcting the source code. The software development tool allows the developer to selectively replace the source element or the destination element in an existing link with another element to produce a new link. In the process of generating the new link, the software development tool determines whether the new link is permissible before automatically changing the source code of the respective elements to reflect the new link and the removal of the existing link. To further aid a programmer in developing source code for a project, the software development tool allows a developer to graphically designate that source code associated with a source element be nested within the source code of a destination element in the project. Where a source element is already nested within a destination element, the software development tool allows the developer to graphically designate that the first be removed from the destination element. Thus, a developer can efficiently manage and organize software in a project and more easily allow other programmers to access or use the source code associated with the nested elements. Conversely, a developer can effectively remove nested source code when it is determined no longer to be a desirable design.

In accordance with methods consistent with the present invention, a method is provided in a data processing system. The data processing system has a plurality of elements, and each element has corresponding code. The method comprising the steps of receiving a request to form a link, receiving an indication of a first of the plurality of elements, receiving an indication of a second of the plurality of elements, and in response to receiving the request, the indication of the first element, and the indication of the second element, adding new code to the first element to reflect the link to the second element.

In accordance with methods consistent with the present invention, a method is provided in a data processing system. The data processing system has a plurality of elements with a link between two of the plurality of elements. Each element has corresponding code, and the linked elements include a source and a destination. The method comprising the steps of receiving a selection of one of the linked elements, receiving an identification of another of the plurality of elements that is different than the linked elements, determining whether the selected element is the destination, and when it is determined that the selected element is the destination, modifying the corresponding code of the other element to reflect a new link between the other element and the destination element.

In accordance with methods consistent with the present invention, a method is provided in a data processing system. The data processing system has a plurality of elements with a link between two of the plurality of elements. Each element has corresponding code, and the linked elements include a source and a destination. The method comprising the steps of receiving an identification of the link, receiving a selection of one of the linked elements, receiving an identification of another of the plurality of elements that is different than the linked elements, determining whether the selected element is the source, and when it is determined that the selected element is the source, modifying the corresponding code of the source to reflect a new link between the source and the other element.

In accordance with methods consistent with the present invention, a method is provided in a data processing system. The data processing system has a plurality of elements. The method comprising the steps of receiving an identification of a first of the plurality of elements, receiving an identification of a second of the plurality of elements, receiving an indication that the first element is to be included in the second element, determining whether the first element is a class and whether the second element is another class, and when it is determined that the first element is the class and that the second element is the other class, transferring code corresponding to the first element into the second element.

In accordance with methods consistent with the present invention, a method is provided in a data processing system. The data processing system has a plurality of elements. Each element has corresponding code. The code corresponding to a first of the plurality of elements is nested in the code corresponding to a second of the plurality of elements. The method comprising the steps of receiving an indication that the first element is to be removed from the second element, determining whether the first element is a class and whether the second element is another class, and when it is determined that the first element is the class and that the second element is the other class, removing code corresponding to the first element from the second element.

In accordance with articles of manufacture consistent with the present invention, a computer-readable medium is provided. The computer-readable medium contains instructions for controlling a data processing system to perform a method. The data processing system has a plurality of elements, and each element has corresponding code. The method comprising the steps of receiving a request to form a link, receiving an indication of a first of the plurality of elements, receiving an indication of a second of the plurality of elements, and in response to receiving the request, the indication of the first element, and the indication of the second element, adding new code to the first element to reflect the link to the second element.

In accordance with articles of manufacture consistent with the present invention, a computer-readable medium is provided. The computer-readable medium contains instructions for controlling a data processing system to perform a method. The data processing system has a plurality of elements with a link between two of the plurality of elements. Each element has corresponding code, and the linked elements include a source and a destination. The method comprising the steps of receiving a selection of one of the linked elements, receiving an identification of another of the plurality of elements that is different than the linked elements, determining whether the selected element is the destination, and when it is determined that the selected element is the destination, modifying the corresponding code of the other element to reflect a new link between the other element and the destination element.

In accordance with articles of manufacture consistent with the present invention, a computer-readable medium is provided. The computer-readable medium contains instructions for controlling a data processing system to perform a method. The data processing system has a plurality of elements with a link between two of the plurality of elements. Each element has corresponding code, and the linked elements include a source and a destination. The method comprising the steps of receiving an identification of the link, receiving a selection of one of the linked elements, receiving an identification of another of the plurality of elements that is different than the linked elements, determining whether the selected element is the source, and when it is determined that the selected element is the source, modifying the corresponding code of the source to reflect a new link between the source and the other element.

In accordance with articles of manufacture consistent with the present invention, a computer-readable medium is provided. The computer-readable medium contains instructions for controlling a data processing system to perform a method. The data processing system has a plurality of elements. The method comprising the steps of receiving an identification of a first of the plurality of elements, receiving an identification of a second of the plurality of elements, receiving an indication that the first element is to be included in the second element, determining whether the first element is a class and whether the second element is another class, and when it is determined that the first element is the class and that the second element is the other class, transferring code corresponding to the first element into the second element.

In accordance with articles of manufacture consistent with the present invention, a computer-readable medium is provided. The computer-readable medium contains instructions for controlling a data processing system to perform a method. The data processing system has a plurality of elements. Each element has corresponding code. The code corresponding to a first of the plurality of elements is nested in the code corresponding to a second of the plurality of elements. The method comprising the steps of receiving an indication that the first element is to be removed from the second element, determining whether the first element is a class and whether the second element is another class, and when it is determined that the first element is the class and that the second element is the other class, removing code corresponding to the first element from the second element.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
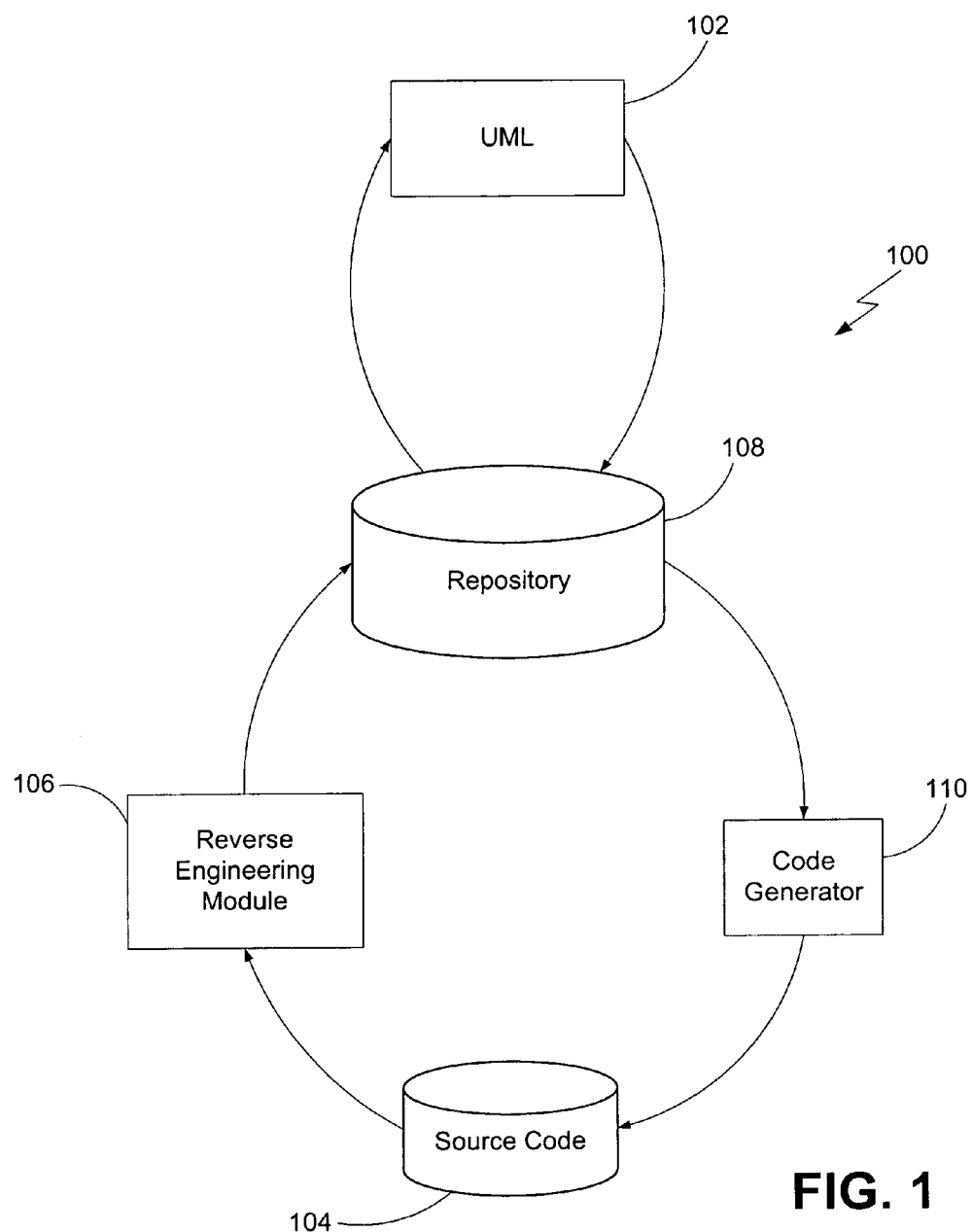
FIG. 1 depicts a conventional software development tool.
Figure 2:
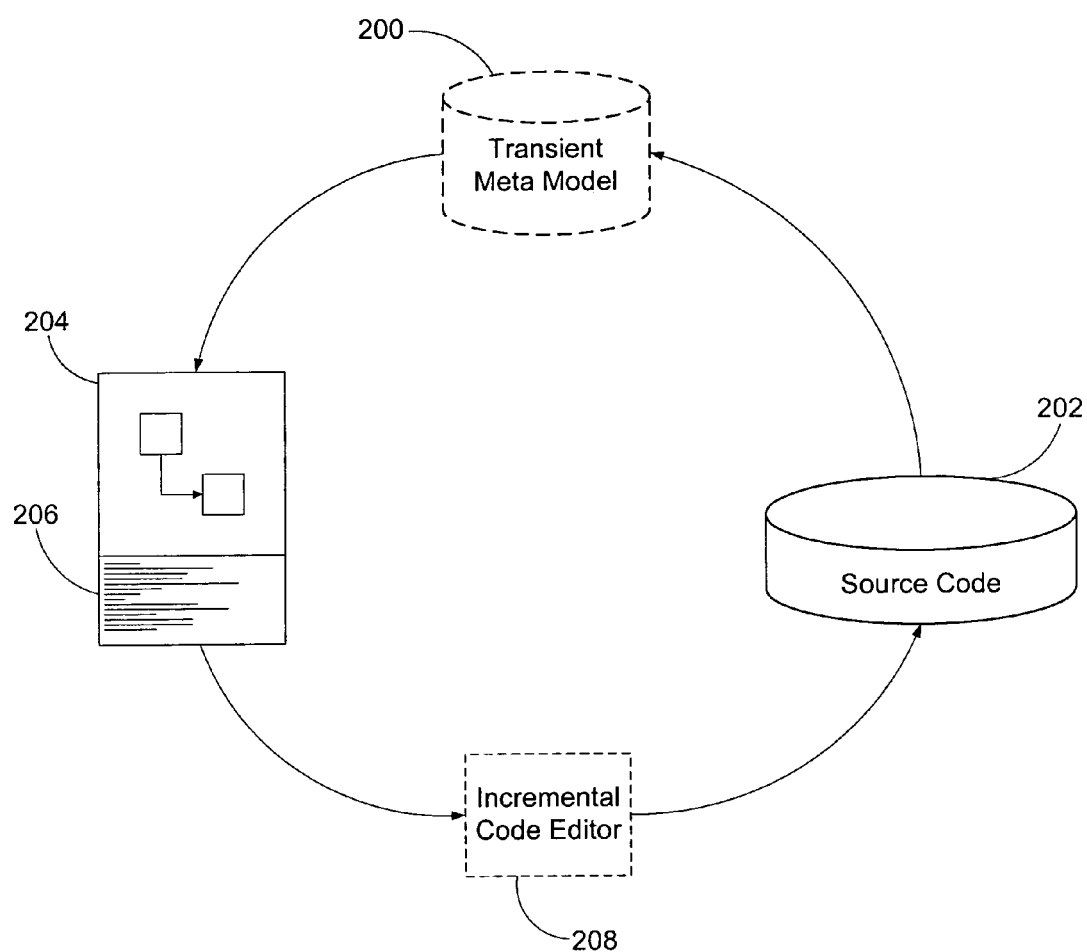
FIG. 2 depicts an overview of a software development tool in accordance with methods and systems consistent with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Alternatively, the textual view 206 of the source code may be obtained directly from the source code file. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
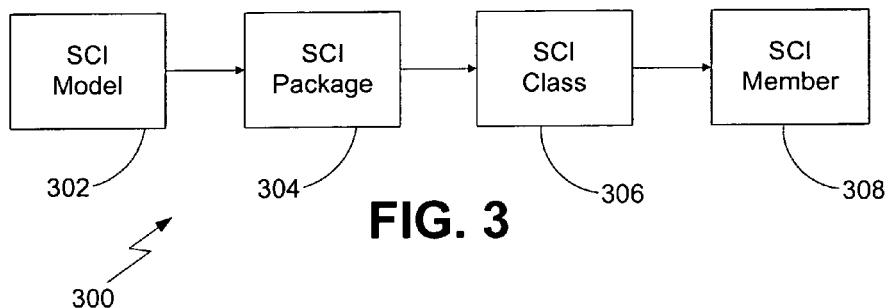
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
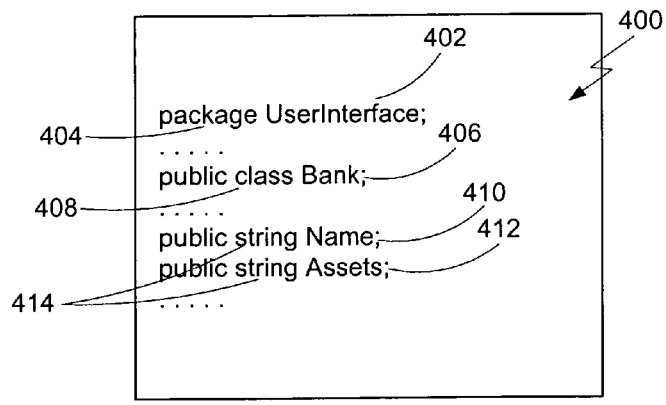
FIG. 4 depicts representative source code.
Figure 5:
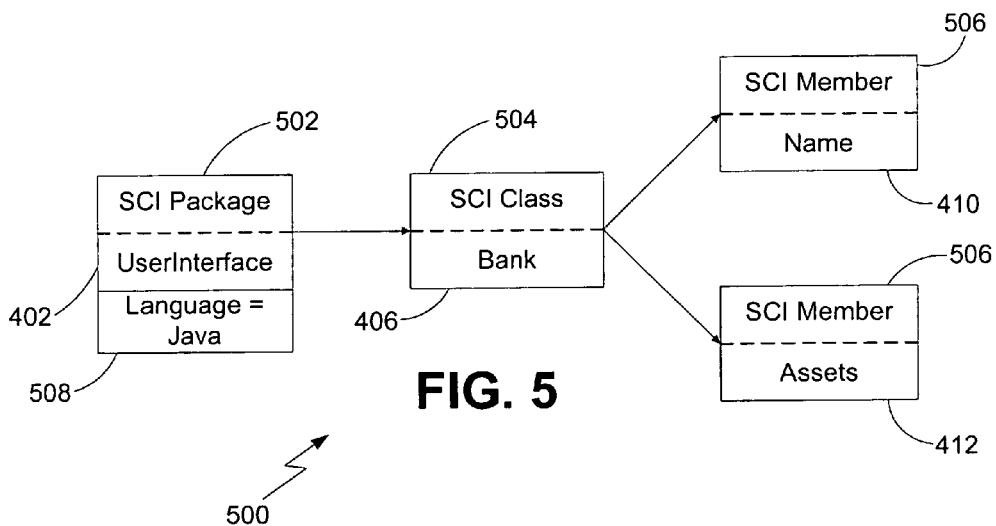
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
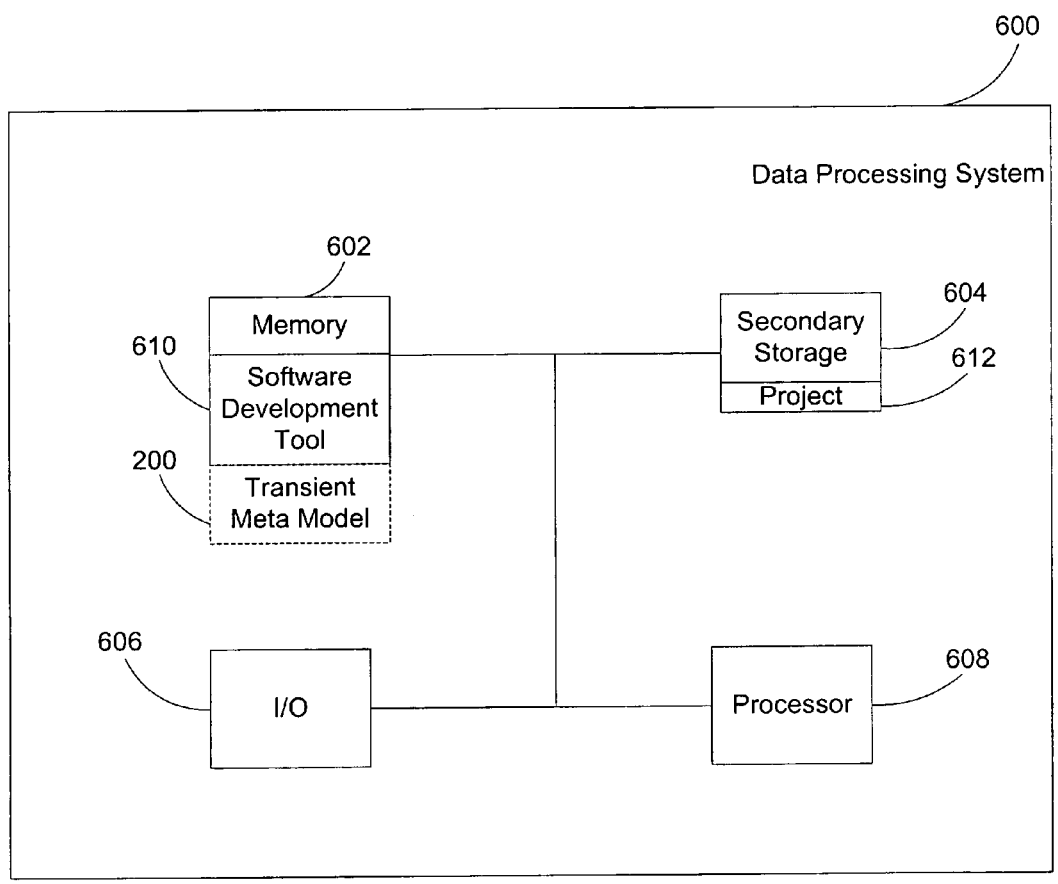
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
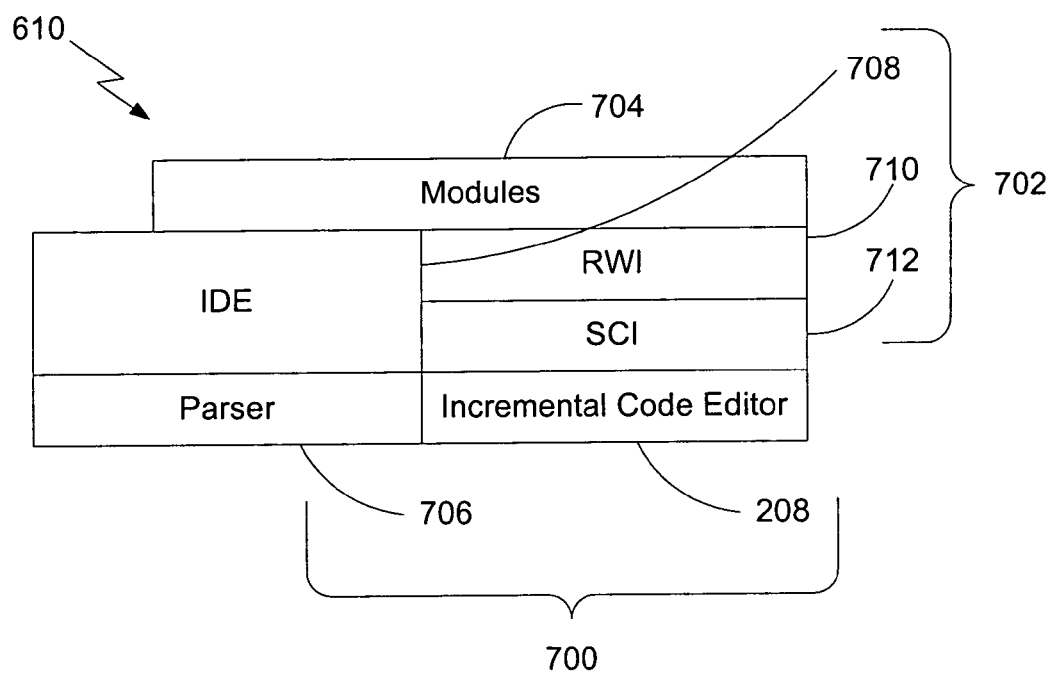
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of classes, interfaces, attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates various complexity metrics, i.e., various measurements of the program's performance or efficiency, to support quality assurance. The types of metrics calculated by the software development tool include basic metrics, cohesion metrics, complexity metrics, coupling metrics, Halstead metrics, inheritance metrics maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 1

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
| --- | --- |
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsula- |

TABLE 4-continued

Coupling Metrics

| Coupling Metrics | Description |
|---|---|
| | tion, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
|---|---|
| Halstead Difficulty | This measure is one of the Halstead Software Science metrics. It is calculated as ('Number of Unique Operators'/'Number of Unique Operands') * ('Number of Operands'/'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
|---|---|
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
|---|---|
| Maximum Number Of Levels | Counts the maximum depth of 'if,' 'for' and 'while' branches in the bodies of methods. Logical units with a large number of nested levels may need implementation simplification and process improvement because groups that contain more than seven seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
|---|---|
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
|---|---|
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
| --- | --- |
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
| --- | --- |
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
| --- | --- |
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
| --- | --- |
| Bad Tag In JavaDoc Comments | This rule verifies code against accidental use of improper JavaDoc tags. |

TABLE 13-continued

Documentation Audits

| Documentation Audits | Description |
|---|---|
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |

TABLE 14-continued

Naming Style Audits

| Naming Style Audits | Description |
|---|---|
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize() Doesn't Call super.finalize() | Calling of super.finalize() from finalize() is good practice of programming, even if the base class doesn't define the finalize() method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
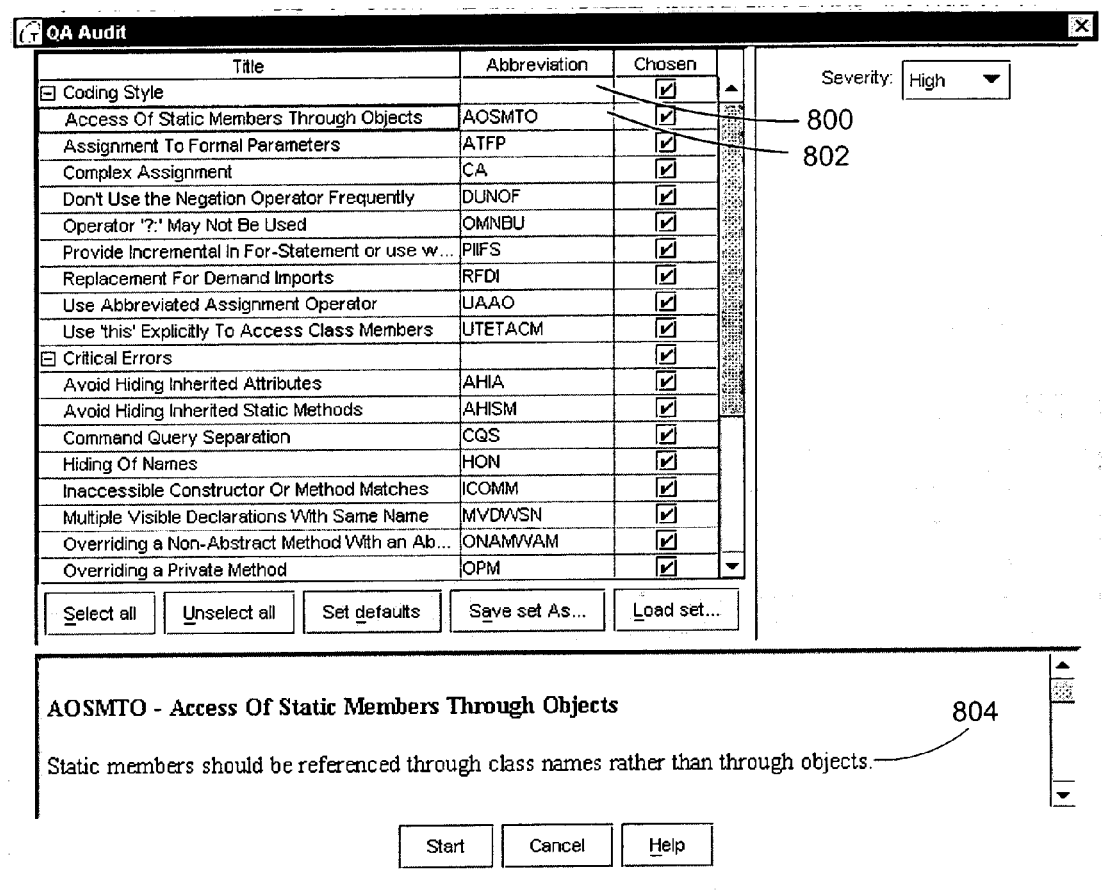
FIG. 8A depicts a user interface displayed by the software development tool depicted in FIG. 2, where the user interface displays a list of predefined criteria which the software development tool checks in the source code.
Figure 8B:
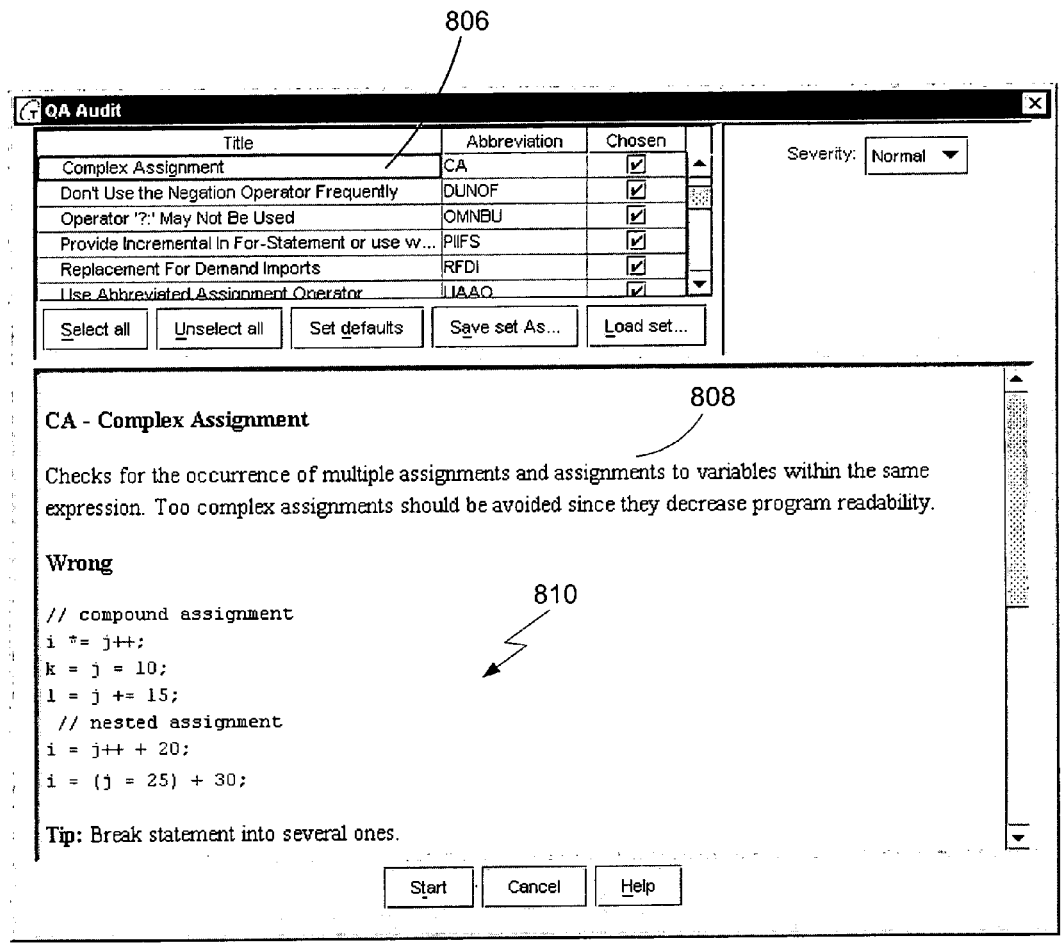
FIG. 8B depicts a user interface displayed by the software development tool depicted in FIG. 2, where the user interface displays the definition of the criteria which the software development tool checks in the source code, and an example of source code which does not conform to the criteria.
Figure 8C:
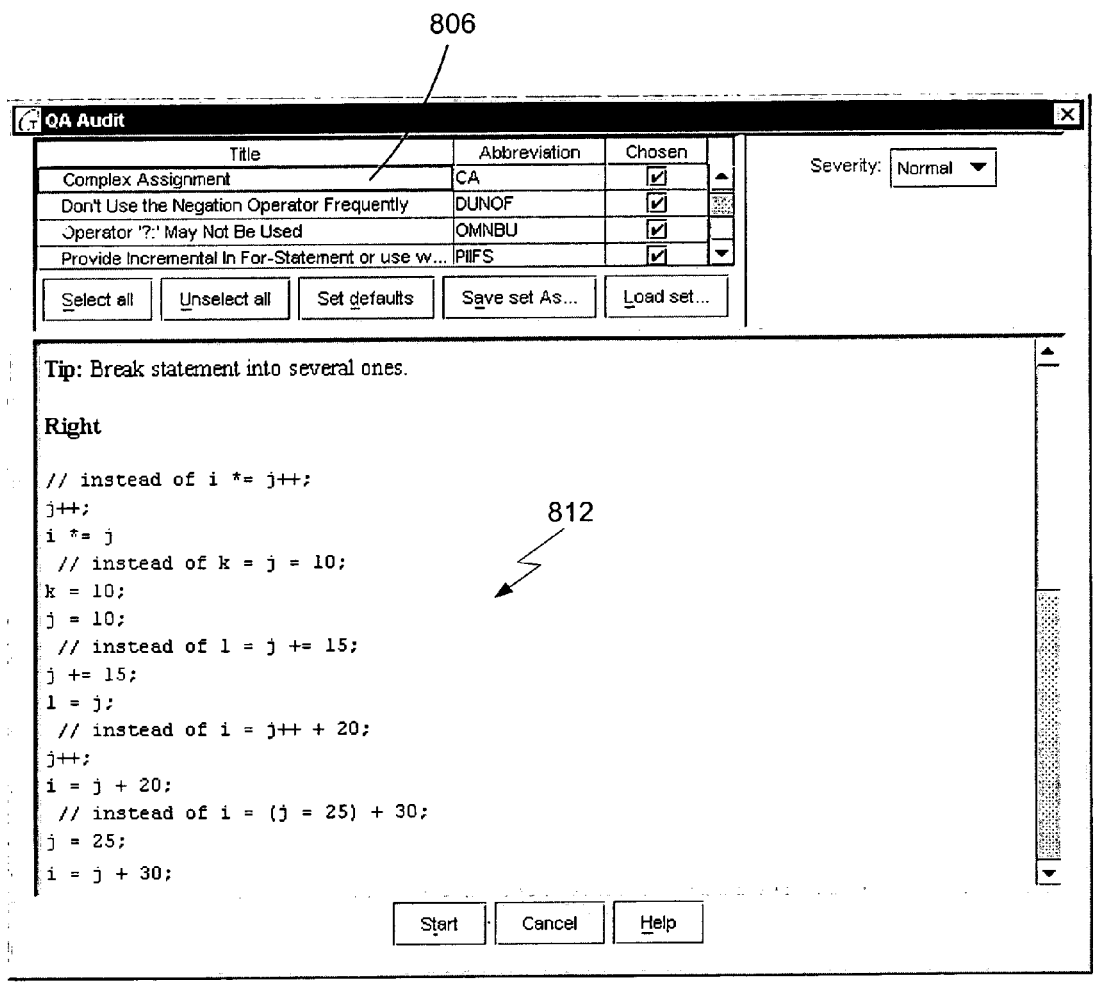
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors and/or other deviations from well known rules, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. As discussed above, in an alternative embodiment, the textual display may be obtained directly from the source code file. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received by the software development tool via the programmer editing the source code in the textual pane or the graphical pane, or via some other independent software tool that the programmer uses to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
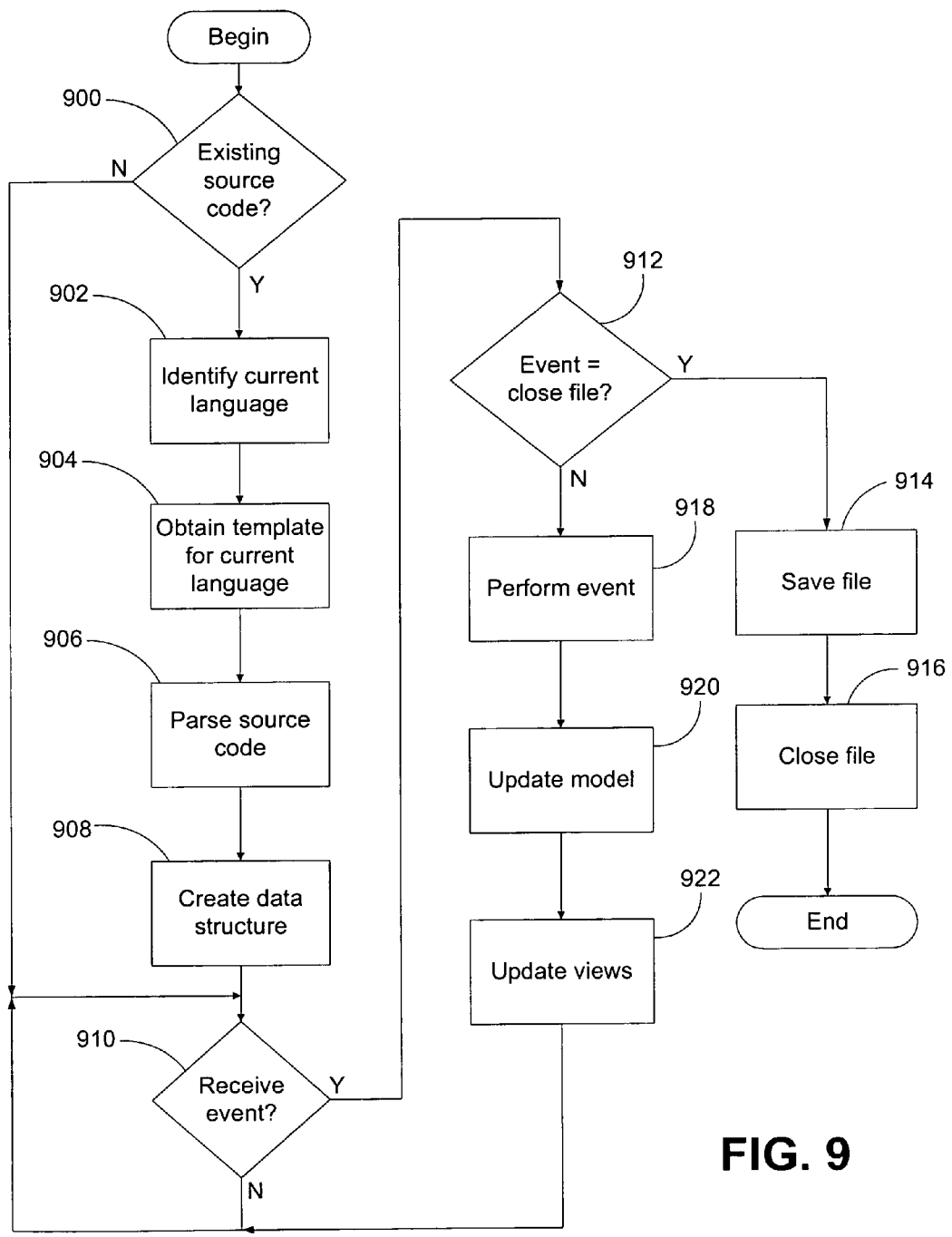
FIG. 9 depicts a flow diagram of the steps performed by the software development tool depicted in FIG. 2.

FIG. 9 depicts a flow diagram of the steps performed by the software development tool to develop a project in accordance with methods consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., "java" identifies source code written in the Java™ language, while ".cpp" identifies source code written in C++. The software development tool then obtains a template for the current programming language, i.e., a collection of generalized definitions for the particular language that can be used to build the data structure (step 904). For example, the templates used to define a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
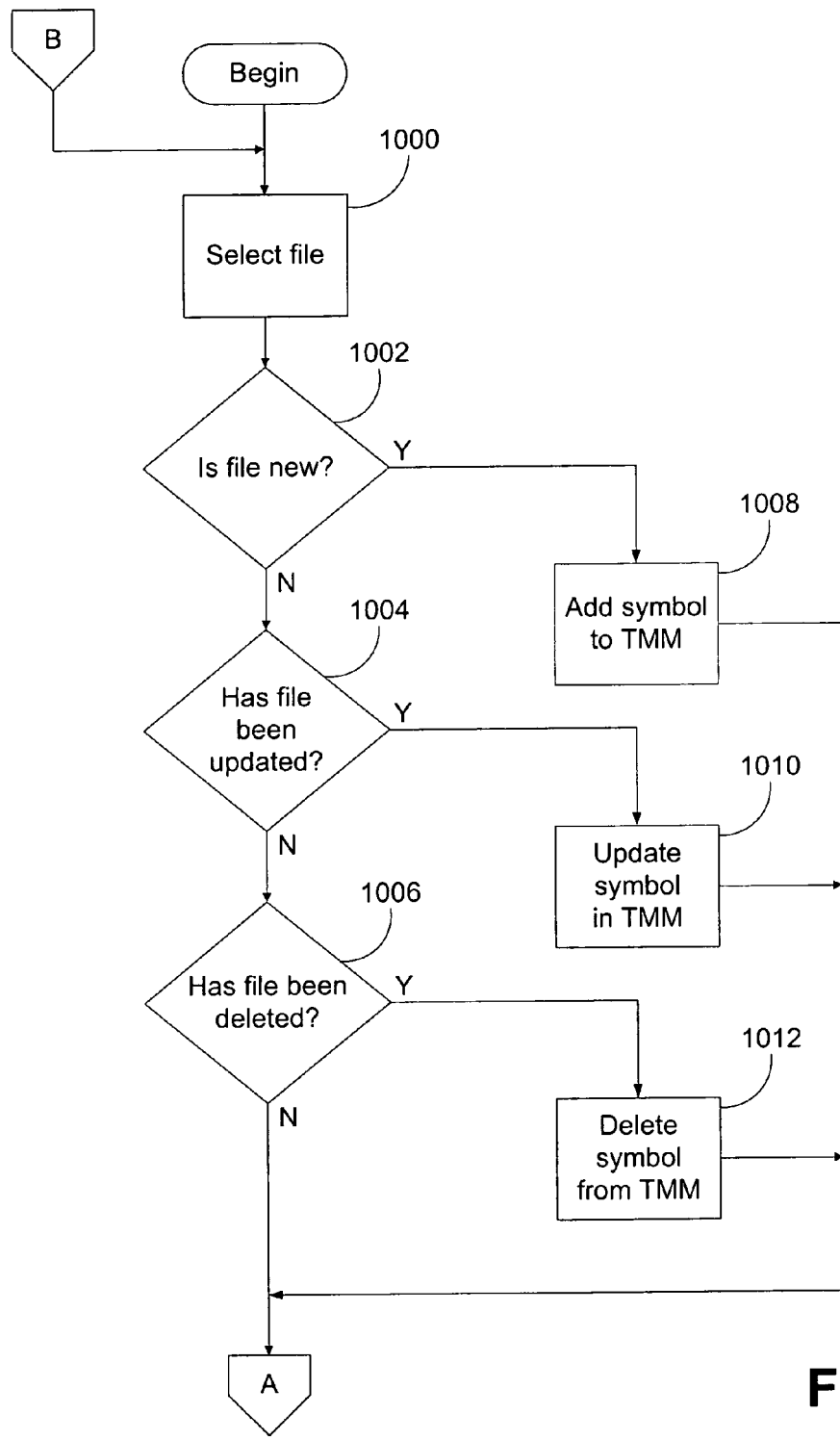
FIGS. 10A and 10B depict a flow diagram illustrating the update model step of FIG. 9.
Figure 10B:
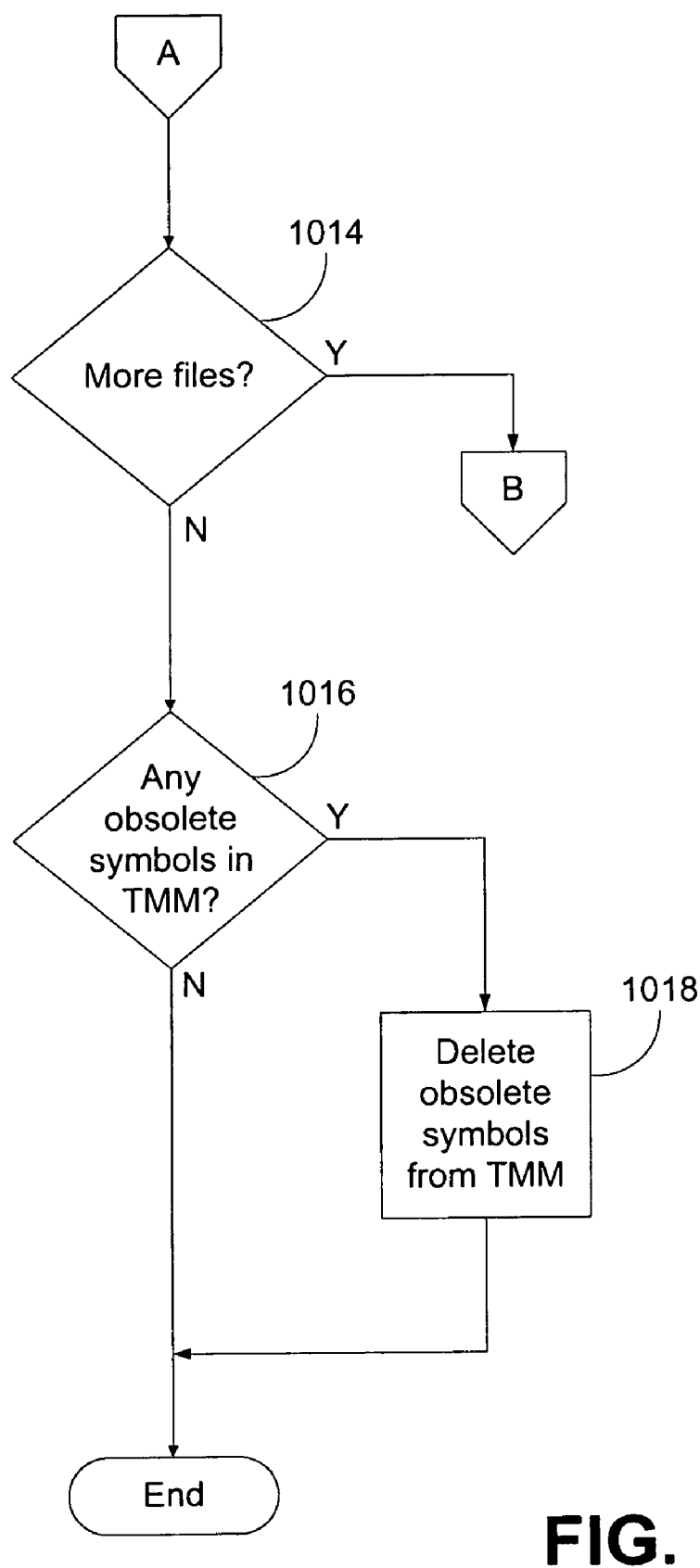

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
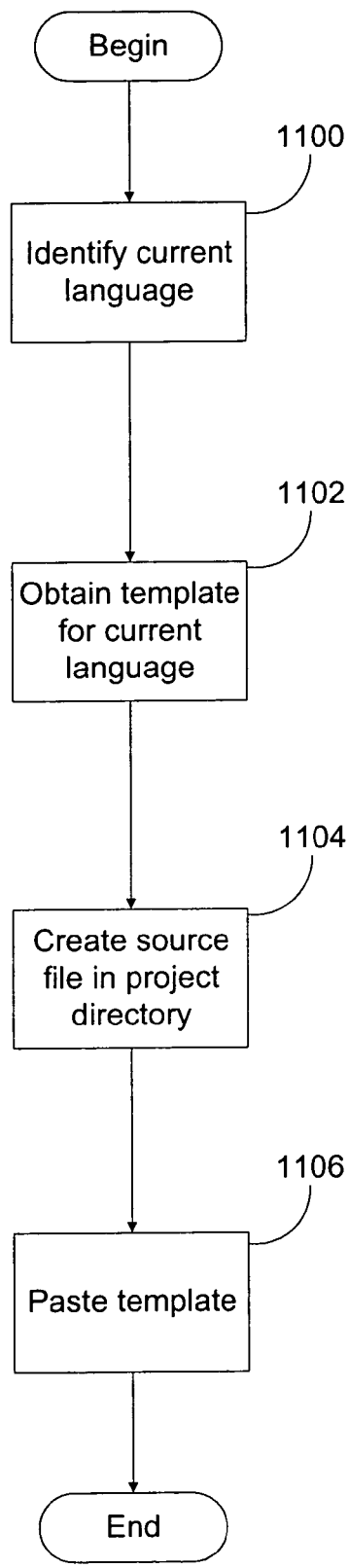
FIG. 11 depicts a flow diagram of the steps performed by the software development tool in FIG. 2 when creating a class.

FIG. 11 depicts a flow diagram illustrating the performance of an event, specifically the creation of a class, in accordance with methods consistent with the present invention. After identifying the programming language (step 1100), the software development tool obtains a template for the language (step 1102), creates a source code file in the project directory (step 1104), and pastes the template into the file (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
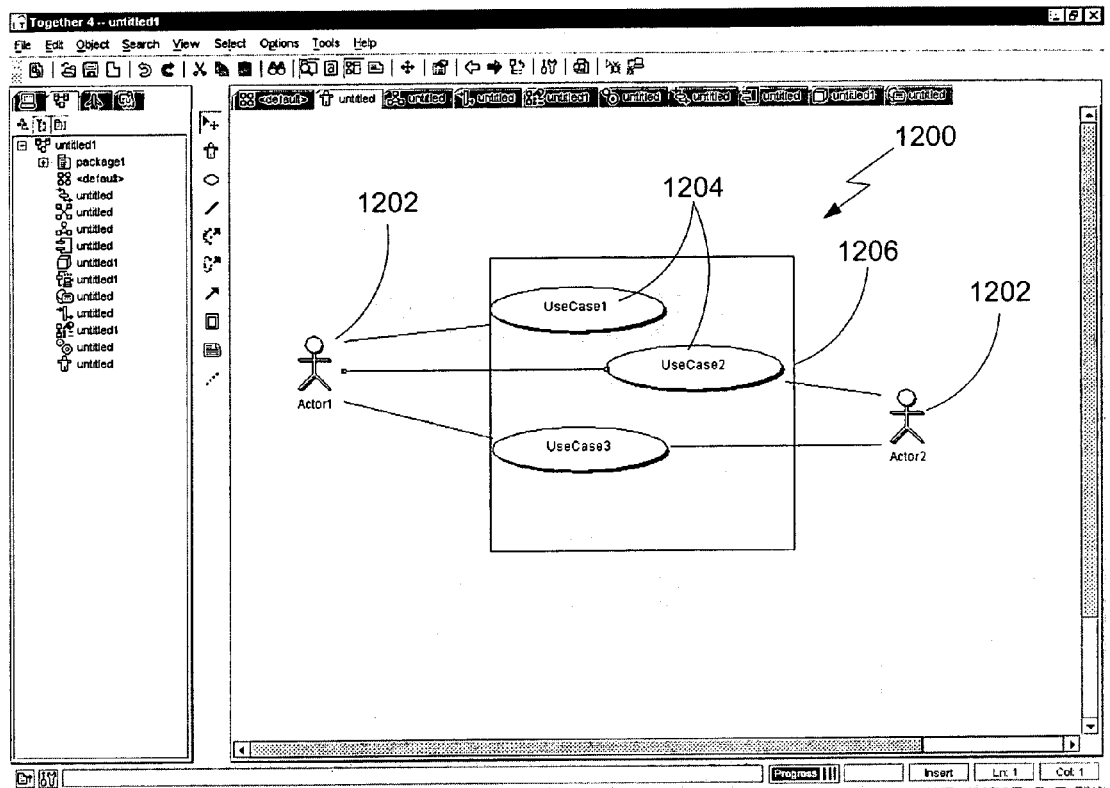
FIG. 12 depicts a user interface displayed by the software development tool depicted in FIG. 2, where the user interface displays a use case diagram of source code.
Figure 13:
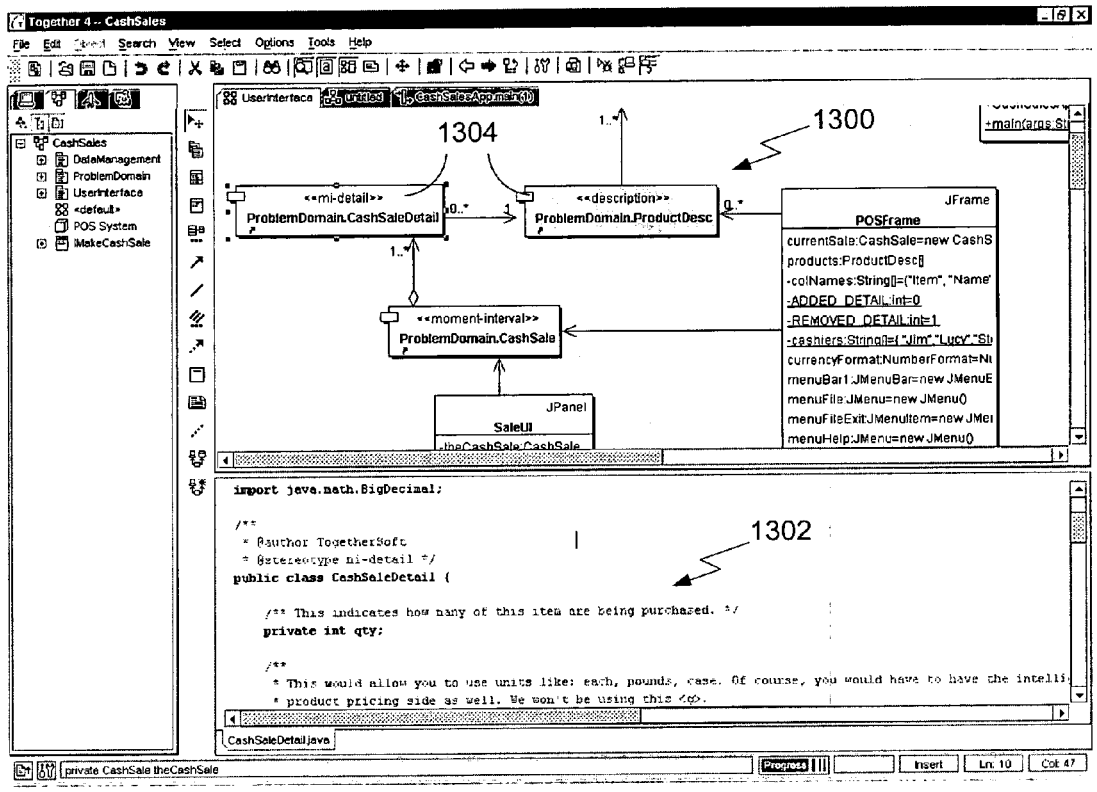
FIG. 13 depicts a user interface displayed by the software development tool depicted in FIG. 2, where the user interface displays both a class diagram and a textual view of source code.

Applications to be developed using the software development tool are collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
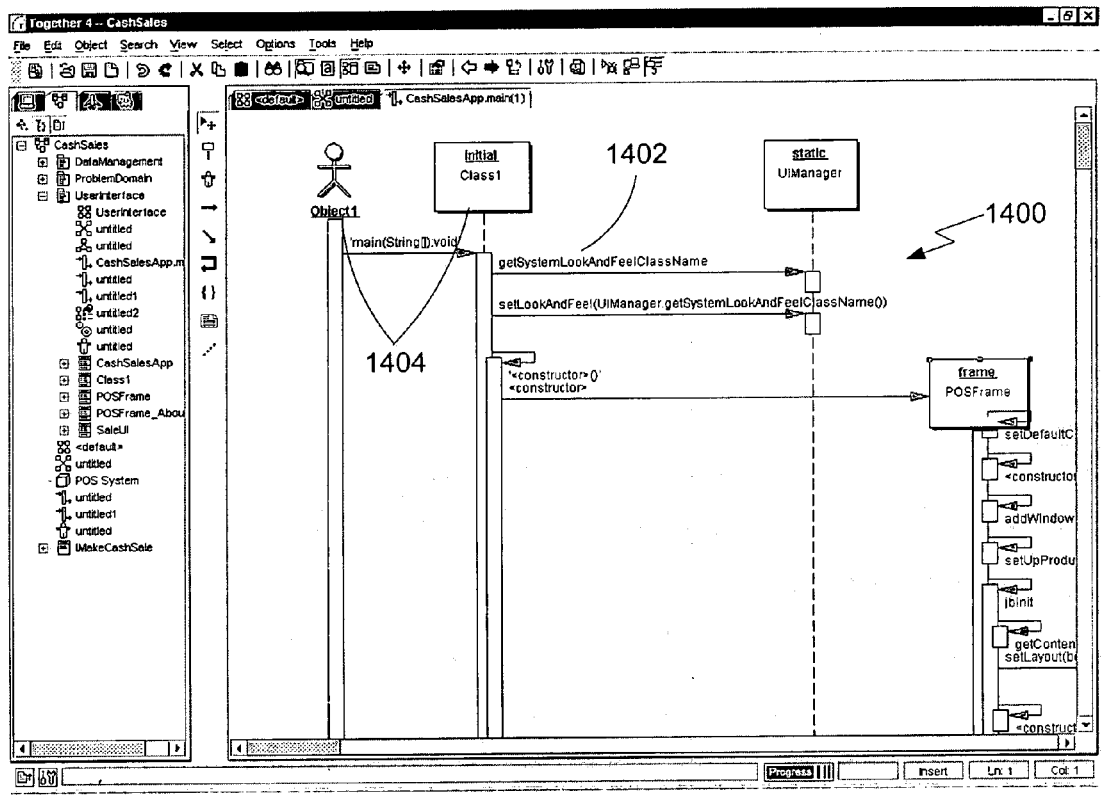
FIG. 14 depicts a user interface displayed by the software development tool depicted in FIG. 2, where the user interface displays a sequence diagram of source code.
Figure 15:
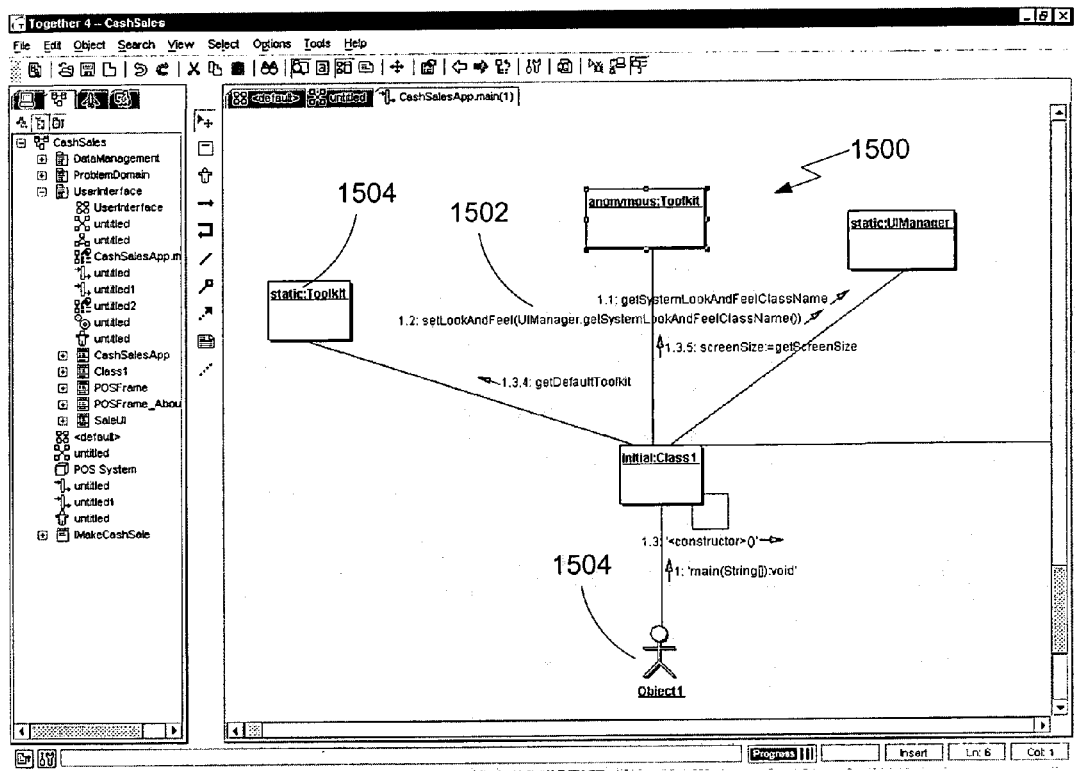
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
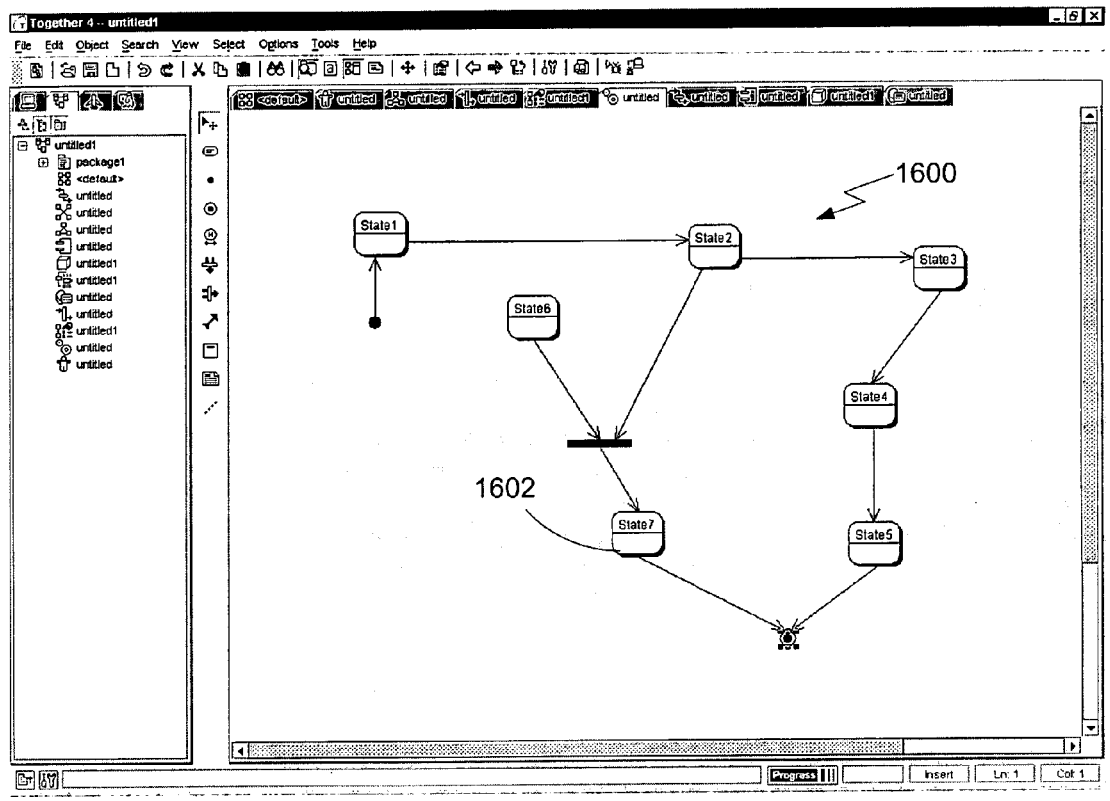
FIG. 16 depicts a user interface displayed by the software development tool depicted in FIG. 2, where the user interface displays a state chart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
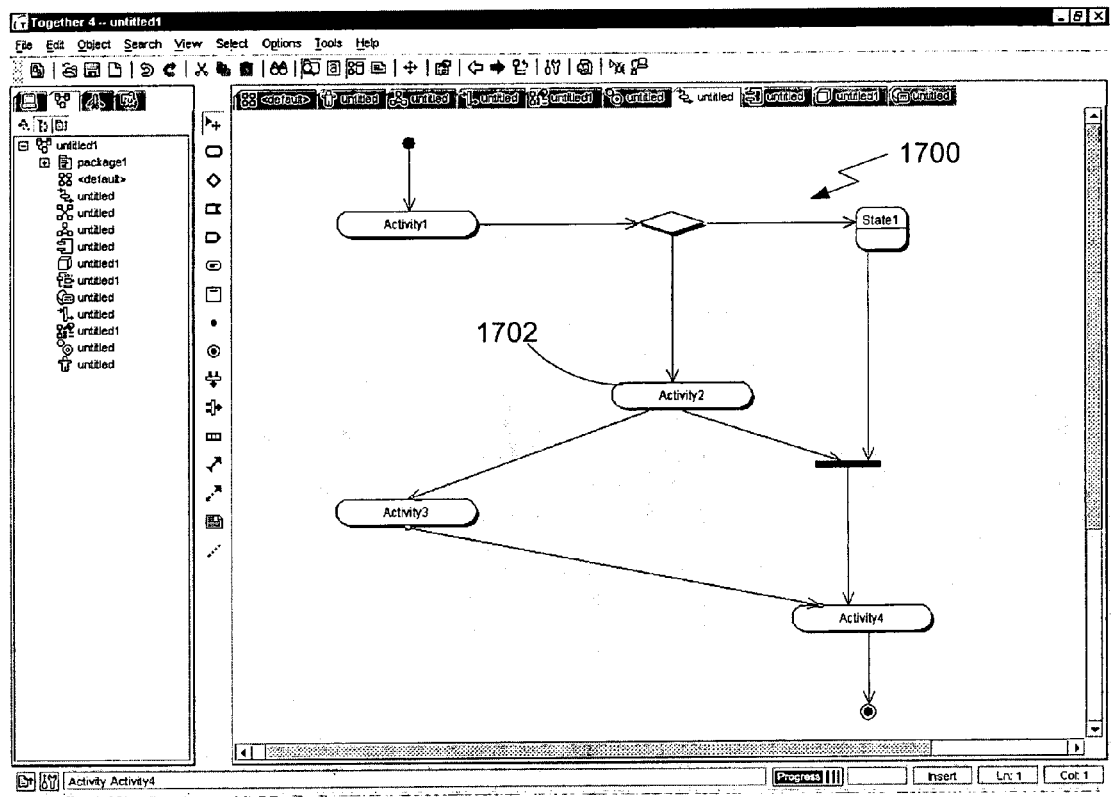
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
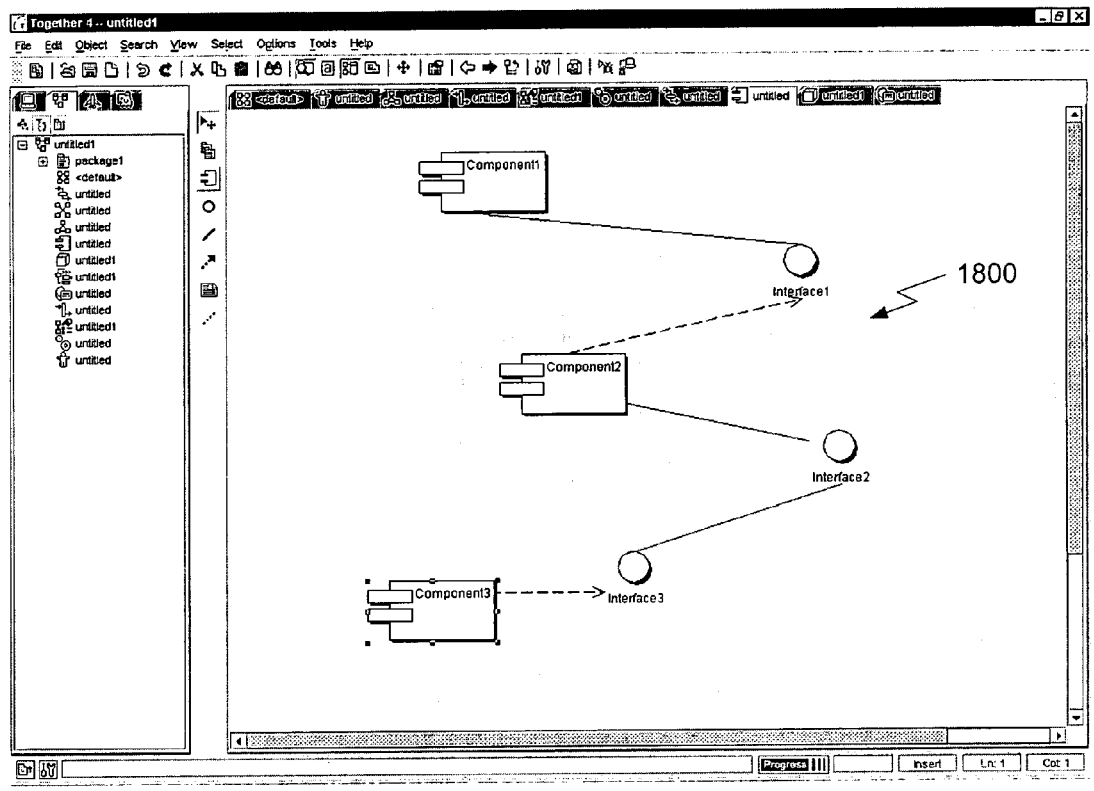
FIG. 18 depicts a user interface displayed by the software development tool depicted in FIG. 2, where the user interface displays a component diagram of source code.
Figure 19:
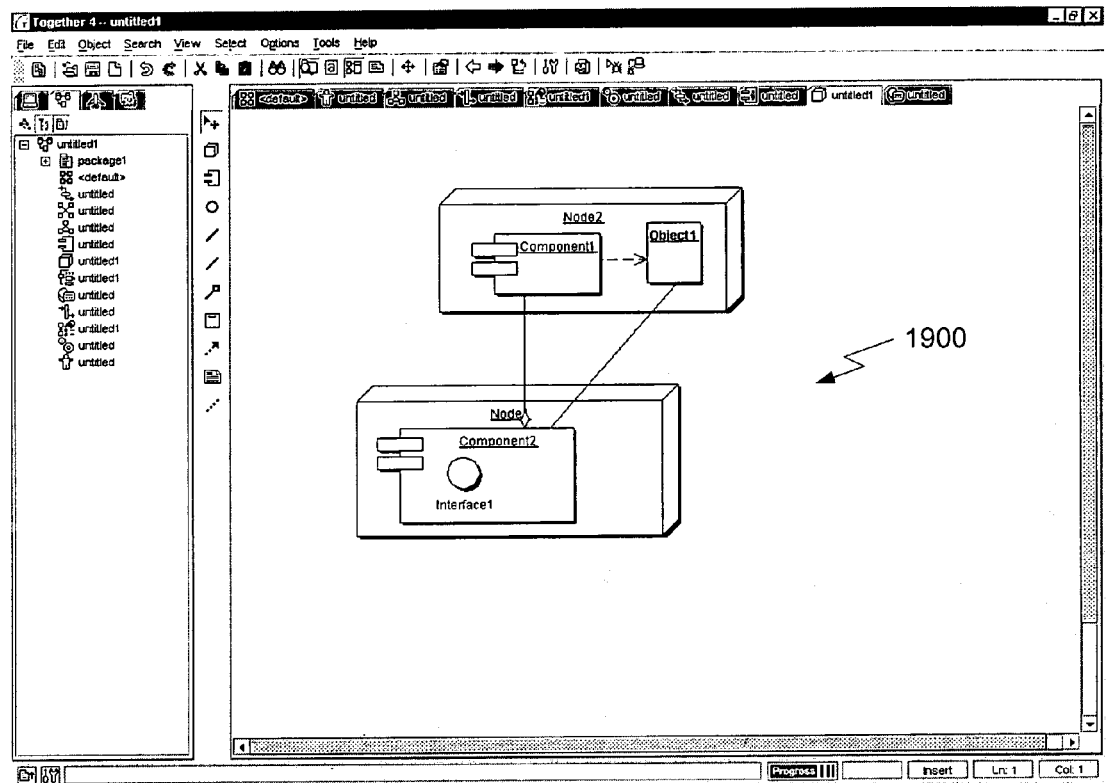
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Adding or Modifying a Link Between Two Elements and Nesting Two Elements

In addition to the functionality described above, the software development tool saves significant programming development time by allowing a programmer to manipulate a diagram so as to form a link (e.g., generalization or implementation link) between two elements, and to automatically generate the source code to reflect the link. An element may be a class, or an interface. As known to one skilled in the art, a generalization link corresponds to an inheritance relationship between the source and destination of the link, where the link source inherits all the attributes and methods of the link destination. An implementation link corresponds to a specification relationship between the source and the destination elements, where the link source implements all the methods contained in an interface of the link destination. When a link is already formed, the software development tool saves programming time by allowing a programmer to manipulate a graphical representation of the link on a diagram so as to form a new link between one of the two linked elements and a selected different element, and to automatically generate the source code to reflect the new link. Finally, the software development tool frees a programmer from typing code by allowing the programmer to manipulate a diagram to nest the source code of one element within the source code of another element. In addition, when creating a link, removing a link in lieu of a new link, or nesting one element within another element, the software development tool enforces object-oriented programming rules, thus assisting a programmer in producing error free code. Exemplary object-oriented programming rules for inheritance or implementation links are described in Stephen Gilbert & Bill McCarthy, *Object-Oriented Design In Java*, Waite Group Press (1998), which is incorporated herein by reference.

Figure 20:
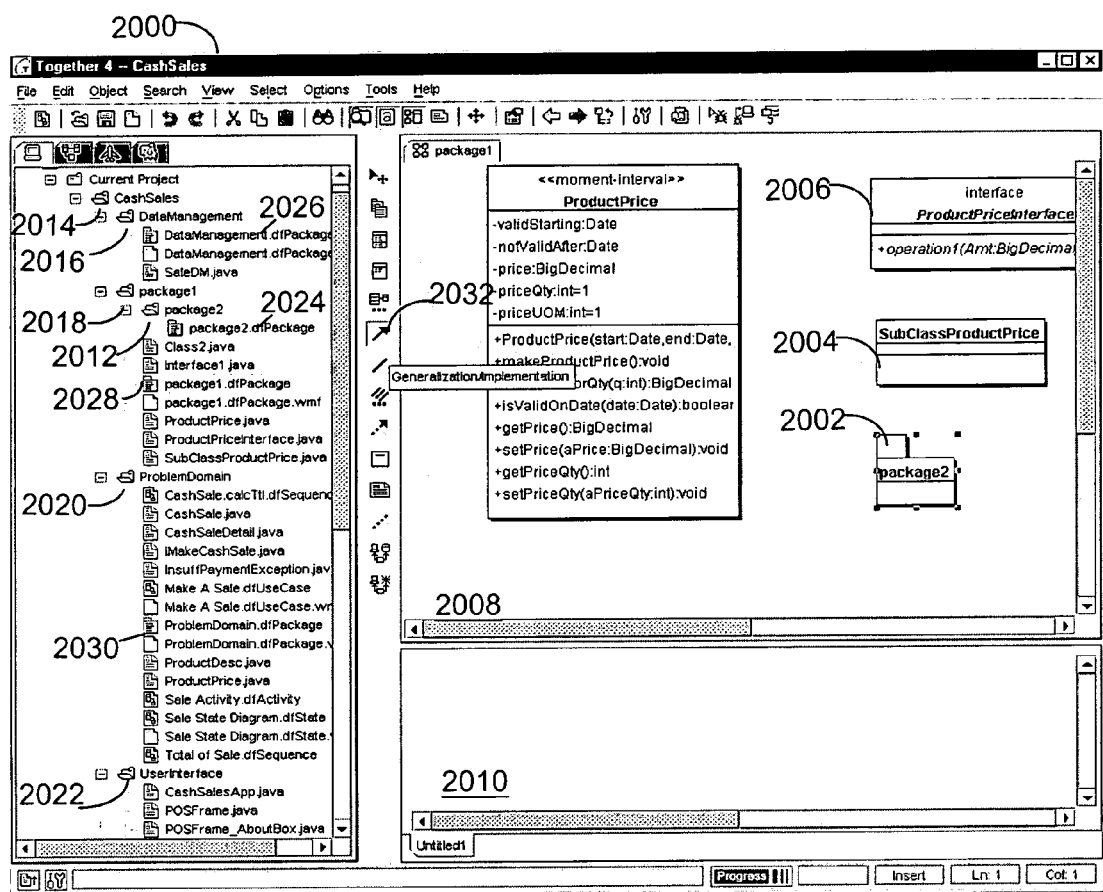
FIG. 20 depicts an exemplary user interface displayed by the software development tool depicted in FIG. 2 for initiating the generation of a link between a source element and a destination element.

As shown in FIG. 20, the source and the destination element may be any object-oriented component that the software development tool 610 may display in graphical pane 2008 or textual pane 2010 to model a project and which a programmer can select via a mouse click, a predefined keyboard input, or by using some other known input device. For example, the source and destination element may be selected from among a package (graphically depicted as package diagram 2002), a class (graphically depicted as a class diagram 2004), or an interface (graphically depicted as an interface diagram 2006). The software development tool, however, enforces known object-oriented programming rules that dictate that only a class or an interface may have a generalization link or an implementation link. In addition, class 2004 and interface 2006 have associated source code stored in a respective file, but package 2002 does not. As shown in FIG. 20, although package 2002 can be displayed in graphical form 2008, package 2002 does not have associated source code to be displayed in textual form 2010. The package 2002 identifies a directory 2012 of a project 2014 that contains related classes and interfaces that can be used by an unrelated class when the unrelated class imports the package 2002 into a source code file associated with the unrelated class.

Figure 21:
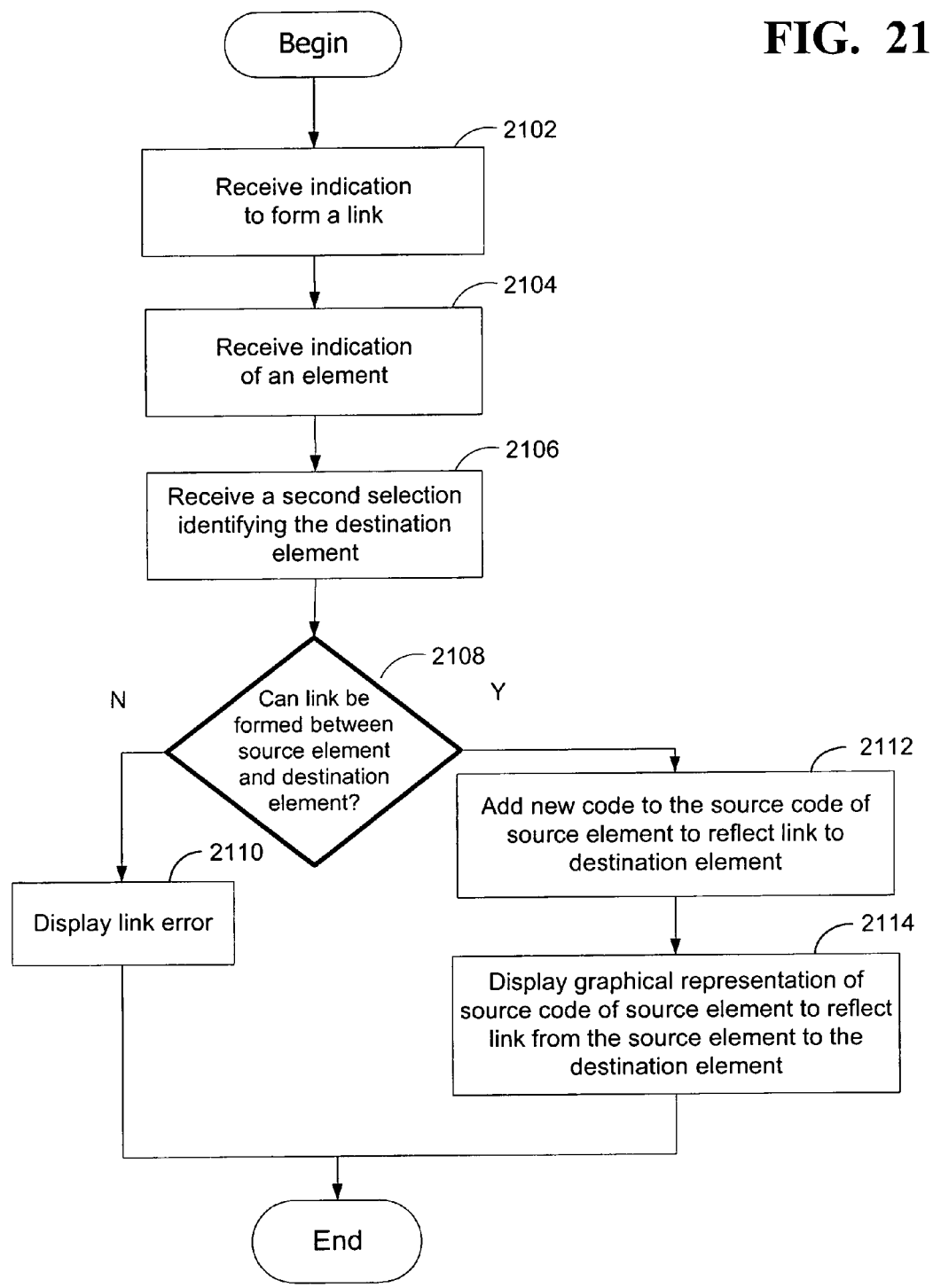
FIG. 21 depicts a flow diagram illustrating an exemplary process performed by the software development tool in FIG. 2 to add a link in source code of a source element, when it is determined that the source element is capable of being linked to a destination element.

FIG. 21 depicts a flow diagram illustrating an exemplary process performed by the software development tool to add a link in source code of a source element, when it is determined that the source element is capable of being linked to a destination element. To add a link, such as a generalization link or an implementation link, in the source code of the source element, the software development tool receives an indication or request from a user or a programmer to generate a link between a source element and a destination element (step 2102). In one implementation, the software development tool may receive the indication to generate a link based on the actuation of a button 2032 on an exemplary user interface 2000. One skilled in the art will appreciate that any known programming technique for inputting data may be used to convey the same information to the software development tool.

The software development tool receives an indication identifying the source element (step 2104). The software development tool also received an indication identifying the destination element (step 2106). The software development tool may receive the indication identifying the source element via a programmer using any known data input technique associated with I/O device 606, such as a mouse click while the cursor is over a first diagram (e.g., class 2004) associated with the source element. The software development tool may receive the indication identifying the destination element in a similar manner. Note that for each package 2012, 2016, 2018, 2020, and 2022 in the project 2014, the software development tool stores in a respective graphical view file 2024, 2026, 2028, and 2030 (file for 2022 is not shown) the name and display coordinates of each symbol, such as a class 2004 or a link to a class (not shown), that is displayed in the graphical pane 2008. When the project is opened, the software development tool reads the graphical view file into the TMM 200 which correlates the names and display coordinates of each symbol of the respective source code file in the project as discussed in reference to FIGS. 10A and 10B, above. Thus, the software development tool may invoke the TMM 200 to identify the source element and the destination element based on display coordinates received in conjunction with the first selection and the second selection, respectively.

Figure 22:
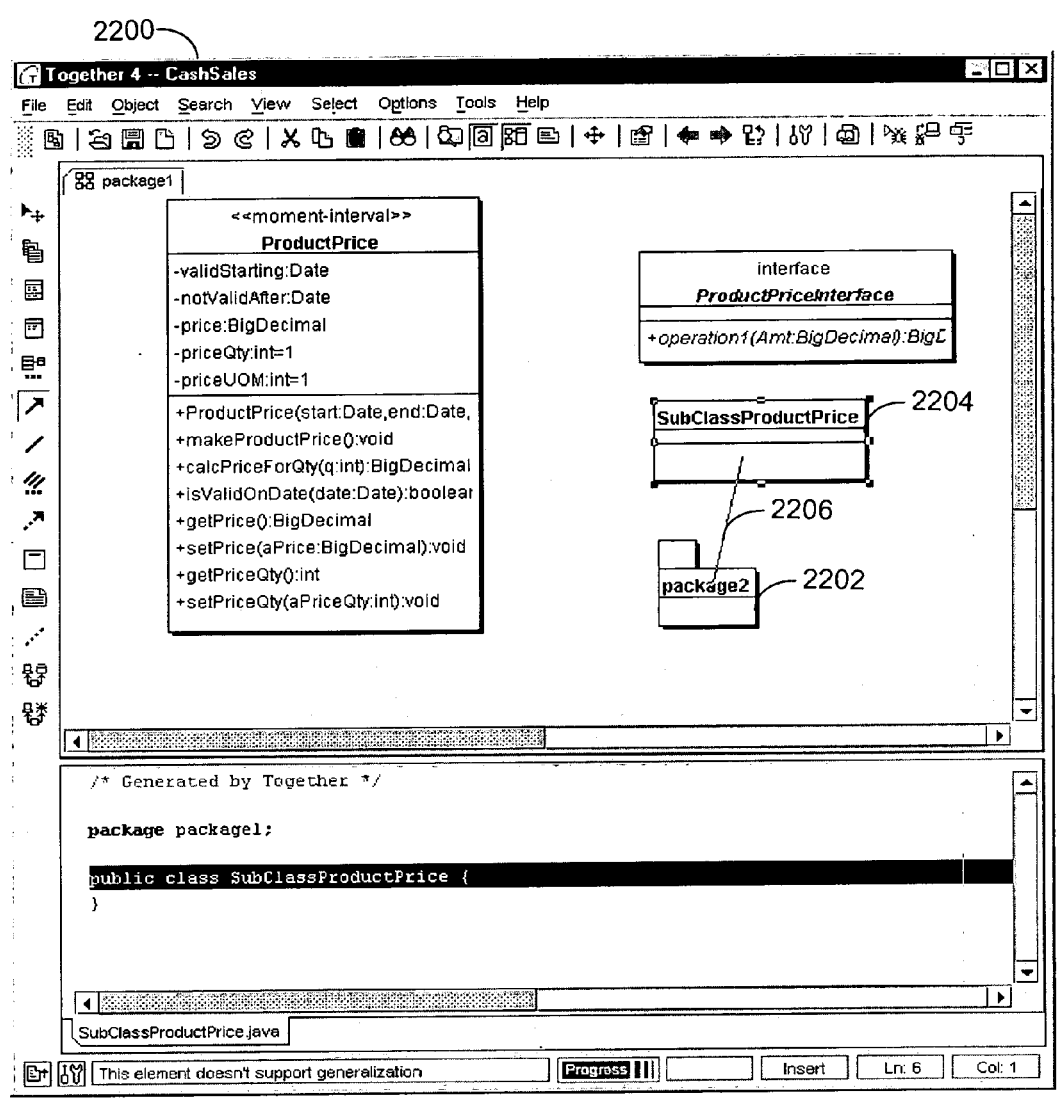
FIG. 22 depicts an exemplary user interface displayed by the software development tool depicted in FIG. 2, where the user interface displays a package as the source element selected and a class as the destination element selected.

FIG. 22 depicts an exemplary user interface 2200 displayed by the software development tool in response to receiving an indication identifying the source element as a package 2202 and an indication identifying the destination element as a class 2204. The software development tool displays a graphical reference line 2206 to visually identify the source and destination elements that have been selected for a link.

In one embodiment, the software development tool allows the user to split the textual pane 2010 into two windows to separately display source code associated with a source element and source code associated with a destination element. In this implementation, the user may select one of two windows as the first selection using I/O device 606. The software development tool then automatically determines that the source code displayed in the unselected window is the second selection.

Figure 23:
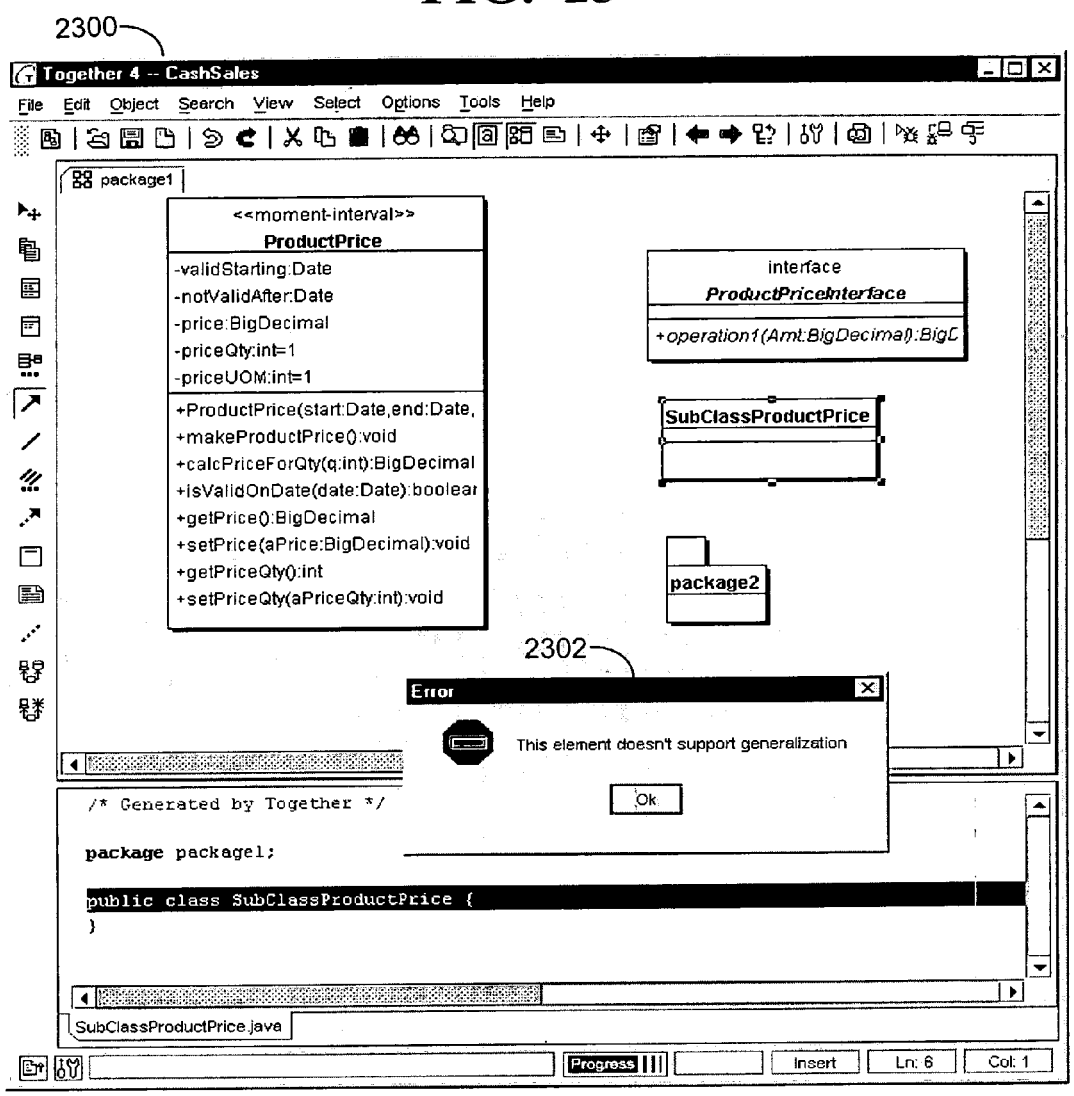
FIG. 23 depicts an exemplary user interface showing a link error generated by the software development tool depicted in FIG. 2 in response to a determination that the source element cannot be linked to the destination element.
Figure 24:
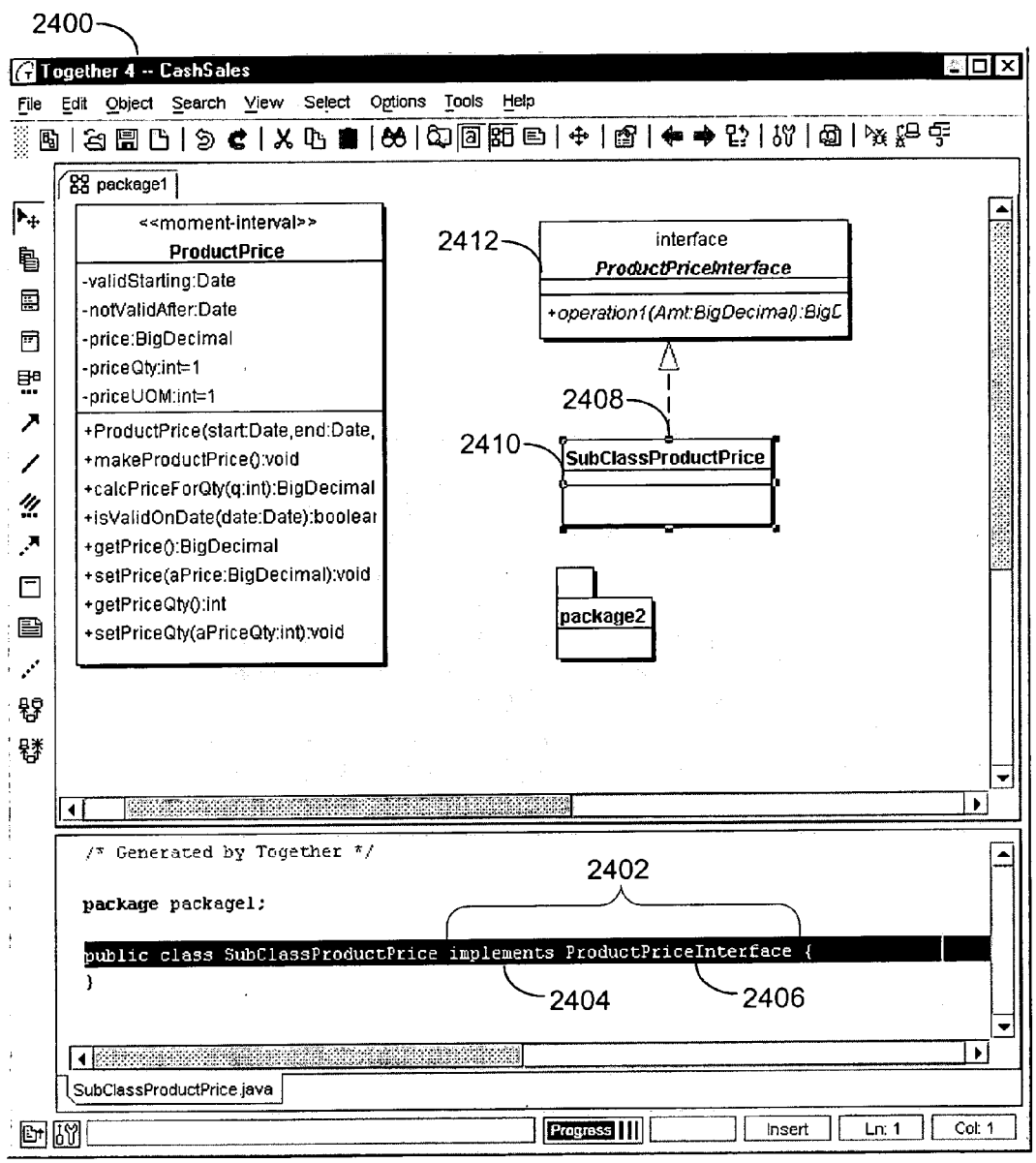
FIG. 24 depicts an exemplary user interface showing new code added by the software development tool in FIG. 2 to the source code associated with the source element in response to a determination that the source element can be linked to the destination element.

Next, the software development tool determines whether the source element can have a link to the destination element (step 2108). This process is described in greater detail below. If the source element cannot have a link to the destination element, the software development tool displays a link error (step 2110). The exemplary screen 2300 of FIG. 23 shows that link error 2302 is displayed by the software development tool in response to the request to link package 2202 to class 2204. The rule enforced here by the development tool is discussed below. As illustrated in FIG. 24, if the source element 2410 can have a link 2408 to the destination element 2410, the software development tool adds new code 2402 to the source code associated with the source element to reflect the link (e.g., a generalization link or an implementation link) with the destination element (step 2112). The new code 2402 includes a keyword 2404 and a link destination name

2406. In the example shown in FIG. 24, the keyword 2404 is "implements" which corresponds to a known Java™ programming language construct for an implementation link. As illustrated in reference to FIG. 26 and FIG. 27, the keyword 2604, 2704 that corresponds to a generalization or inheritance link is "extends." The link destination name 2406 is the name of the destination element, which is "ProductPriceInterface" in the example depicted in FIG. 24.

The software development tool also modifies the graphical representation of the source code of the source element to reflect the link from the source to the destination element (step 2114). For example, in FIG. 24, a dashed lined arrow 2408 reflects an implementation link from the source element (class 2410) to the destination element (interface 2412), and FIG. 26 and FIG. 27, a solid lined arrow (2608, 2708) reflects the an inheritance link from the source element (interface 2610, class 2710) to the destination element (interface 2612, class 2712).

Figure 25:
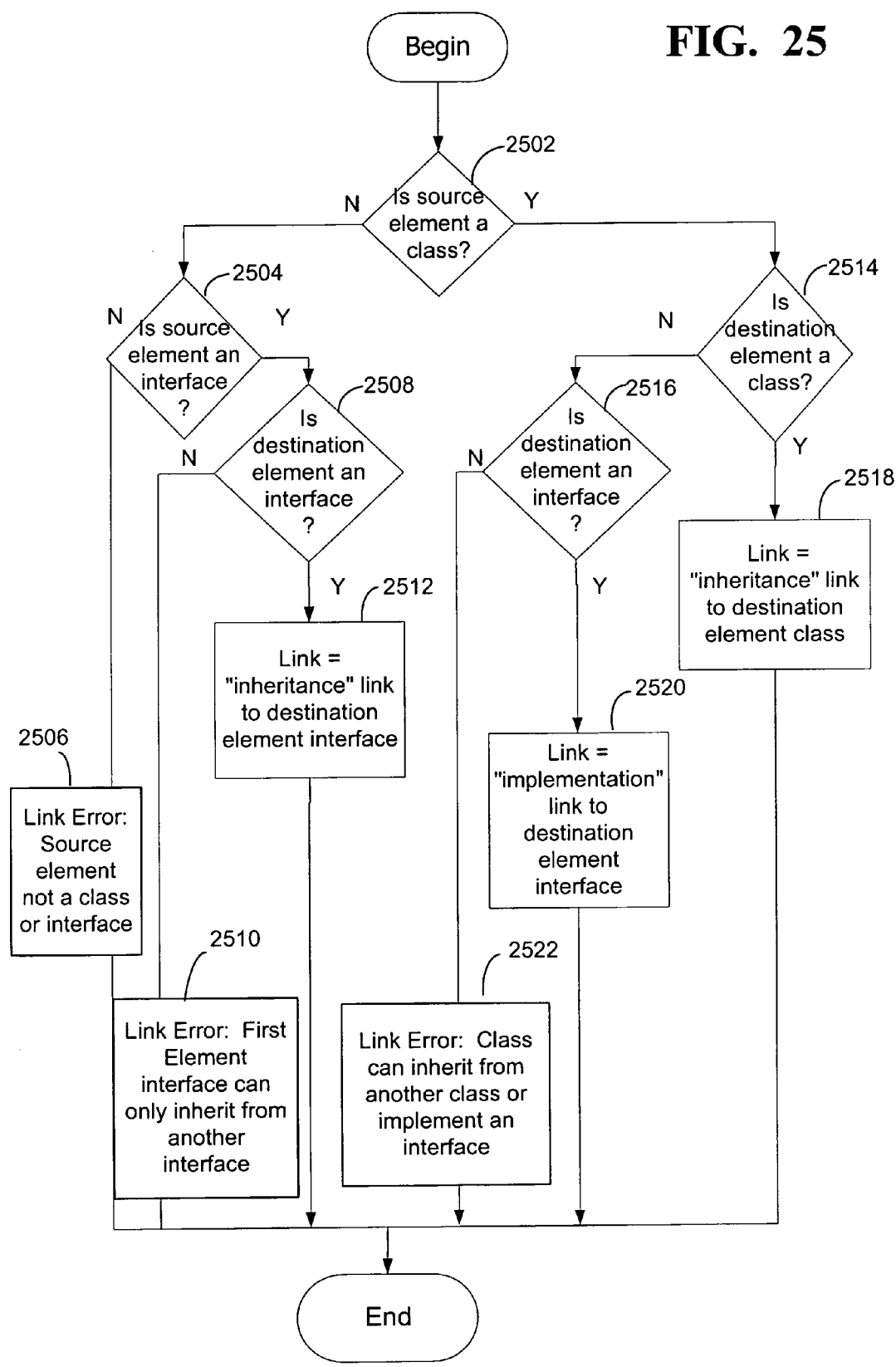
FIG. 25 depicts a flow diagram of the process performed by the software development tool in FIG. 2 for determining whether the source element can have a link to the destination element.

FIG. 25 depicts a flow diagram illustrating the process performed by the software development tool in step 2108 of FIG. 20 for determining whether the source element can have a link to the destination element. Having received the indications of the source and destination elements, respectively, the software development tool determines whether the source element is a class (step 2502) or, if not, an interface (step 2504). If the source element is any other object-oriented component, such as a package, the software development tool identifies a link error (step 2506). Because the software development tool enforces object-oriented programming rules, the software development tool recognizes that a class or an interface can have source code reflecting a link to another class or interface, and thus indicates a link error when this rule would be violated. In accordance with the functions previously described, upon receiving the indication of the source element, the software development tool parses the source code for the source element into a respective data structure 300 of TMM 200, which stores a language-neutral representation of the source code for the source element. Similarly, upon receiving the second selection, the software development tool parses the source code for the destination element into a respective data structure 300 of TMM 200. In an exemplary embodiment, if the source element or the destination element had been selected prior to initiating the process depicted in FIG. 20, then TMM 200 already contains a language-neutral representation of the source code for the respective element. Thus, the software development tool may invoke the TMM 200 to ascertain whether the source element is a class or an interface.

Figure 26:
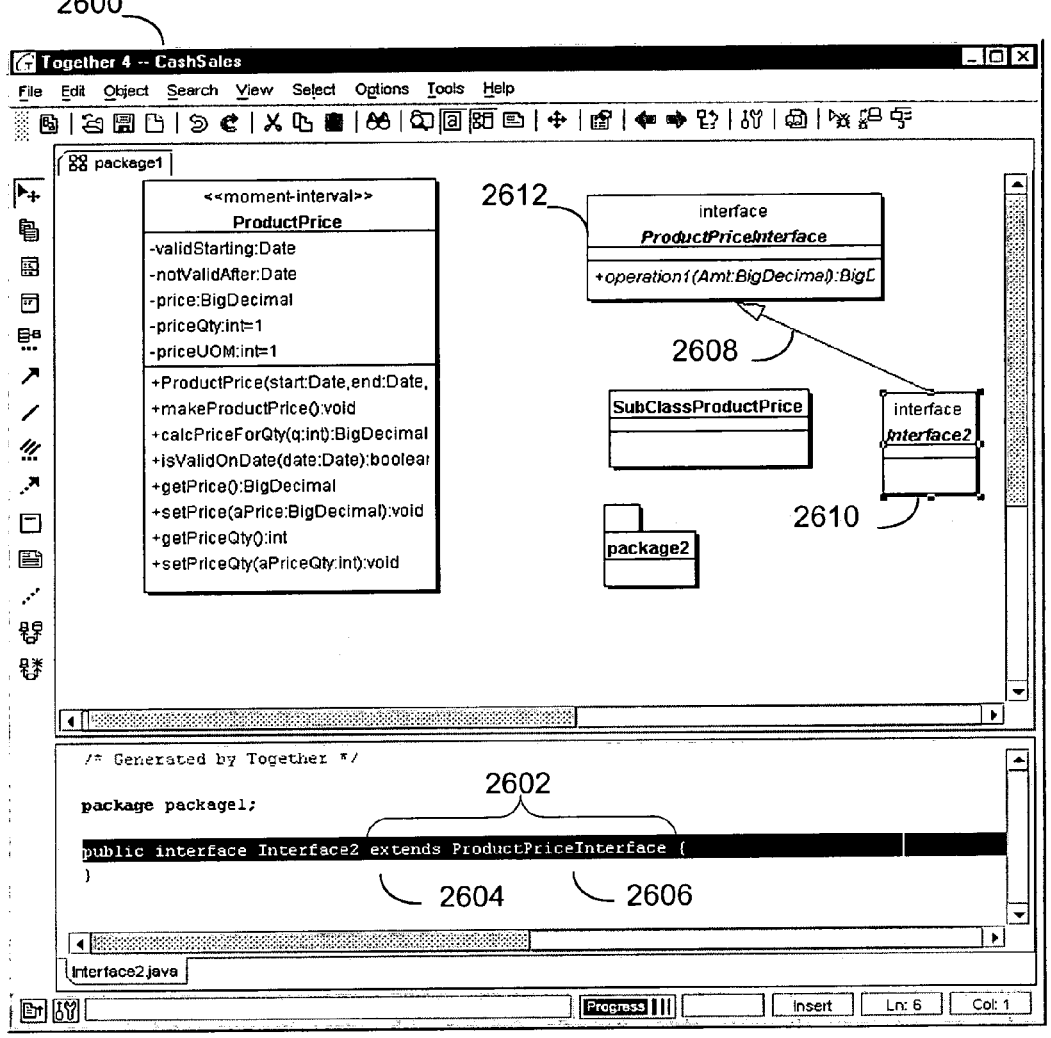
FIG. 26 depicts an exemplary user interface showing new code added by the software development tool in FIG. 2 to the source code associated with the source element in response to a determination that the source element is an interface that can be linked to the destination element that is another interface.

If the source element is an interface (step 2504), the software development tool determines whether the destination element is also an interface (step 2508). The software development tool identifies a link error if the destination element is not an interface (step 2510) because object-oriented programming rules only allow an interface to have a link to another interface. Alternatively, if the destination element is an interface, the software development tool identifies the link as an "inheritance" link (step 2512) because object-oriented programming rules allow an interface to inherit all method signatures associated with another interface, but not implement them. As shown in FIG. 26, after identifying the source and destination elements as interfaces (2610 and 2612, respectively), the software development tool generates new code 2602 that includes the keyword 2604 "extends" and the link destination name 2606 of "ProductPriceInterface," corresponding to the name of the destination element or interface 2612.

Figure 27:
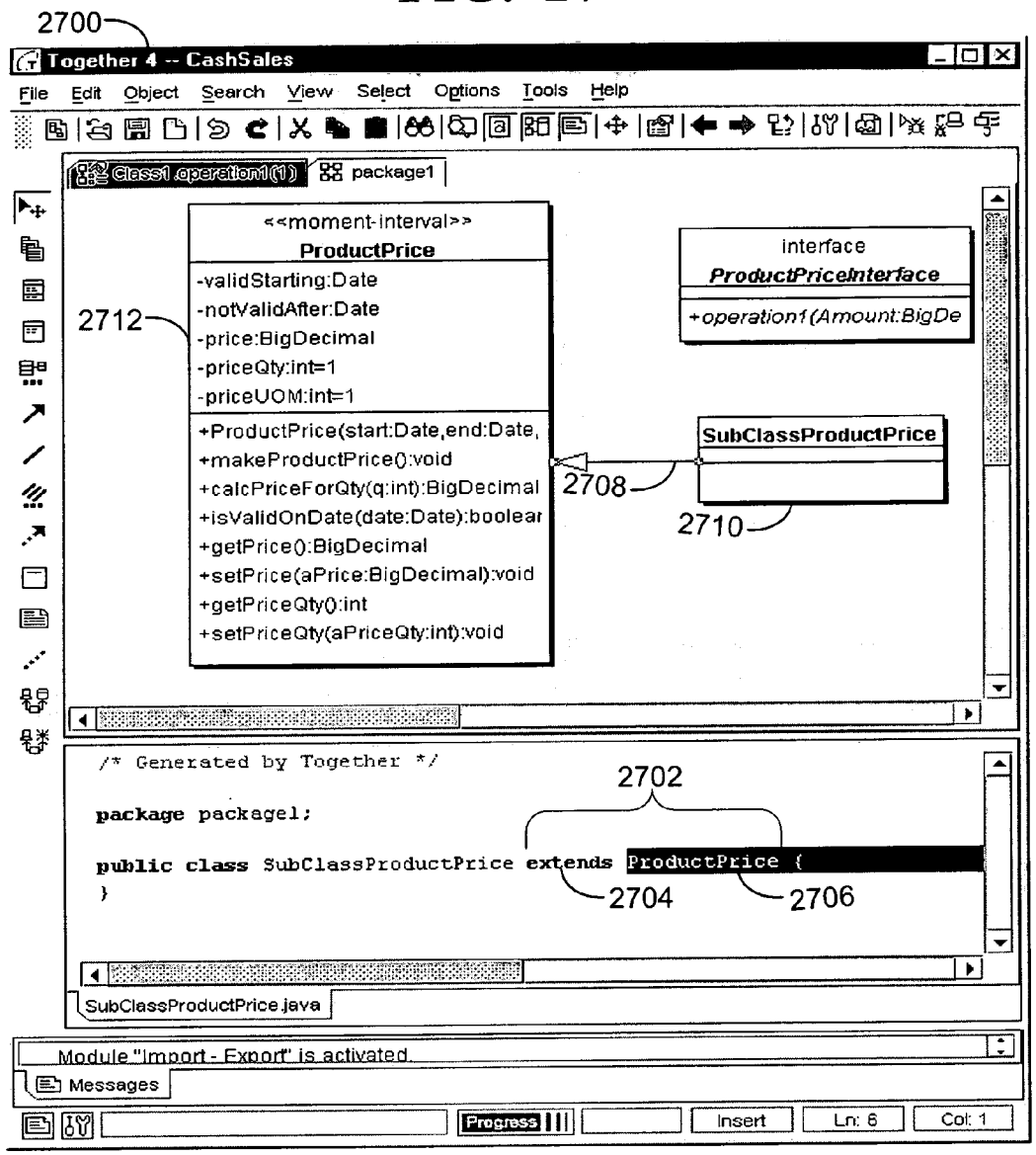
FIG. 27 depicts an exemplary user interface showing new code added by the software development tool in FIG. 2 to the source code associated with the source element in response to a determination that the source element is a class that can be linked to the destination element that is another class.

If the source element is a class (step 2502) the software development tool determines whether the destination element is a class (step 2514). If the destination element is not a class, the software development tool determines whether the destination is an interface (step 2516). If the destination element is a class, the software development tool identifies the link as an "inheritance" link (step 2518) because object-oriented programming rules allow a class to inherit all attributes and methods defined by another class. As shown in FIG. 27, after identifying the source element as class 2710 and the destination element as class 2712, the software development tool generates new code 2702 that includes the keyword 2704 "extends" and the link destination name 2706 "ProductPrice," corresponding to the name of the destination element or class 2712.

Figure 28:
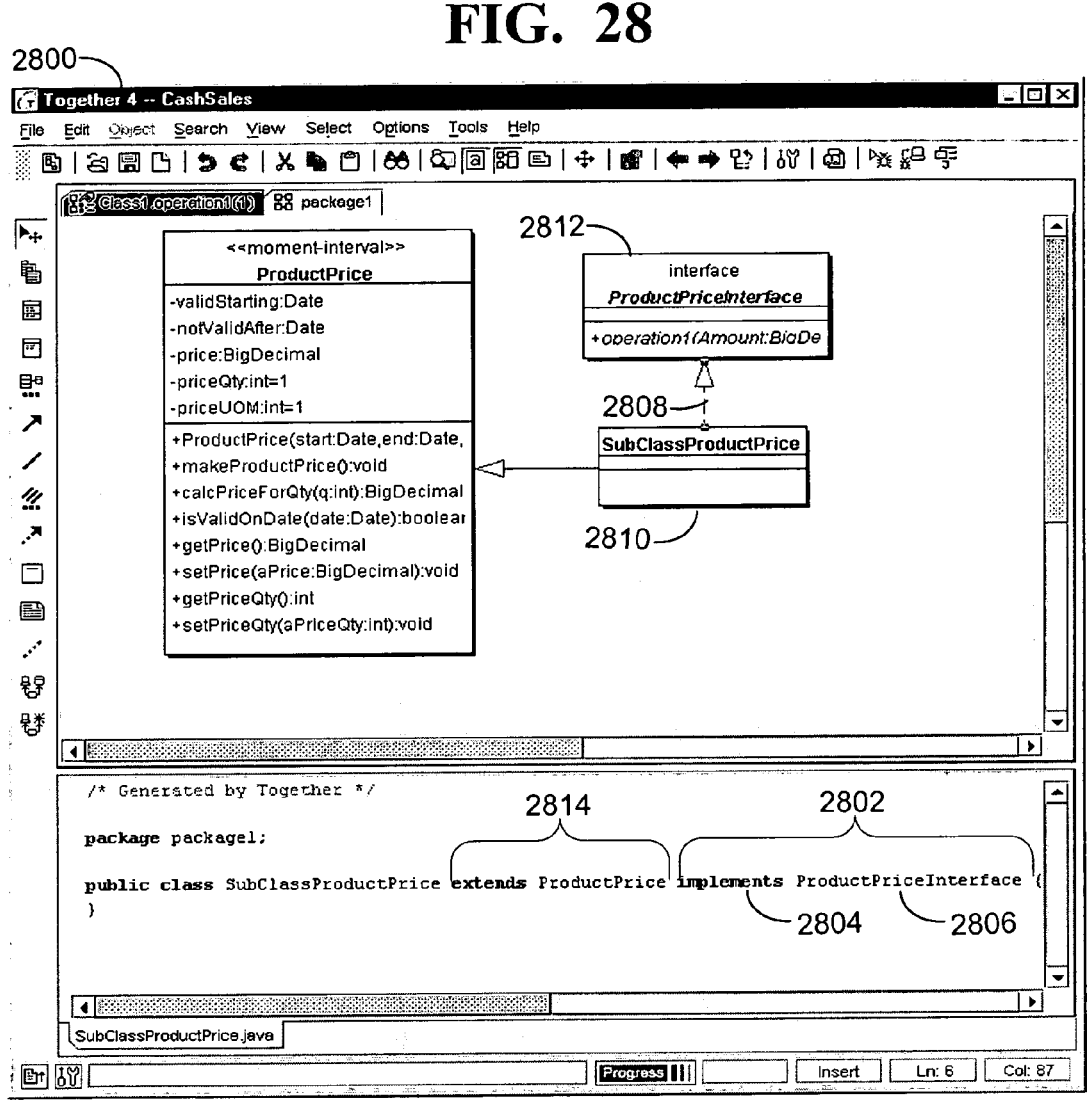
FIG. 28 depicts an exemplary user interface showing new code added by the software development tool in FIG. 2 to the source code associated with the source element in response to a determination that the source element is a class that can be linked to the destination element that is an interface.

If the destination element is an interface (step 2516), the software development tool identifies the link as an "implementation" link (step 2520) because object-oriented programming rules allow a class to implement all method signatures specified by an interface. As shown in FIG. 28, after identifying the source element as class 2810 and the destination element as interface 2812, the software development tool generates new code 2802 that includes the keyword 2804 "implements" and the link destination name 2806 "ProductPriceInterface," corresponding to the name of the destination element or interface 2812. While enforcing object-oriented programming rules that support a class having multiple links, the software development tool recognized that the class 2810 already had an inheritance link reflected by code 2814 and added new code 2802 without disturbing the original code 2814. Alternatively, if the destination element is a class (step 2514) or an interface (step 2516), the software development tool identifies a link error (step 2522) because object-oriented programming rules allow a class to inherit from another class or to implement from an interface.

Figure 29:
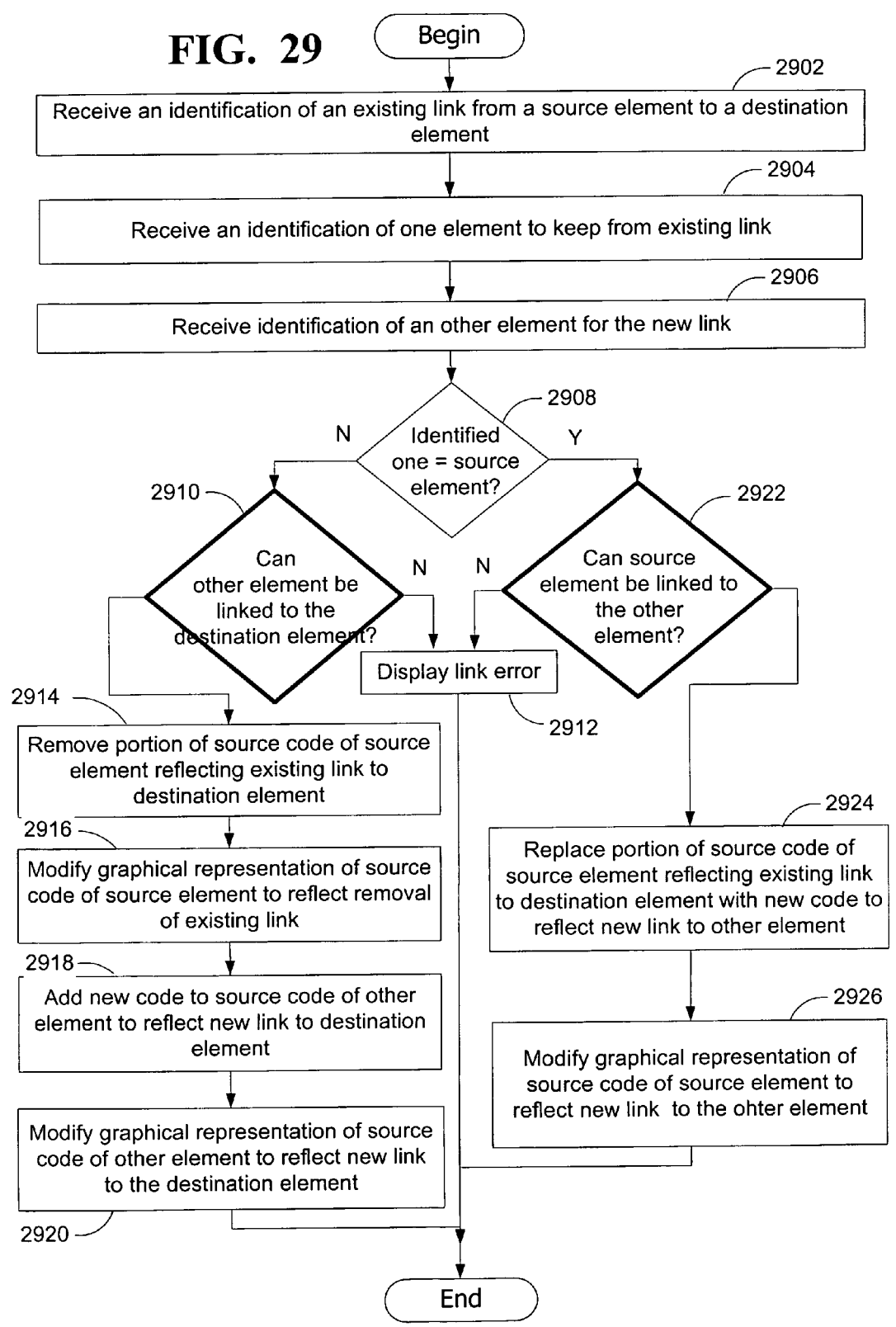
FIG. 29 depicts a flow chart illustrating an exemplary process performed by the software development tool in FIG. 2 to replace one of a source or a destination element in an existing link with another element to form a new link.

The process depicted in FIG. 29 illustrates the replacement of a source element (link source) or a destination element (link destination) in an existing link with another element to form a new link. The software development tool either replaces an existing link from the source element to the destination element with a new link from the source element to the other element (new link destination), or replaces an existing link from the source element to the destination element with a new link from the other element (new link source) to the destination element. By performing the process depicted in FIG. 29, the software development tool again saves a programmer from manually modifying the source code of the source element to reflect the new link with the other element. Moreover, by enforcing object-oriented programming rules for a link, the software development tool prevents the programmer from producing errors that may not be discovered until compilation of the source or other element.

Figure 30:
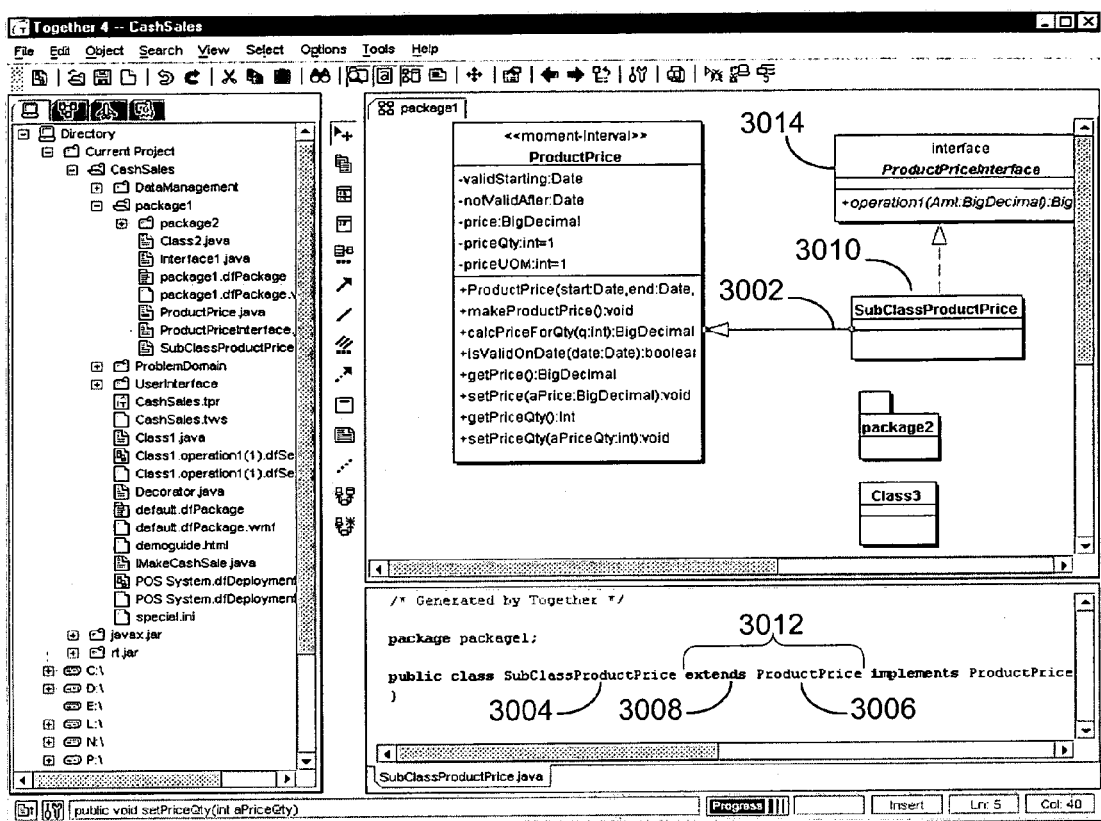
FIG. 30 depicts an exemplary user interface displayed by the software development tool depicted in FIG. 2, where the user interface shows an existing link that has been selected by a user to be replaced.

To replace an existing link with a new link, the software development tool receives an identification of the existing link between a source element and a destination element (step 2902). In one implementation discussed below in reference to FIG. 30, the software development tool receives the display coordinates for the existing link when a user or programmer clicks on the existing link 3002 displayed on the graphical form 3004. The TMM 200 identifies the symbol associated with the received display coordinates and provides this information to the software development tool, which correlates and stores the display coordinates of the existing link with the associated source code for the source element (i.e., the link destination). The identification of the existing link includes the link source name 3004 and link destination name 3006, corresponding respectively to the source element and the destination element in the existing link. The identification of the existing link also includes the keyword 3008 that identifies the type of link. As shown in FIG. 30, the existing link 3002 has a keyword 3008 of "extend" that identifies the existing link 3002 as a generalization or inheritance link. To clarify the following discussion, the source element and the destination element will be identified by the graphical representation of each element, such as 3010 and 3014, respectively.

Figure 31:
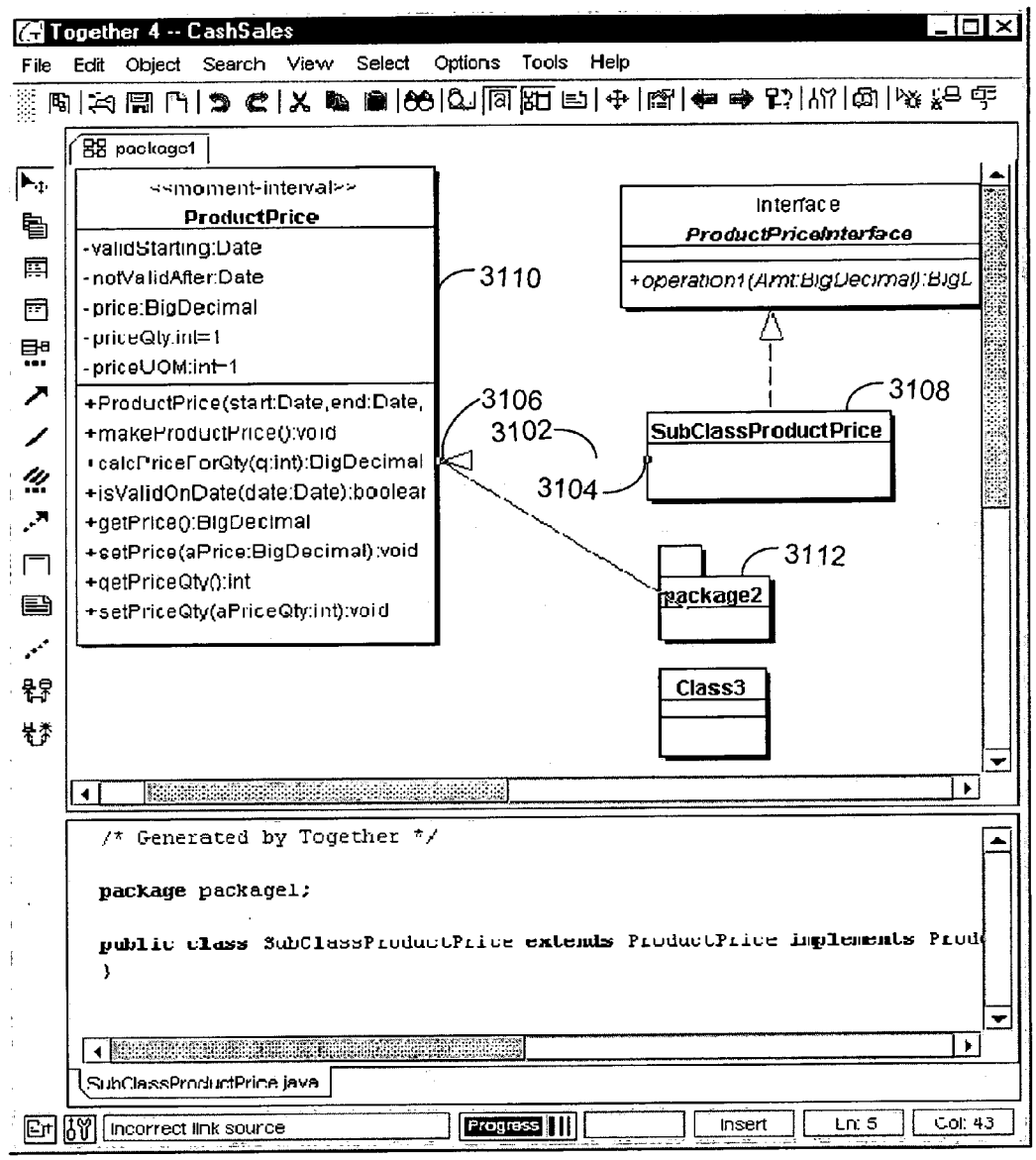
FIG. 31 depicts an exemplary user interface displayed by the software development tool in FIG. 2, where the user interface shows an identification of another element to link to one element in the existing link.

The software development tool also receives an identification of a selected element from among the source and destination elements (step 2904). As shown in FIG. 31, the source element 3108 and the destination element 3110 are associated with link 3102. The software development tool recognizes that the selected element will be used to form a new link. The link 3102 has a first end 3104 associated with the link source (source element) 3108 and a second end 3106 associated with the link destination (destination element) 3110. Any known programming technique may be used to select the element that will be used to form a new link. For example, by clicking on the first end 3104 of the link 3102 and dragging away from the link source, the selected element (i.e., the link destination) remains linked. Accordingly, as depicted in FIG. 31, the destination element 3110 associated with the second end 3106 of the link 3102 remains linked because the first end 3104 is dragged away from the source element 3108.

To replace the link with a new link, the software development tool also receives an identification of another element for a new link (step 2906). Again, any known programming technique may be used to indicate the other element to the software development tool. In the implementation shown in FIG. 31, the software development tool receives the indication of the other element (package 3112) when the first end 3104 of link 3102 is dragged and dropped over package 3112. The software development tool receives display coordinates from the TMM 200, which correlates the display coordinates to the other element as a class, an interface, or other object-oriented component, such as a package (e.g., 3112), and identifies the other element to the software development tool.

Next, the software development tool determines whether the selected element to keep from the existing link 3102 is the source element (i.e. link source) (step 2908). As described in reference to step 2904, the software development tool determines that the selected element is the source element 3108 when the second end 3106 is removed or dragged from the destination element 3110. Alternatively, the software development tool determines that the selected element is the destination element 3110 (link destination) when the first end 3104 is removed or dragged from the source element 3108. In addition, the TMM 200 identifies whether the selected element (i.e., the source element or the destination element) is a class, an interface, or other object-oriented component, such as a package.

Figure 32:
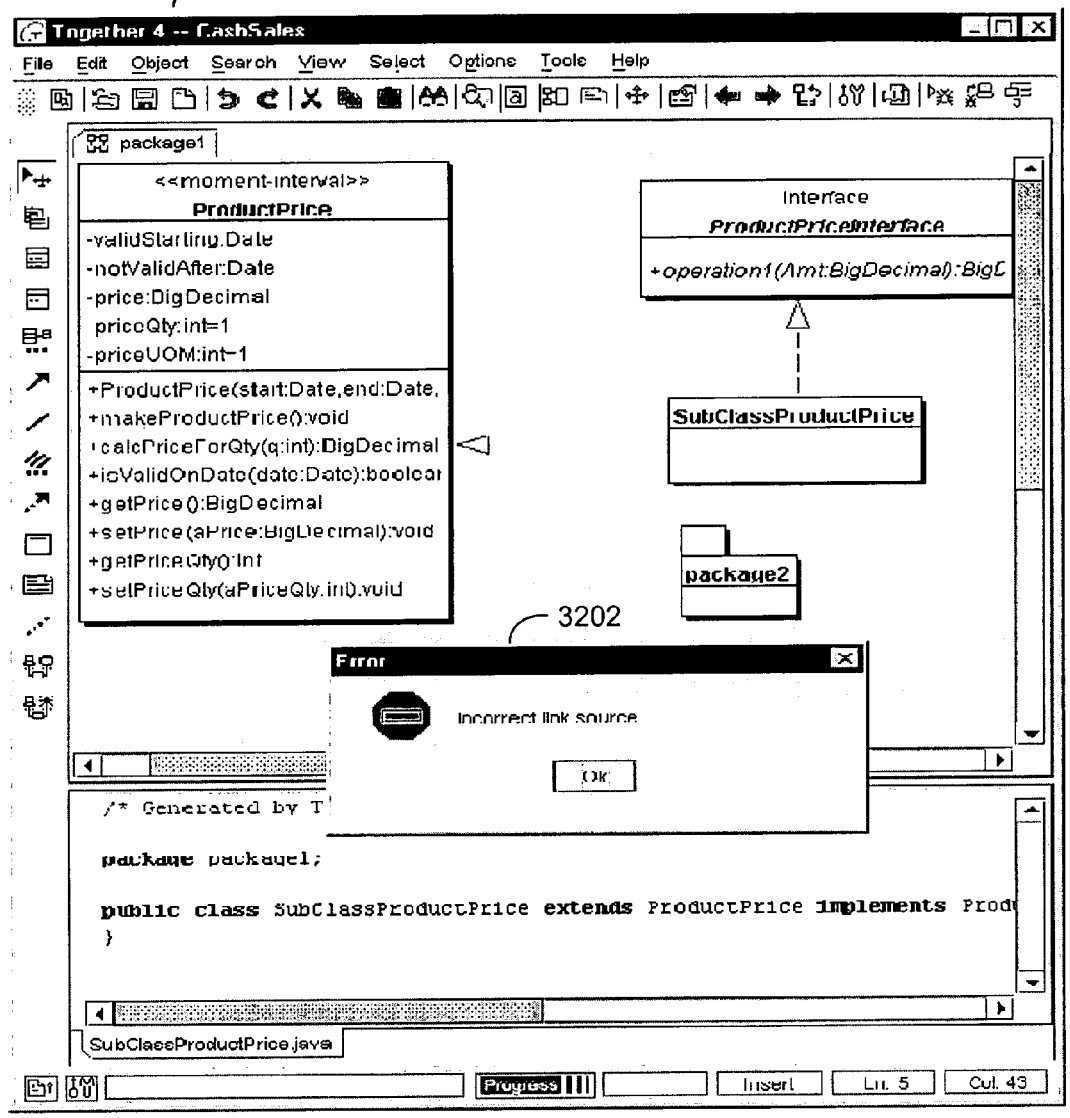
FIG. 32 depicts an exemplary user interface showing a link error generated by the software development tool depicted in FIG. 2 in response to a determination that the other element cannot be linked to the destination element.
Figure 33:
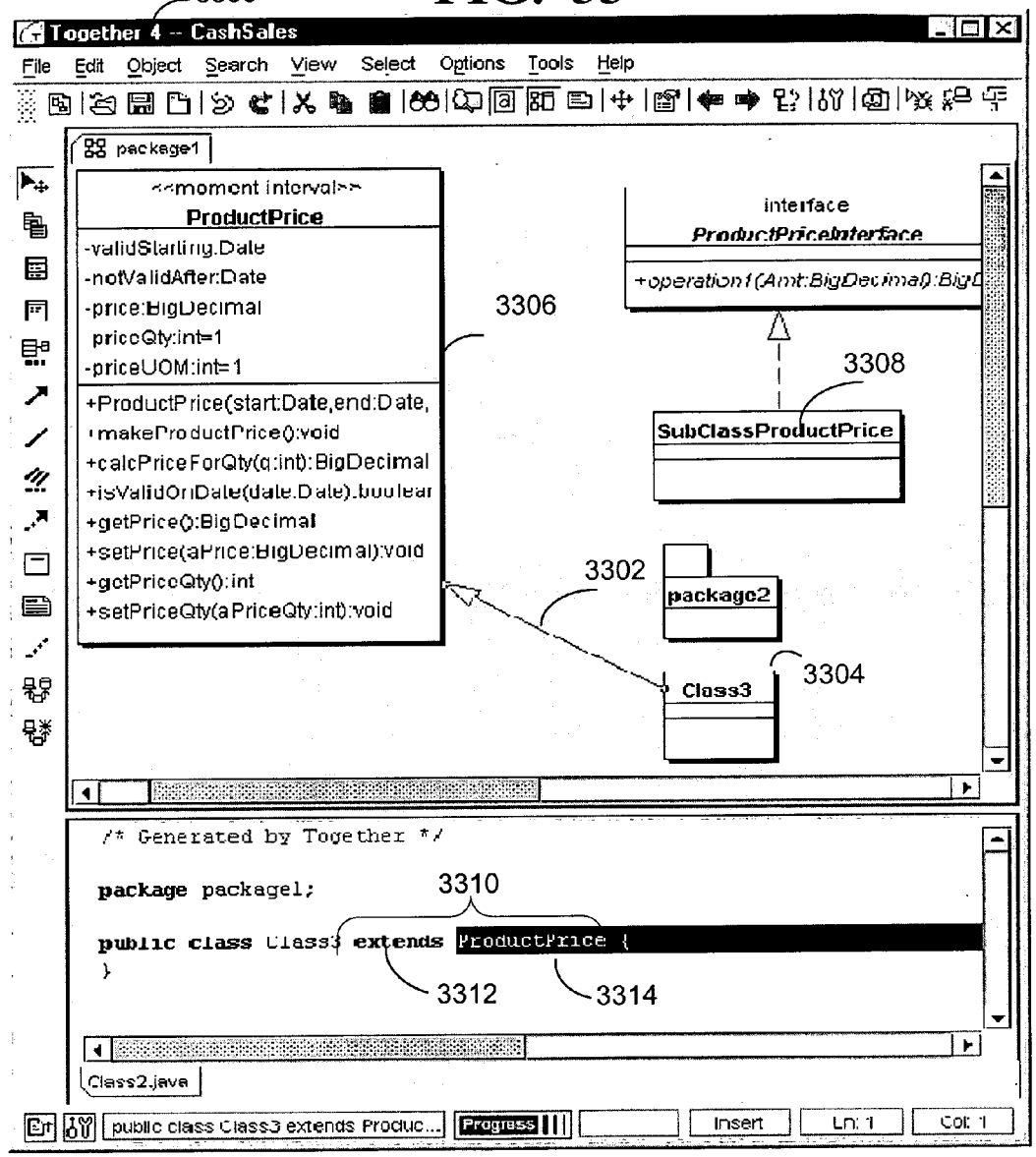
FIG. 33 depicts an exemplary user interface showing new code added by the software development tool in FIG. 2 to the source code associated with the other element to reflect the new link with the destination element.

If the selected element is the destination element or link destination, then the software development tool determines whether the other element can be linked to the destination element (step 2910), as discussed further below. If the other element cannot have a link to the destination element, the software development tool displays a link error (step 2912). For example, as shown on screen 3200 of FIG. 32, the software development tool displays link error 3202 after determining that package 3112 cannot have a link to class 3110 (i.e., 3108 of FIG. 31). If the other element can have a link to the destination element, the software development tool removes a portion of the source code associated with the source element that reflects the exiting link to the destination element (step 2914). In the example shown in FIG. 33, the portion of the source code associated with the source element 3308 that is removed may be "extend ProductPrice" 3012 in FIG. 30. As discussed in reference to FIG. 10A and 10B, the software development tool may remove the portion of the source code from a file containing the source code associated with the source element 3308 and then update the TMM 200. The software development tool also modifies the graphical representation of the source code of the source element to reflect the removal of the existing link (step 2916). As shown in FIG. 33, the software development tool removes the link 3102, in FIG. 31, to reflect the removal of code 3012 from the source element 3108 and 3308. The software development tool may modify the graphical representation of the source code of the source element based on the language neutral representation of the code in the updated TMM 200.

To generate the new link from the other element to the destination element, the software development tool adds new code to the source code associated with the other element to reflect the new link with the destination element (step 2918). For example, in FIG. 33, the software development tool adds new code 3310 to the source code associated with the other element 3304 to generate new link 3302 from the other element 3304 to the destination element 3306. The new code 3310 includes a keyword 3312 and a link destination name 3314. In the example shown in FIG. 33, the keyword 3312 is "extends" which identifies a generalization or inheritance link. The link destination name 3314 is the name of the destination element, which is "ProductPrice" in the example depicted in FIG. 33. The software development tool then modifies the graphical representation of the source code of the other element to reflect the link to the destination element (step 2920).

Figure 34:
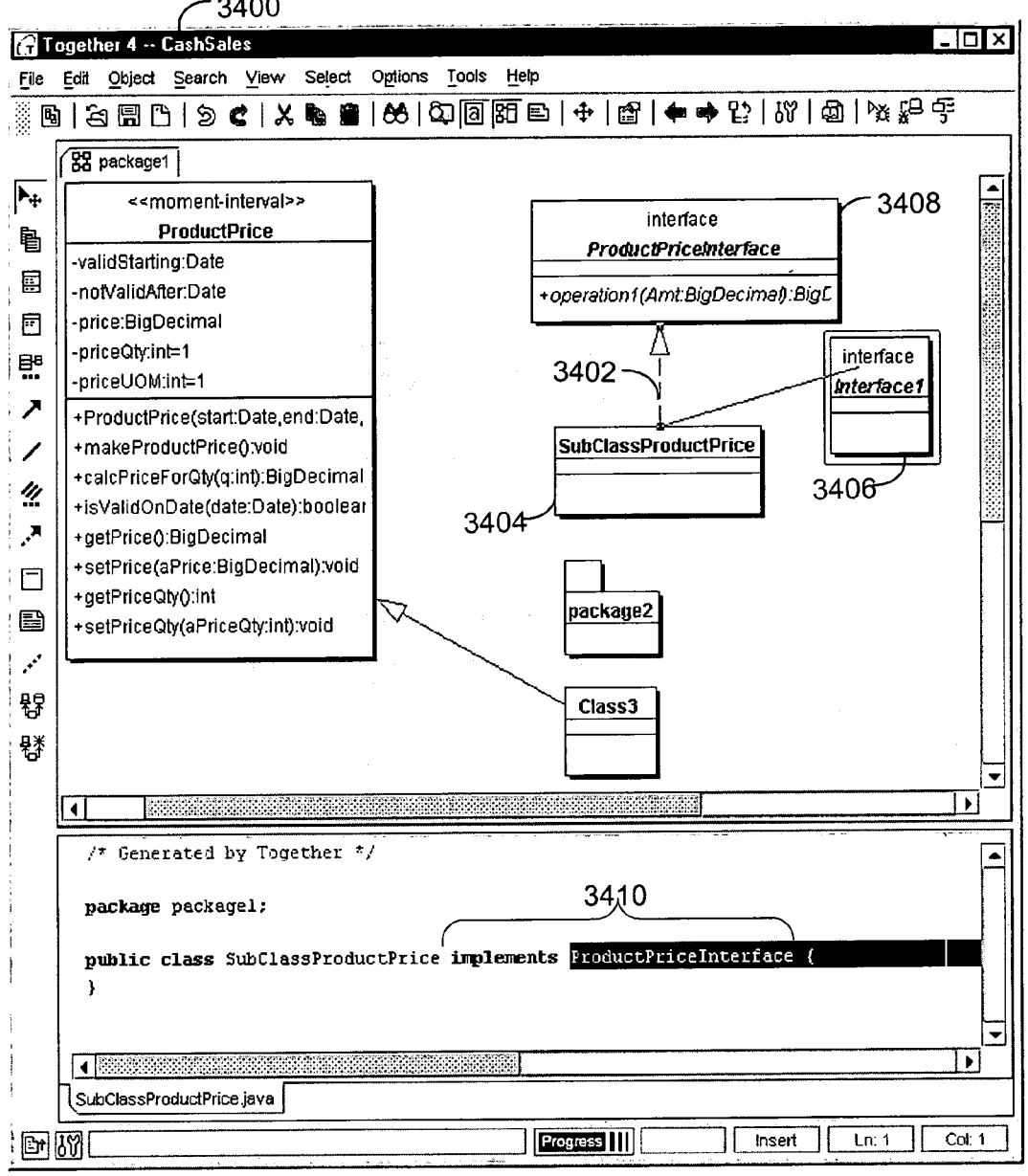
FIG. 34 depicts an exemplary user interface displayed by the software development tool depicted in FIG. 2, where the user interface displays an identification that the one element to keep from an existing link is the source element, and displays an identification of the other element for the new link with the source element.
Figure 35:
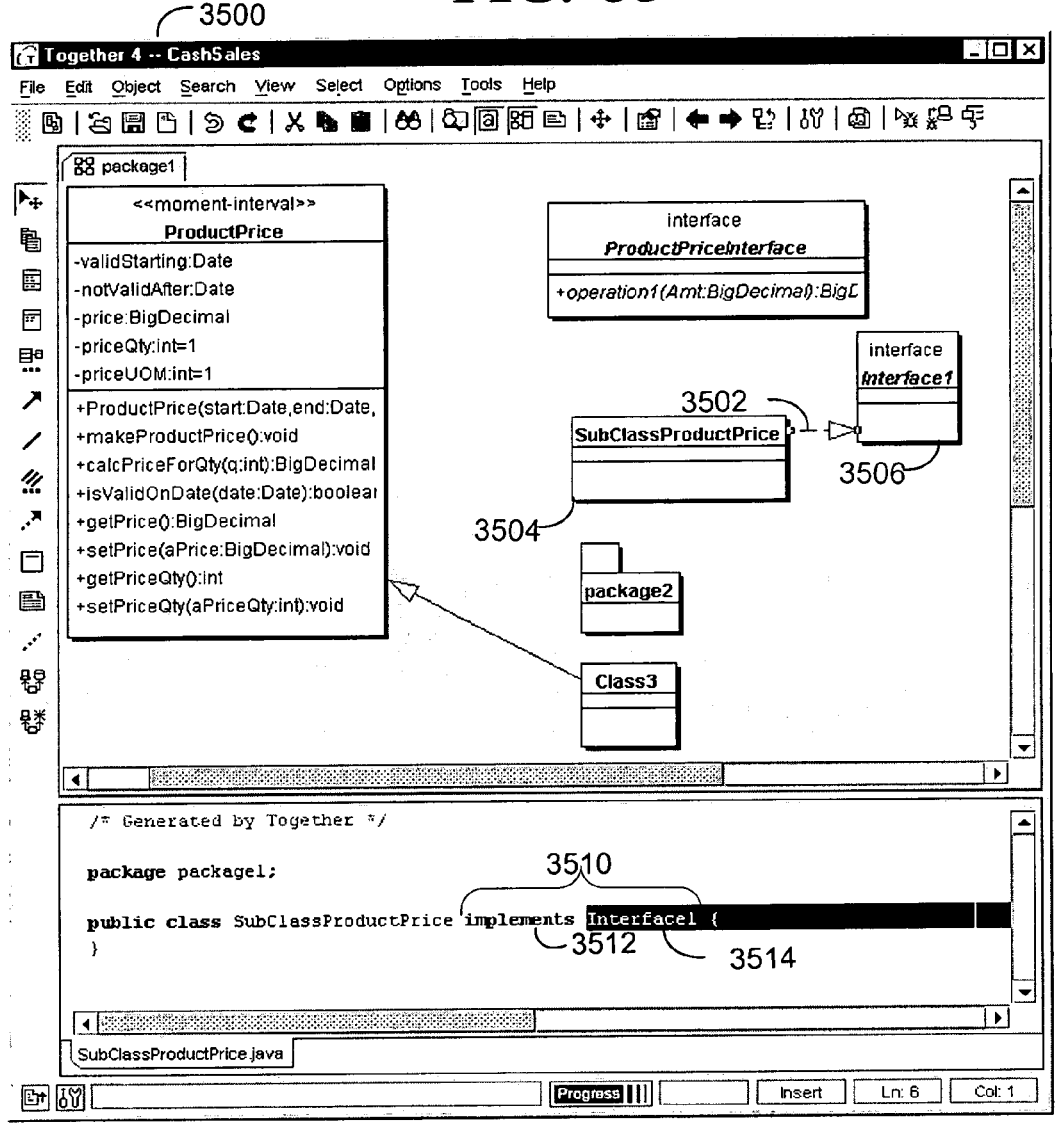
FIG. 35 depicts an exemplary user interface displayed by the software development tool depicted in FIG. 2, where the user interface displays a graphical representation of the source code of the source element, a class, to reflect the new link to the other element, another class.

If the one element selected from the linked elements (i.e., source or destination element) is the source element (link source), then the software development tool determines whether the source element can be linked to the other element (step 2922). When it is determined that the source element cannot have a link to the other element, the software development tool displays a link error as shown on screen 3200 of FIG. 32 (step 2912). As illustrated in FIG. 34, when it is determined that the source element 3404 can have a link to the other element 3406, the software development tool replaces a portion of the source code associated with the source element 3404 that reflects the existing link to the destination element 3408 with new code to reflect a new link to the other element 3406 (step 2924). As discussed in reference to FIGS. 10A and 10B, the software development tool may replace the portion of the source code from a file containing the source code associated with the source element 3308 and then update the TMM 200. In the example shown in FIG. 34, the portion of the source code associated with the source element 3404 that is replaced is "implements ProductPriceInterface" 3410. As shown in FIG. 35, the software development tool adds new code 3510 to the source code associated with the source element 3504 to reflect the new link 3502 with the other element 3506. The new code 3510 includes a keyword 3512 and a link destination name 3514. In the example shown in FIG. 35, the keyword 3512 is "implements" which identifies an implementation link. The link destination name 3514 is the name of the other element, which is "Interface1" in the example depicted in FIG. 35. The software development tool then modifies the graphical representation of the source code of the source element to reflect the new link 3502 from the source to the other element (step 2926).

Figure 36:
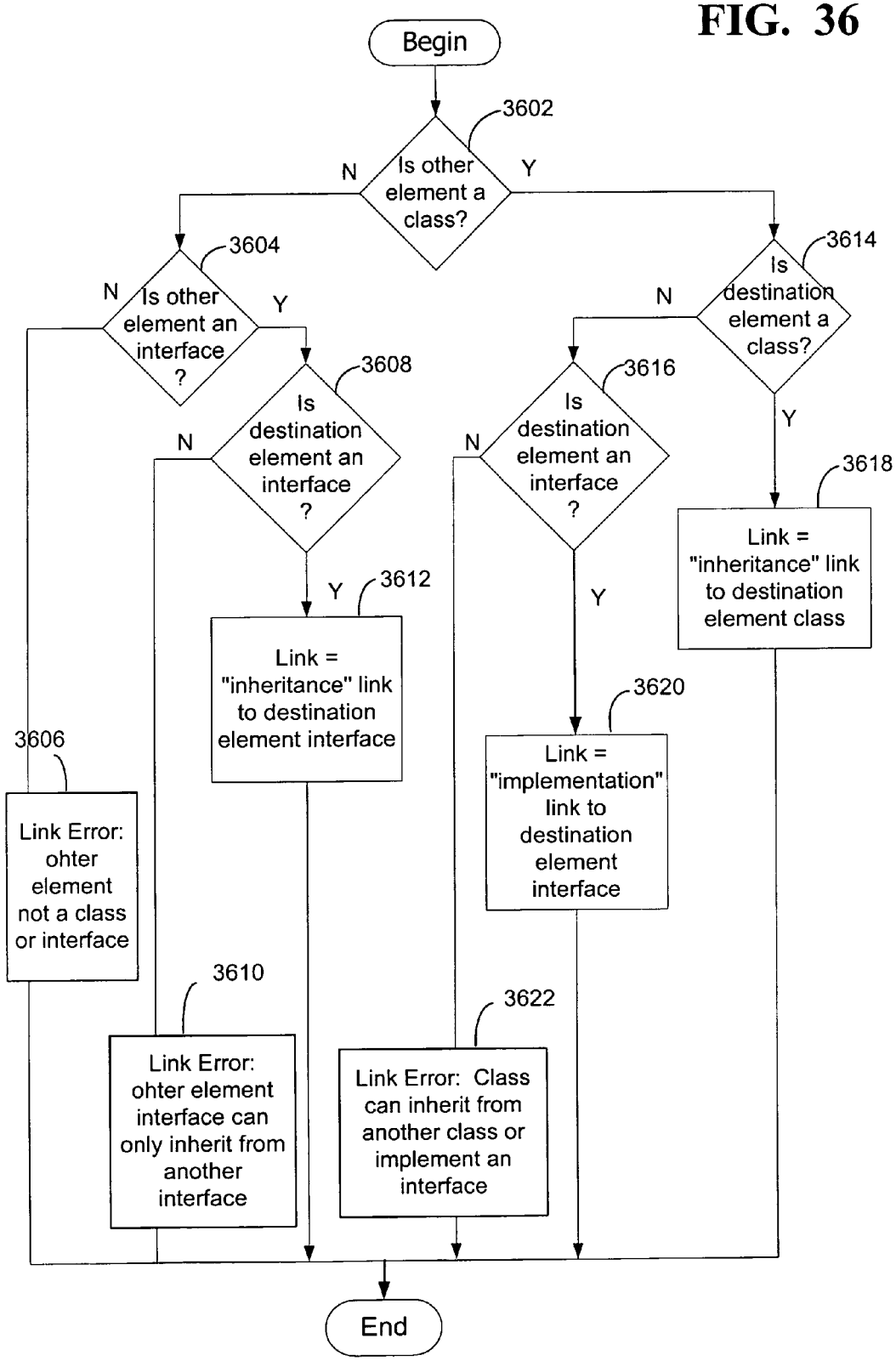
FIG. 36 depicts a flow diagram of the process performed by the software development tool in FIG. 2 for determining whether the other element can have a link to the destination element.

FIG. 36 depicts a flow chart illustrating the process performed by the software development tool in step 2910 for determining whether the other element (new link source) can have a link to the destination element (link destination). As shown in FIG. 36, the software development tool determines whether the other element is a class (step 3602) or, if not, an interface based on the received identification of the other element (step 3604). If the other element is any other object-oriented component, such as package, the software development tool identifies a link error (step 3606).

Figure 37:
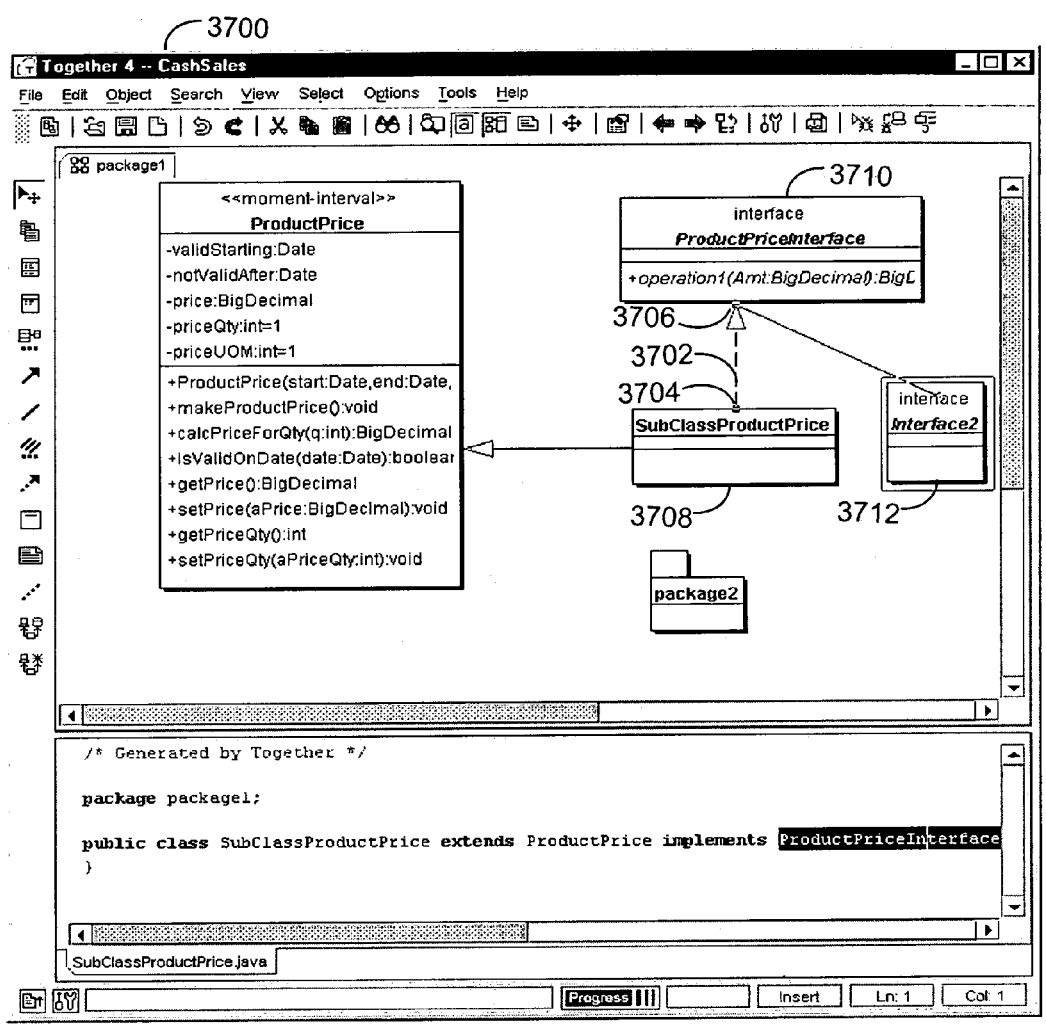
FIG. 37 depicts an exemplary user interface displayed by the software development tool depicted in FIG. 2, where the user interface displays the destination element, an interface, in the existing link as the one element to keep to form a new link with the selected other element, another interface.
Figure 38:
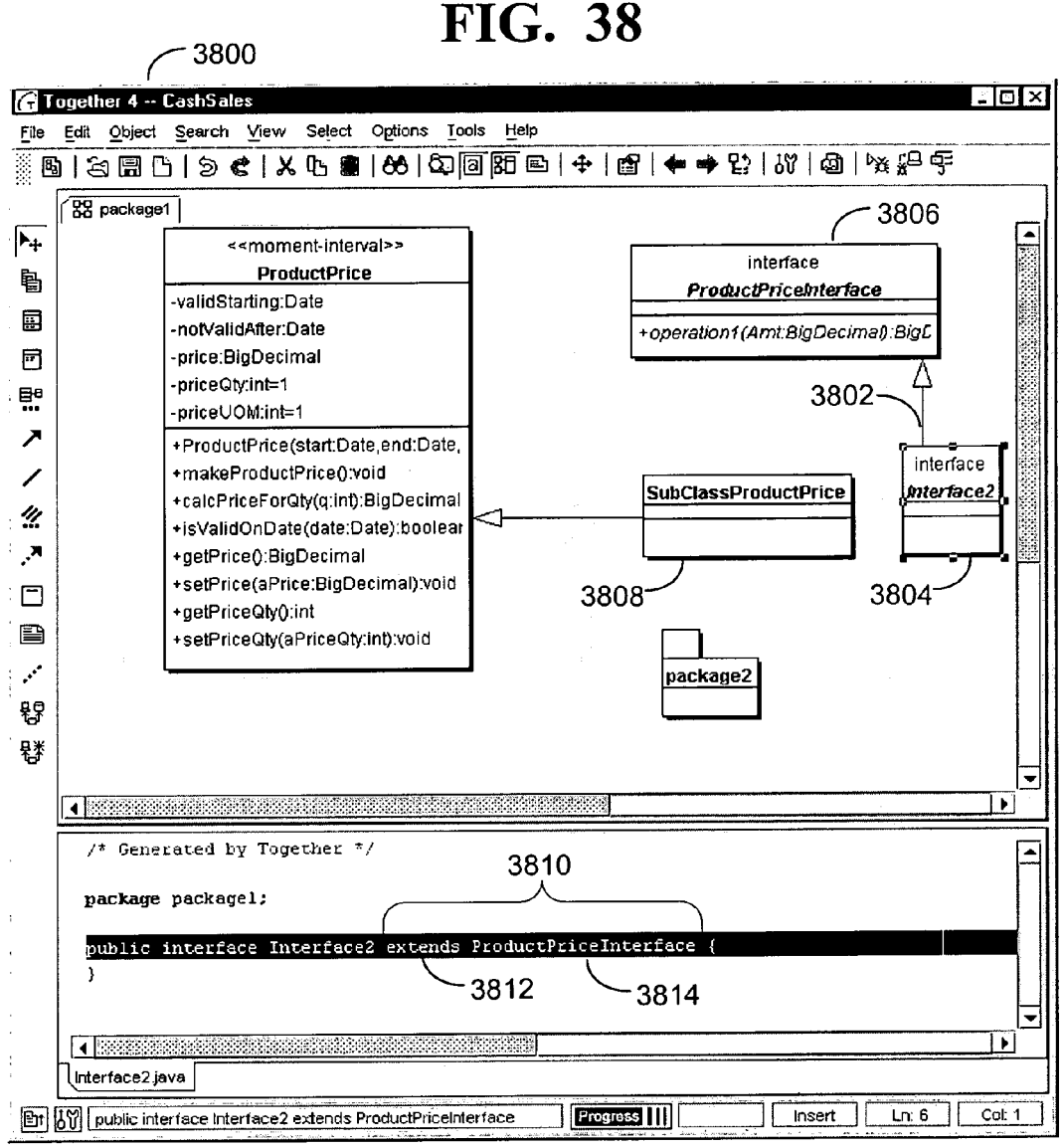
FIG. 38 depicts an exemplary user interface displayed by the software development tool depicted in FIG. 2, where the user interface displays a graphical representation of the source code of the other element, an interface, to reflect the new link to the destination element, another interface.

If the other element is an interface, the software development tool determines whether the destination element is also an interface (step 3608). The software development tool identifies a link error if the destination element is not an interface (step 3610) because object-oriented programming rules allow an interface to have a link to another interface, but not to a class or a package. Alternatively, if the destination element is an interface, the software development tool identifies the new link as an "inheritance" link (step 3612) because object-oriented programming rules allow an interface to inherit all method signatures associated with another interface, but not to implement them. For example, as shown in FIG. 37, the software development tool displays user interface 3700 in response to receiving an identification that the one element selected from the linked elements is the destination element 3710 and to receiving an identification of the other element 3712. In FIG. 38, when it is determined that the other element and the destination element are interfaces (3804 and 3806, respectively), the software development tool identifies the new link 3802 as an "inheritance " link. Thus, while performing step 2918, the software development tool generates new code 3810 that includes the keyword 3812 "extends" and the link destination name 3814, "ProductPriceInterface," corresponding to the name of the destination element or interface 3804. While performing step 2920, the software development tool modifies the graphical representation of the source code of the other element 3806 to reflect the new link 3802 by displaying the new link 3802 as a solid arrow as shown in FIG. 38.

If the other element is a class (step 3602), the software development tool determines whether the destination element is a class (step 3614). If the destination element is a class, the software development tool identifies the link as an "inheritance" link (step 3618) because object-oriented programming rules allow a class to inherit all attributes and methods defined by another class. For example, returning to FIG. 31, the software development tool displays user interface 3100 in response to receiving an identification that the one element selected from the linked elements is the destination element 3110 and to receiving an identification of the other element 3112. When it is determined that the destination element and other elements are classes (3306 and 3304, respectively), the software development tool identifies the new link 3302 as an "inheritance" link. Thus, while performing step 2918, the software development tool generates new code 3310 that includes a keyword 3312 "extends" and a link destination name 3314 of "ProductPrice," corresponding to the name of the destination element or interface 3306. While performing step 2920, the software development tool modifies the graphical representation of the source code of the other element 3304 to reflect the new link 3302 by displaying the new link 3302 as a solid arrow as shown in FIG. 38.

Figure 39:
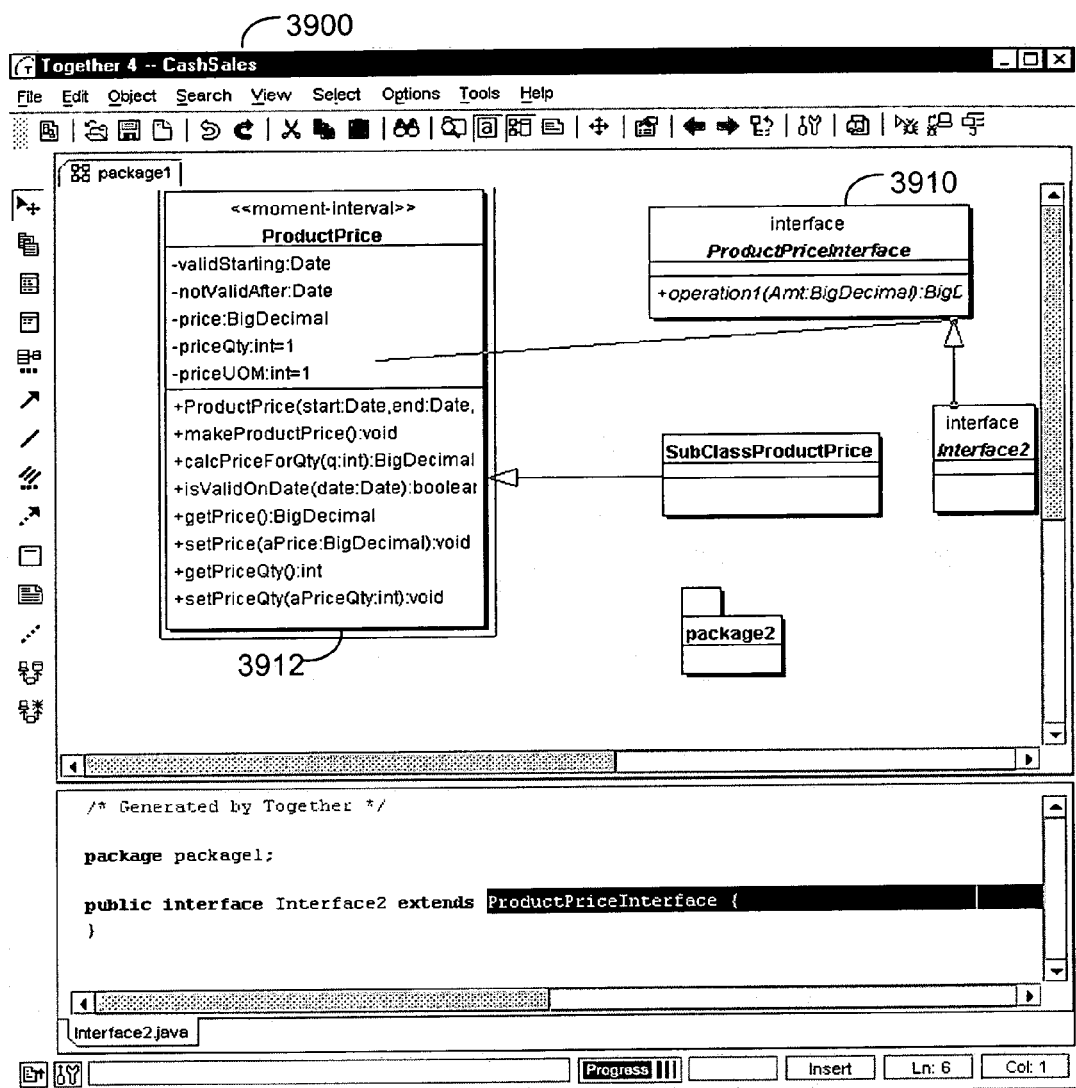
FIG. 39 depicts an exemplary user interface displayed by the software development tool depicted in FIG. 2, where the user interface displays an identification that the one element to keep from an existing link is the destination element, and displays an identification of the other element for the new link with the destination element.
Figure 40:
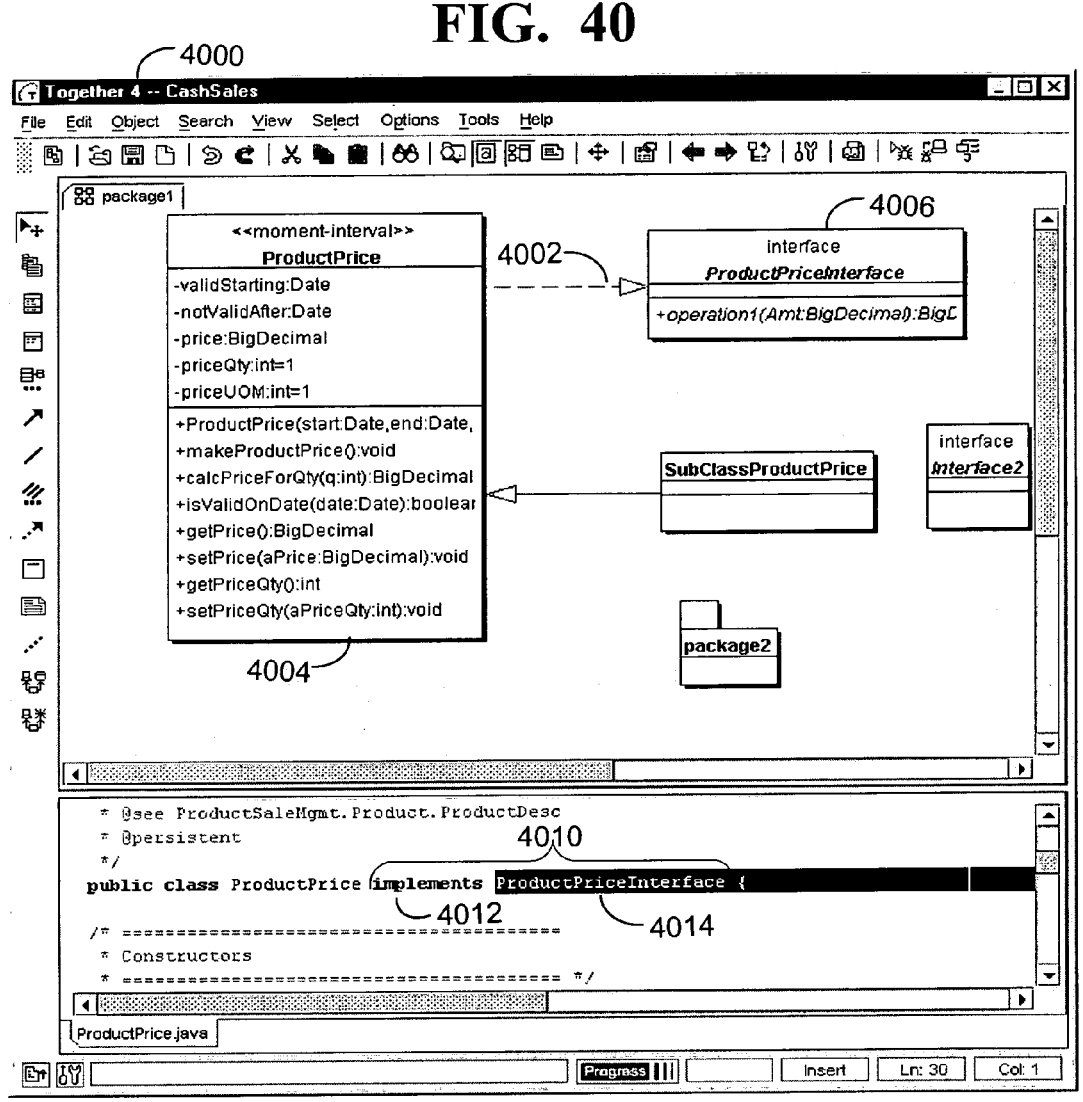
FIG. 40 depicts an exemplary user interface displayed by the software development tool depicted in FIG. 2, where the user interface displays a graphical representation of the source code of the other element, a class, to reflect the new link to the destination element, another class.

If the destination element is not a class, the software development tool determines whether the destination element is an interface (step 3616). If the destination element is an interface, the software development tool identifies the link as an "implementation" link (step 3620) because object-oriented programming rules allow a class to implement all method signatures specified by an interface. For example, as shown in FIG. 39, the software development tool displays user interface 3900 in response to receiving an identification that the one element selected from the linked elements is the destination element 3910 and to receiving an identification of the other element 3912 in accordance with methods and system consistent with the present invention. As illustrated in FIG. 40, when it is determined that the other element is a class and the destination element is an interface (4004 and 4006, respectively), the software development tool identifies the new link 4002 as an "inheritance " link. Thus, while performing step 2918, the software development tool generates new code 4010 that includes a keyword 4012 "extends" and a link destination name 4014 of "ProductPriceInterface," corresponding to the name of the destination element or interface 4006. While performing step 2920, the software development tool modifies the graphical representation of the source code of the other element 4004 to reflect the new link 4002 by displaying the new link 4002 as a dashed arrow as shown in FIG. 40.

Alternatively, when the destination element is determined not to be a class in step 3614 or an interface in step 3616, the software development tool identifies a link error (step 3622) because object-oriented programming rules only allow a class to inherit from another class or to implement from an interface.

Figure 41:
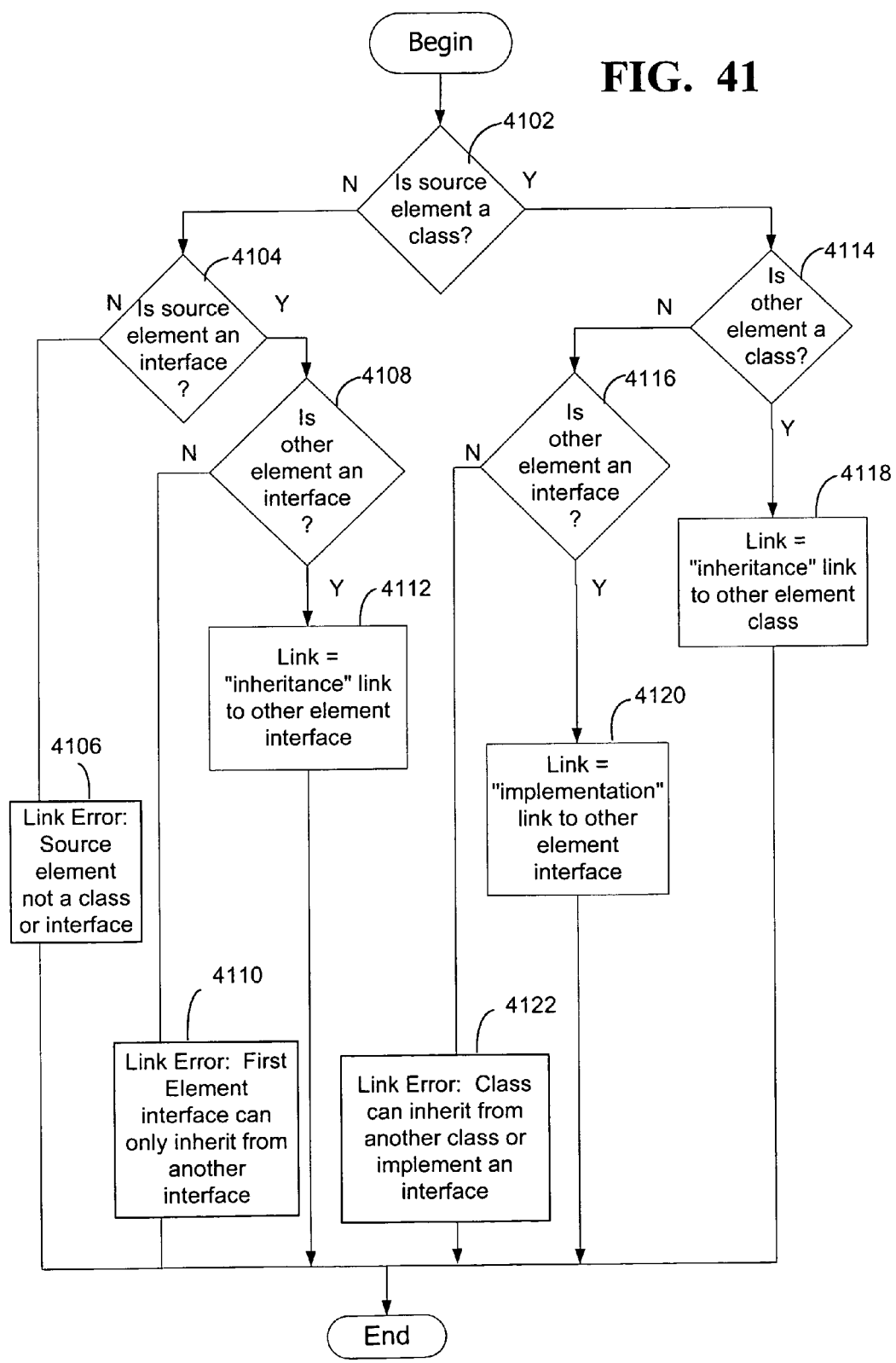
FIG. 41 depicts a flow diagram of the steps performed by the software development tool in FIG. 2 for determining whether the source element can have a link to the other element.
Figure 42:
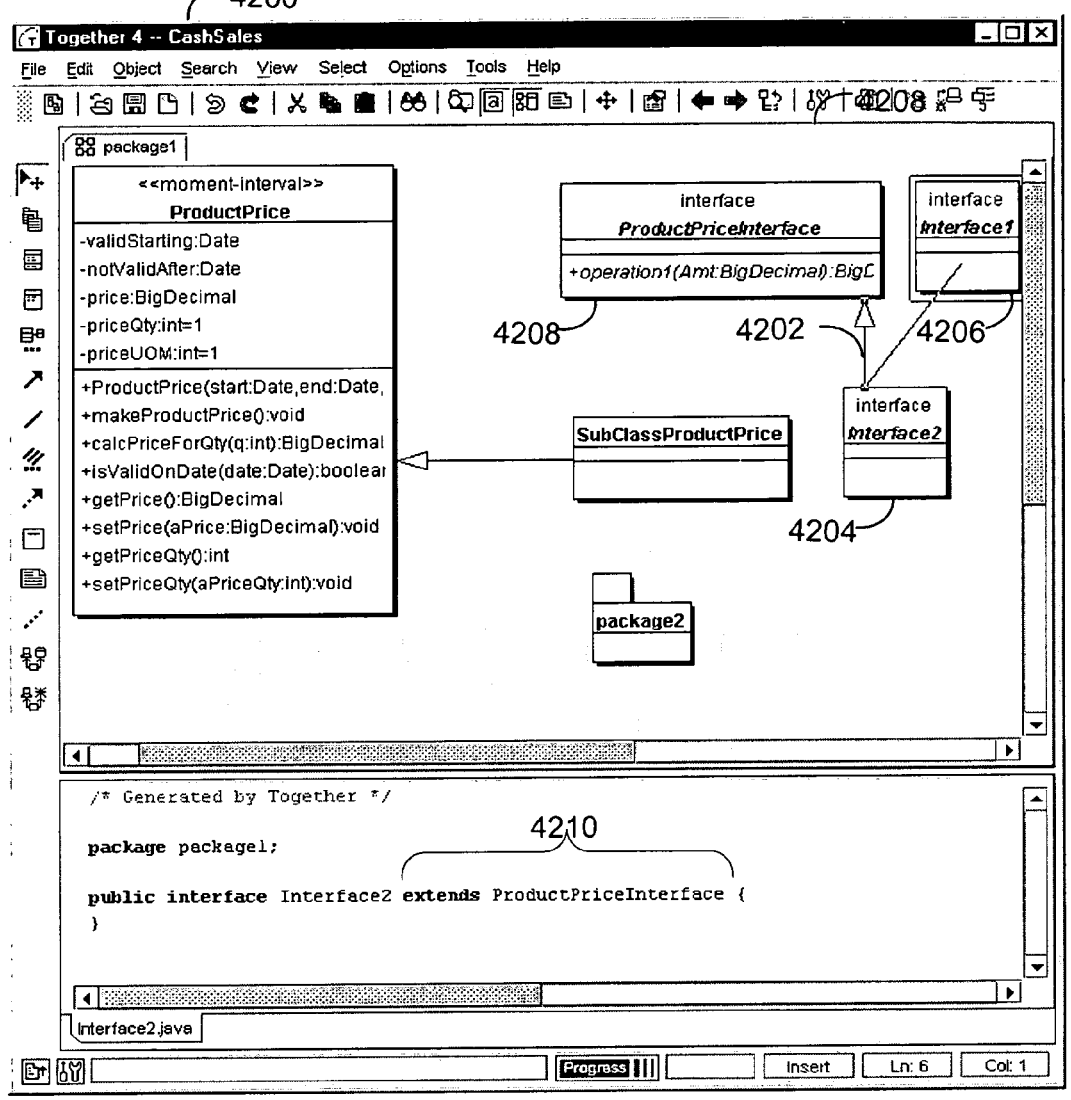
FIG. 42 depicts an exemplary user interface displayed by the software development tool depicted in FIG. 2, where the user interface displays an identification that the one element to keep from an existing link is the source element, and displays an identification of the other element for the new link with the source element.
Figure 43:
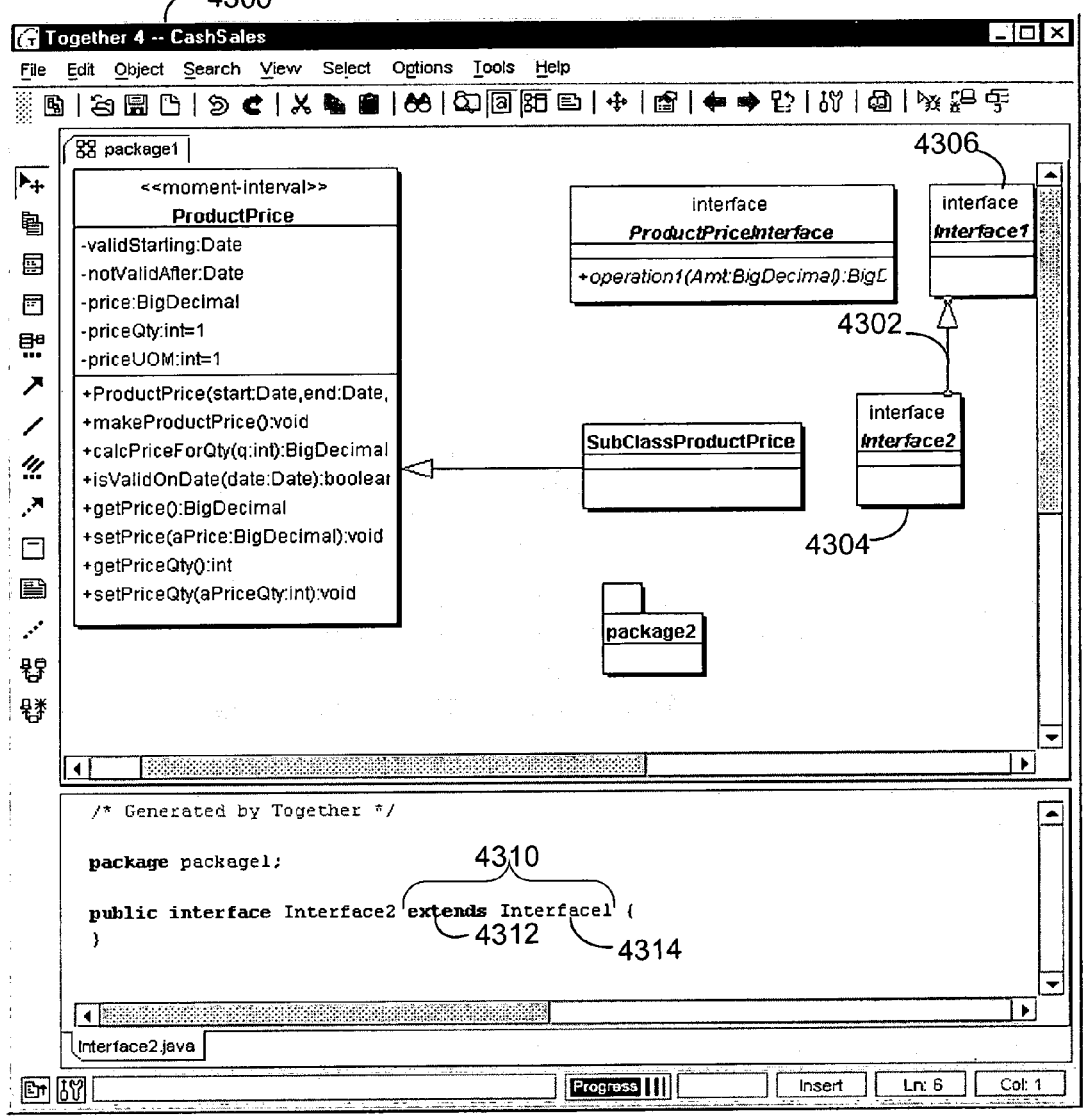
FIG. 43 depicts an exemplary user interface displayed by the software development tool depicted in FIG. 2, where the user interface displays a graphical representation of the source code of the source element, an interface, to reflect the new link to the other element, another interface.

FIG. 41 depicts a flowchart of the steps performed by the software development tool in the step 2922 for determining whether the source element (link source) can have a link to the other element (new link destination). As shown in FIG. 41, the software development tool determines whether the source element is a class (step 4102), or if not, an interface (step 4104) based on the received identification of one element to keep as the source element. If the source element is any other object-oriented component, such as a package, the software development tool identifies a link error (step 4106) which it may display in step 2912. If the source element is an interface in step 4104, the software development tool determines whether the other element is also an interface (step 4108). The software development tool identifies a link error when the other element is determined not to be an interface (step 4110) because object-oriented programming rules only allow an interface to have a link to another interface, but not to a class or a package. Alternatively, when its determined that the source element is an interface, the software development tool identifies the new link as an "inheritance" link (step 4112) because object-oriented programming rules allow an interface to inherit all method signatures associated with another interface, but not to implement them. For example, as shown in FIG. 42, the software development tool displays user interface 4200 in response to receiving an identification that the one element to keep is the source element 4204 and to receiving an identification of the other element 4206. When it is determined that the source and other elements are interfaces (4304 and 4306, respectively), the software development tool identifies the new link 4302 as an "inheritance " link. Thus, while performing step 2924, the software development tool replaces portion of code 4210 with new code 4310 that includes a keyword 4312 "extends" and a link destination name 4314 of "Interface1," corresponding to the name of the other element or interface 4306. While performing step 2926, the software development tool modifies the graphical representation of the source code of the source element 4304 to reflect the new link 4302 by displaying the new link 4302 as a solid arrow as shown in FIG. 43.

If the source element is a class in step 4102, the software development tool determines whether the other element is a class (step 4114). If the other element is a class, the software development tool identifies the link as an "inheritance" link (step 4118) because object-oriented programming rules allow a class to inherit all attributes and methods defined by another class.

If the other element is not a class, the software development tool determines whether the other element is an interface (step 4116). If the source element is an interface, the software development tool identifies the link as an "implementation" link (step 4120) because object-oriented programming rules allow a class to implement all method signatures specified by an interface.

Alternatively, when the source element is determined not to be a class in step 4114 or a interface in step 4116, the software development tool identifies a link error (step 4122) because object-oriented programming rules allow a class to inherit from another class, but not an interface, or to implement from an interface, but not another class.

Figure 44:
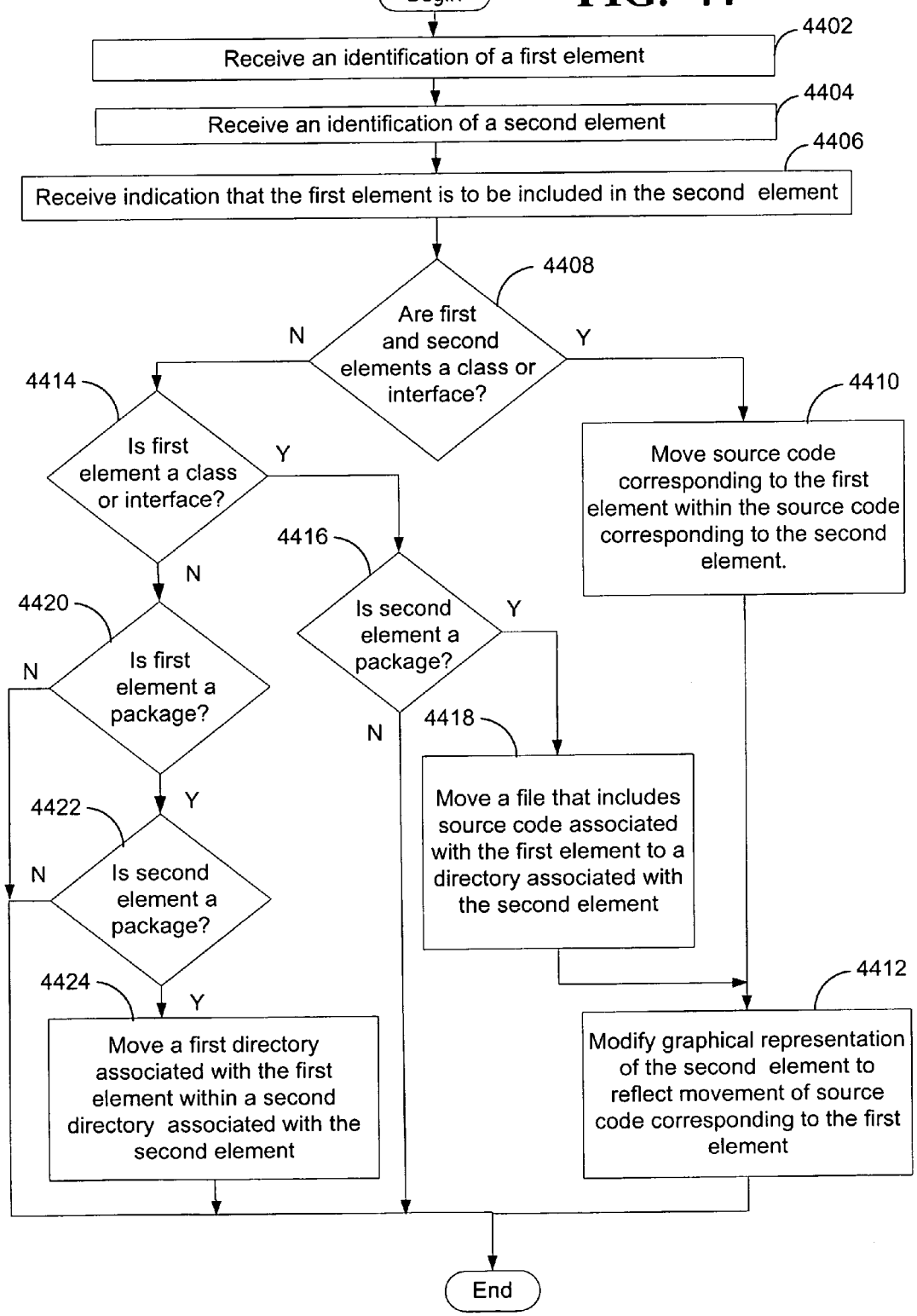
FIG. 44 depicts a flow chart of the process performed by the software development tool in FIG. 2 for moving source code associated with a source element into source code of a destination element.

To further aid a programmer in developing source code for a software project, the software development tool performs the exemplary process depicted in FIG. 44 to move source code associated with a source element into source code of a destination element. By performing this process the software development tool allows a programmer to nest a first object-oriented element, such as a class or interface, within a second object-oriented element without having to manually open and edit the respective files for each object-oriented element as described below. Thus, for example, a programmer can automatically combine a first class within a related second class to easily manage and organize software in a project and to more easily allow other programmers to access or use the source code associated with the combined classes. Similarly, the software development tool performs the exemplary process, depicted in FIG. 49, to remove source code associated with a source element from within a destination element. By performing this process the software development tool allows a user or programmer to remove a first object-oriented element, such as a class or interface, from a second object-oriented element, where source code associated with the source element is nested within source code associated with the destination element. Thus, for example, a programmer can automatically remove a first class nested within a second class to separate unrelated functionality between the first and second classes that has become apparent to the programmer during the development of the first and second classes.

FIG. 44 depicts a flow chart of the process performed by the software development tool for moving source code associated with a source element into source code of a destination element. To move source code in this manner, the software development tool receives an identification of the source element (step 4402). The software development tool also receives an identification of the destination element (step 4404). In one implementation shown in FIG. 45, the software development tool may receive the identification of the source element via a programmer selecting a first diagram 4506 associated with the source element on the graphical form 4502, and may receive the identification of the destination element via the programmer dragging the first diagram over a second diagram 4508 associated with the destination element. It is also contemplated that the software development tool may receive the identification of the source element or the destination element via a programmer selecting source code associated with the respective source or destination element when in view on the textual form 4504.

Figure 45:
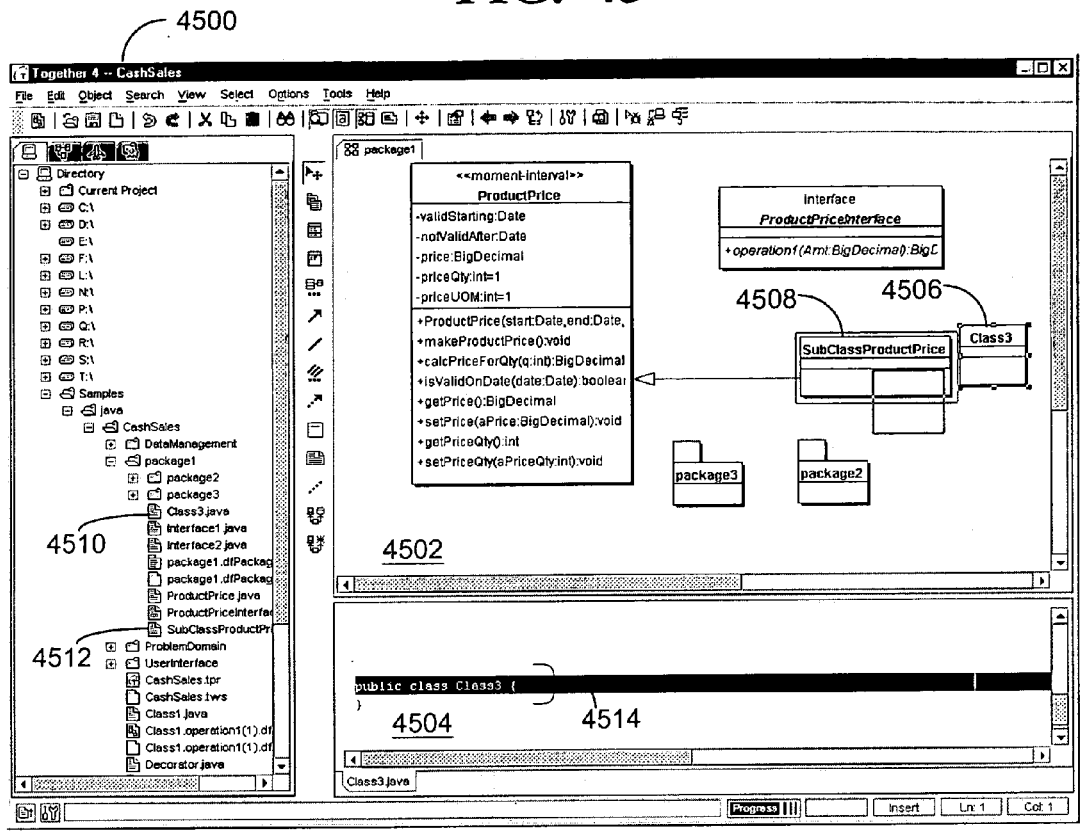
FIG. 45 depicts an exemplary user interface displayed by the software development tool depicted in FIG. 2, where the user interface displays an identification of the source element and an identification of the destination element.

The software development tool also receives an indication or request that the source element is to be moved within the destination element (step 4406). In one implementation, the software development tool receives the indication to move the source element into the destination element via a programmer completing the action of dragging and dropping the first diagram 4506 associated with the source element on the second diagram 4508 associated with the destination element as shown in FIG. 45. It is also contemplated that the software development tool may receive the indication to move the source element into the destination element via a programmer actuating a button on the user interface 4500, selecting a choice on a pull-down or speed menu (not shown) on the user interface 4500, or other known programming techniques for receiving inputs.

Next, the software development tool determines whether the source and the destination elements are either a class or an interface (step 4408). A class and an interface are known object-oriented elements that have source code which may be moved into another class or interface. As previously discussed, the software development tool may determine whether an identified element is a class or interface by invoking the TMM 200 to correlate the selected or identified diagram (or display coordinates for the identified diagram) to the corresponding element in a file in the software project. For example, the software development tool determines that the first diagram 4506 corresponds to source code 4514 for the source element (named "Class3") that is stored in a first file 4510 ("Class3.java") in the software project. Similarly, the software development tool determines that the second diagram 4506 corresponds to source code (not shown in FIG. 45) for the destination element (named "SubClassProductPrice") that is stored in a second file 4512 ("SubClassProductPrice.java") in the software project.

Figure 46:
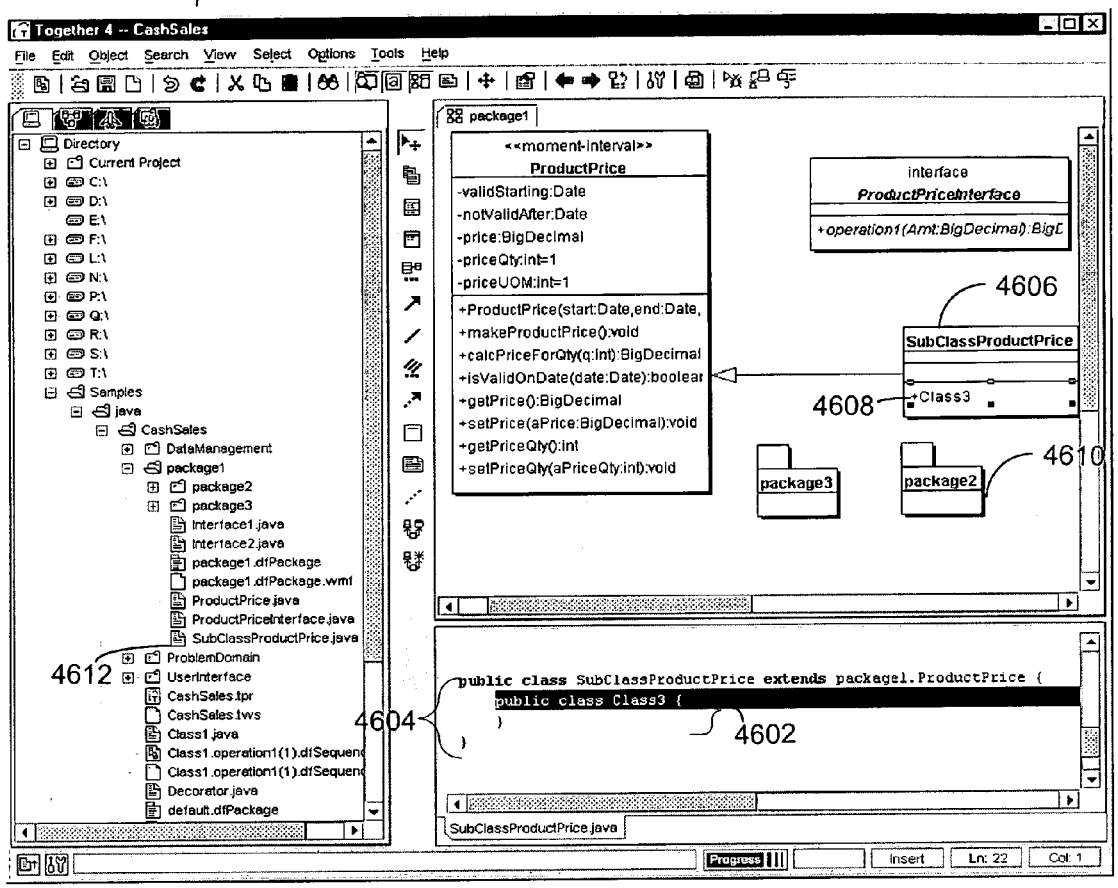
FIG. 46 depicts an exemplary user interface displayed by the software development tool in FIG. 2 after moving the source code corresponding to the source element within the source code corresponding to the destination element.

When it is determined that both the source and destination elements are a class or an interface, the software development tool moves the source code corresponding to the source element 4602 within the source code corresponding to the destination element 4604 (step 4410) as shown in FIG. 46. In performing this step, the software development tool copies the source code corresponding to the source element from the first file 4510 and properly inserts or nests it into the source code corresponding to the destination element that is contained in the second file 4512. The software development tool then deletes the first file 4510 as is apparent from the user screen 4600 in FIG. 46, displayed by the software development tool after performing step 4410.

Figure 47:
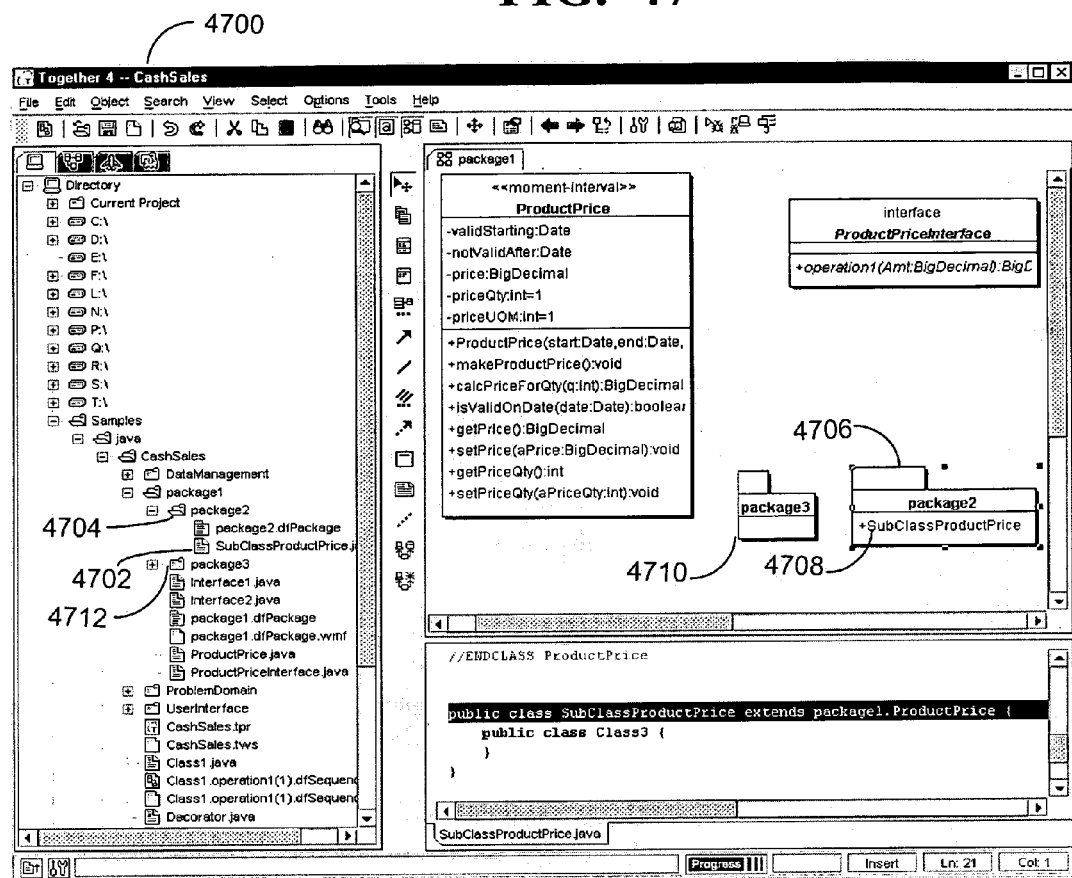
FIG. 47 depicts an exemplary user interface displayed by the software development tool in FIG. 2 after moving a first file associated with the source element within the directory associated with the destination element that is a package.

The software development tool also modifies the graphical representation of the destination element to reflect the movement of the source code corresponding to the source element into the destination element (step 4412). For example, in FIG. 46, the software development tool modifies the second diagram 4606 that graphically represents the source code of the destination element to include a notation 4608, "+Class3," to reflect that the source code corresponding to the source element is nested within the source code of the destination element. As known to those skilled in the art, the notation 4608 may be abbreviated and be positioned on or near the second diagram 4606 to convey the movement of the source element When it is determined that both the source and destination elements are not a class or an interface, the software development tool determines whether the source element is a class or an interface (step 4414). When it is determined that the source element is a class or an interface, the software development tool knows that the destination element is not a class or an interface so the software development tool determines whether the destination element is a package. When it is determined that the destination element is a package, the software development tool moves the first file that includes the source code associated with the source element within a directory associated with the destination element (step 4418). While a package does not include source code except to the extent related classes or interfaces are included in a directory associated with the package, a package may be used in object-oriented programming to import a related class or a related interface into an unrelated class. Therefore, the software development tool advantageously aids a programmer to organize and relate the source element with a selected package by performing the process depicted in FIG. 44. For example, assuming the source element identified to be moved in accordance with this invention is associated with the first diagram 4606 and the destination element identified is associated with the second diagram 4610, the software development tool may then display the exemplary user interface 4700 in FIG. 47 based on the determination that the source element is the class named "SubClassProductPrice" and the destination element is the package named "Package2." As shown in FIG. 47, the software development tool moves the first file 4702 associated with the source element within the directory 4704 associated with the destination element, "Package2."

In addition, the software development tool also modifies the graphical representation of the destination element to reflect the movement of the source code corresponding to the source element into the destination element (step 4412). For example, as shown in FIG. 47, the software development tool modifies the second diagram 4706 that graphically represents the destination element, "Package2," to include a notation 4708, "+SubClassProductPrice" to reflect that the first file 4702 that includes source code corresponding to the source element is moved within the directory 4704 corresponding to the destination element, "Package2."

Figure 48:
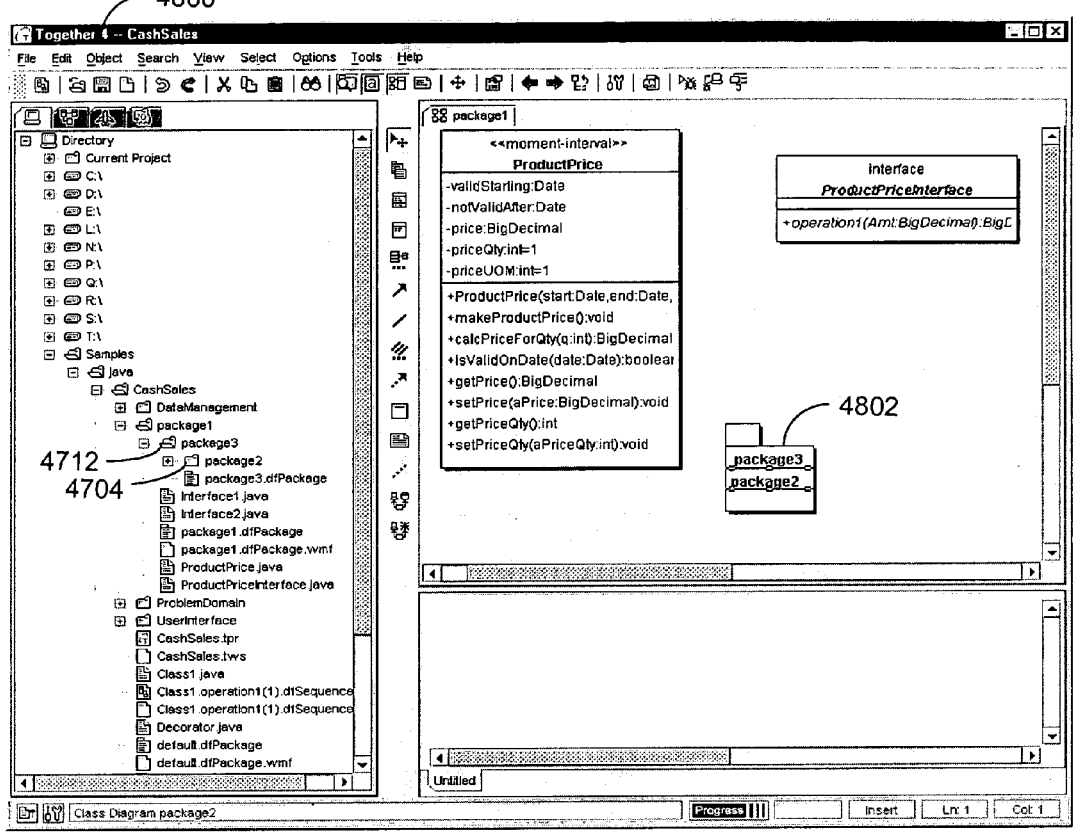
FIG. 48 depicts an exemplary user interface displayed by the software development tool in FIG. 2 after moving a first directory associated with a source element within the second directory associated with the destination element when it is determined that both elements are packages.

When it is determined that the source element is not a class or an interface, the software development tool knows that neither the source nor the destination element is a class or an interface. The software development tool then determines whether the source element is a package (step 4420). When it is determined that the source element is a package, the software development tool next determines whether the destination element is also a package (step 4422). When it is determined that the destination element is a package, the software development tool moves a first directory associated with the source element within a second directory associated with the destination element. For example, assuming that first diagram 4606 and second diagram 4610 graphically depict the source and destination elements, respectively, the software development tool 110 displays the exemplary user interface 4800 in FIG. 48 upon determining that the source and the destination elements are packages. As shown in FIG. 48, the software development tool 110 moves the first directory 4704 within the second directory 4712. Thus, a programmer can diagrammatically move a first package within a second package to allow another programmer to access all classes and interfaces contained within both packages by importing only the second package.

Figure 49:
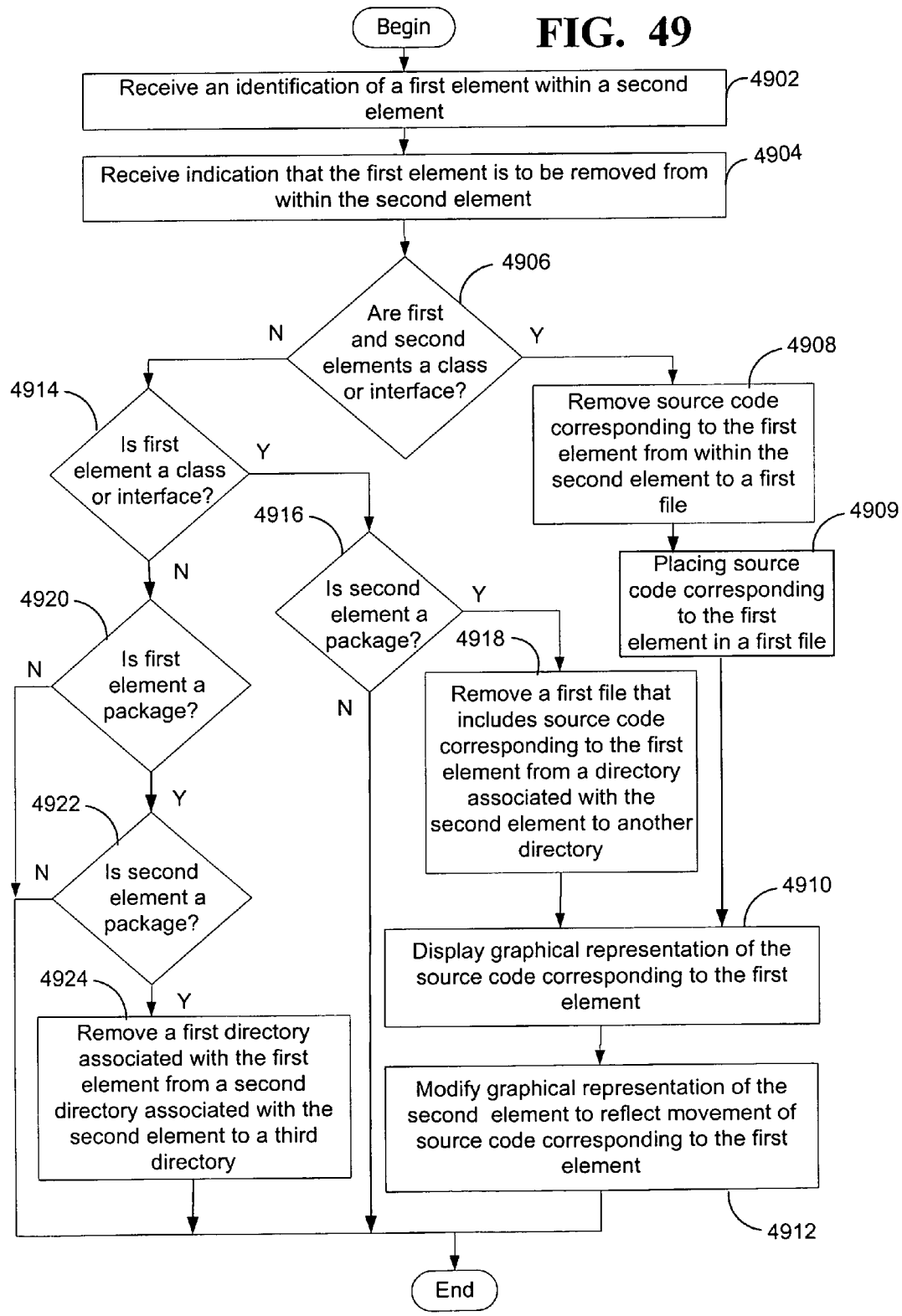
FIG. 49 depicts a flow of the process performed by the software development tool in FIG. 2 for removing source code associated with a source element from within source code of a destination element.

FIG. 49 depicts a flow chart illustrating an exemplary process performed by the software development tool for removing source code associated with a source element from within source code of a destination element. To remove source code associated with a source element from within a destination element, the software development tool receives an identification of a source element within a destination element (step 4902). In one implementation, the software development tool may receive the identification of the source element via a programmer selecting a graphical notation 5006 displayed by the software development tool in association with a diagram 5008 that graphically represents the source code corresponding to the destination element. The graphical notation 5006 represents the source code of the source element that is within the source code of the destination element. Therefore, the software development tool receives the identification of both the source element and the destination element when a programmer selects the graphical notation 5006. It is also contemplated that the software development tool may receive the identification of the source element and the destination element via a programmer selecting source code associated with the source element within the source code of the destination element when in view on the textual form 5004.

Figure 50:
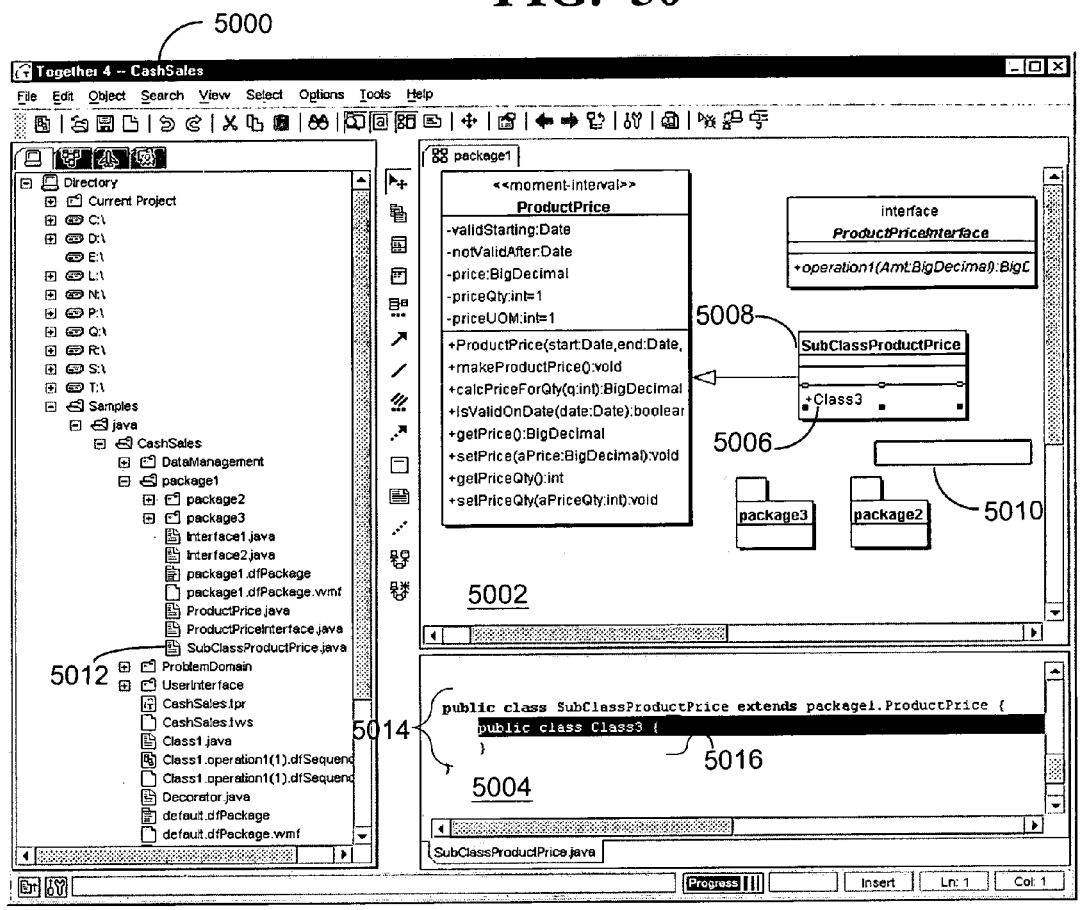
FIG. 50 depicts an exemplary user interface displayed by the software development tool depicted in FIG. 2, where the user interface displays an identification of the source element and an identification of the destination element.

The software development tool also receives an indication or request that the source element is to be removed from within the destination element (step 4904). In one implementation, the software development tool receives the indication to remove the source element from the destination element via a programmer completing the action of dragging and dropping the notation 5006 associated with the source element on an unoccupied area 5010 of the graphical form 5002 as shown in FIG. 50. It is also contemplated that the software development tool may receive the indication to move the source element into the destination element via a programmer actuating a button on the user interface 5000, selecting a choice on a pull-down or speed menu (not shown) on the user interface 5000, or other known programming techniques for receiving inputs.

Next, the software development tool determines whether the source and the destination elements are either a class or an interface (step 4906). The software development tool may determine whether the destination element is a class or interface by invoking the TMM 200 to correlate the selected diagram 5008 (or display coordinates for the diagram 5008) to the corresponding source code of the destination element that is language neutrally represented in the TMM 200. By identifying the destination element in this manner, the software development tool may identify a second file 5012 in the software project that includes the source code 5014 of the destination element. Similarly, the software development tool may determine whether the destination element is a class or interface by invoking the TMM 200 to correlate the graphical notation 5006 displayed in association with the selected diagram 5008 to the corresponding source code of the source element that resides within the source code of the destination element. For example, the software development tool determines that the second diagram 5008 corresponds to source code 5014 for the destination element (named "SubClassProductPrice") that is stored in the second file 5012 ("SubClassProductPrice.java") in the software project. Similarly, the software development tool determines that the graphical notation 5006 corresponds to source code 5016 for the source element (named "Class3") that is nested within the source code 5014 of the destination element.

Figure 51:
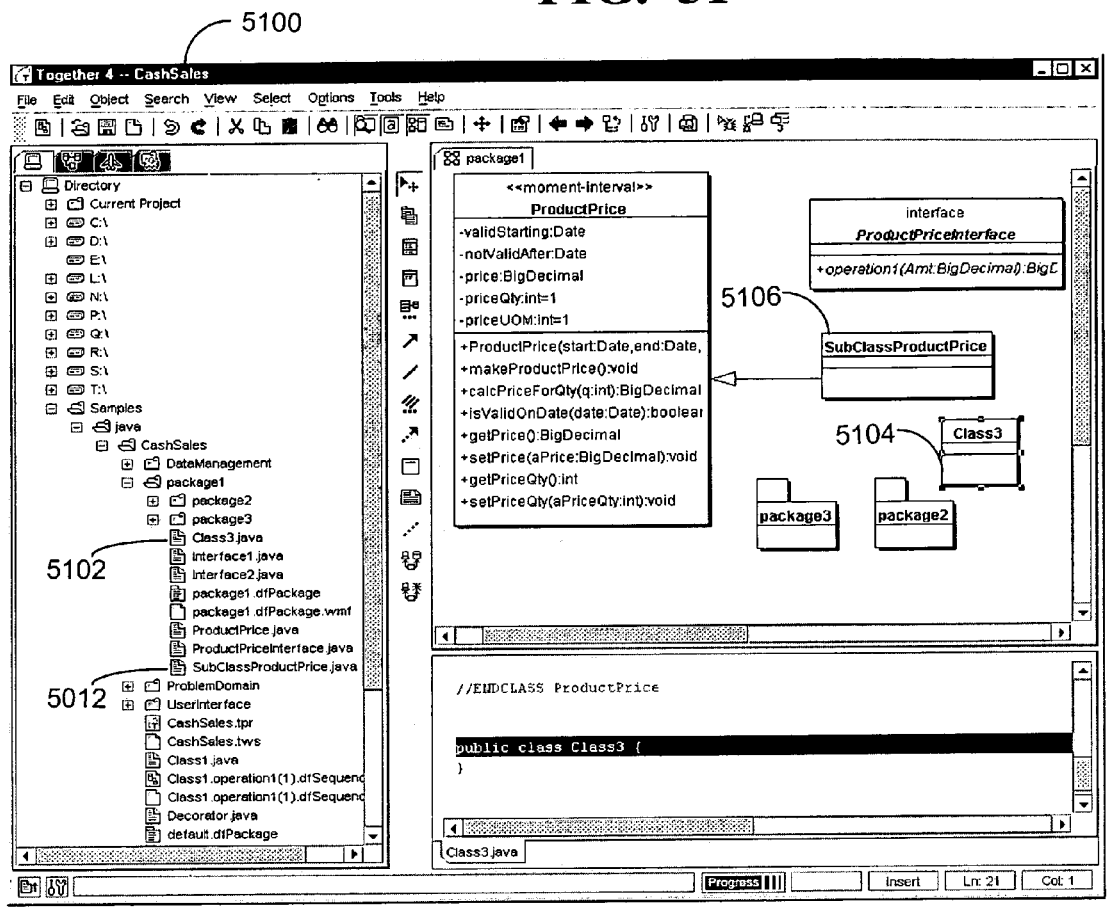
FIG. 51 depicts an exemplary user interface displayed by the software development tool in FIG. 2 after removing the source code corresponding to the source element from within the source code corresponding to the destination element.
Figure 52:
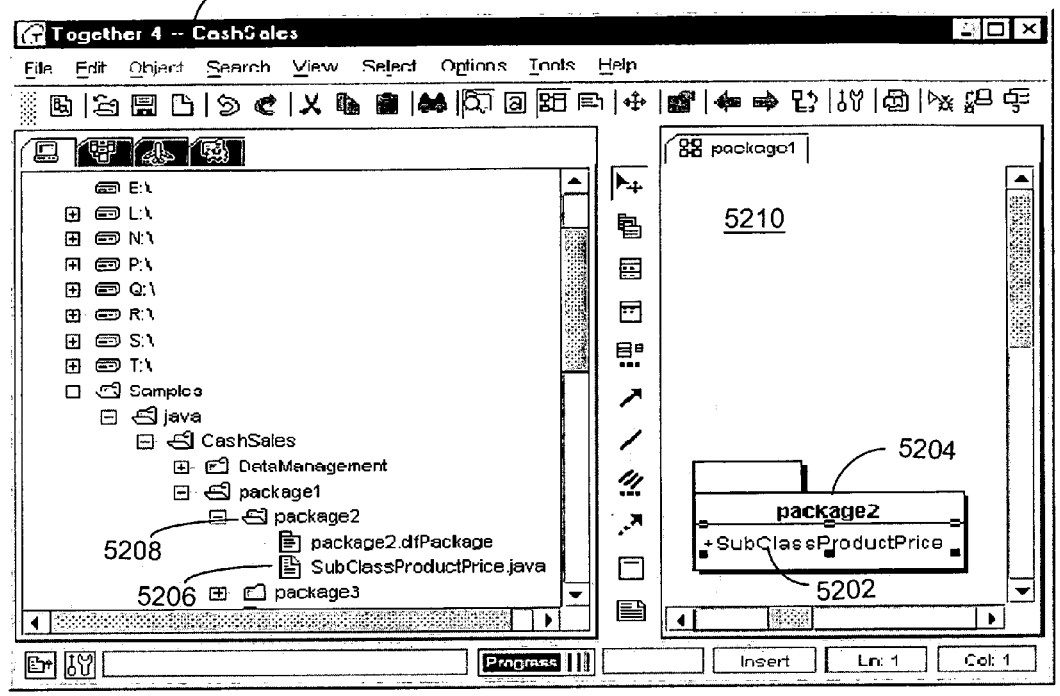
FIG. 52 depicts an exemplary user interface displayed by the software development tool depicted in FIG. 2, where the user interface displays an identification of the source element and an identification of the destination element.

When it is determined that both the source and destination elements are a class or an interface, the software development tool removes the source code corresponding to the source element 5016 from within the source code corresponding to the destination element 5014 (step 4908) as shown in FIG. 50 and FIG. 51. To remove the source code corresponding to the source element 5016, the software development tool may open the second file 5012, search for the source element, and remove source code corresponding to the source element. The software development tool displays the user interface 5100 in FIG. 51 after removal of the source element from within the destination element. Once the source code for the source element is removed, the software development tool stores the source code of the source element 5016 within a first file 5102 (step 4909).

The software development tool also displays a graphical representation of the source code corresponding to the source element (step 4910), and modifies the graphical representation of the destination element to reflect the movement of the source code corresponding to the source element (step 4912). For example, the software development tool displays the first diagram 5104 to graphically represent the source code of the source element, named "Class3.". The software development tool modifies the graphical representation of the source code of the destination element by redisplaying the second diagram 5106 without the notation 5006 to reflect that the source code corresponding to the source element is not within the source code of the destination element. As part of performing step 4910, the software development tool updates the TMM 200 by using parser 706 to read the first file 5102 and the modified second file 5012 such that the TMM 200 holds a current language neutral representation of both the source and the destination elements.

Returning to FIG. 49, when it is determined that both the source and destination elements are not a class or an interface, the software development tool determines whether the source element is a class or an interface (step 4914). When it is determined that the source element is a class or an interface, the software development tool knows that the destination element is not a class or an interface. The software development tool then determines whether the destination element is a package (step 4916). It is contemplated that step 4916 may not be performed when the source element, identified as a class or an interface, would not reside in a repository other than a directory associated with a package.

Figure 53:
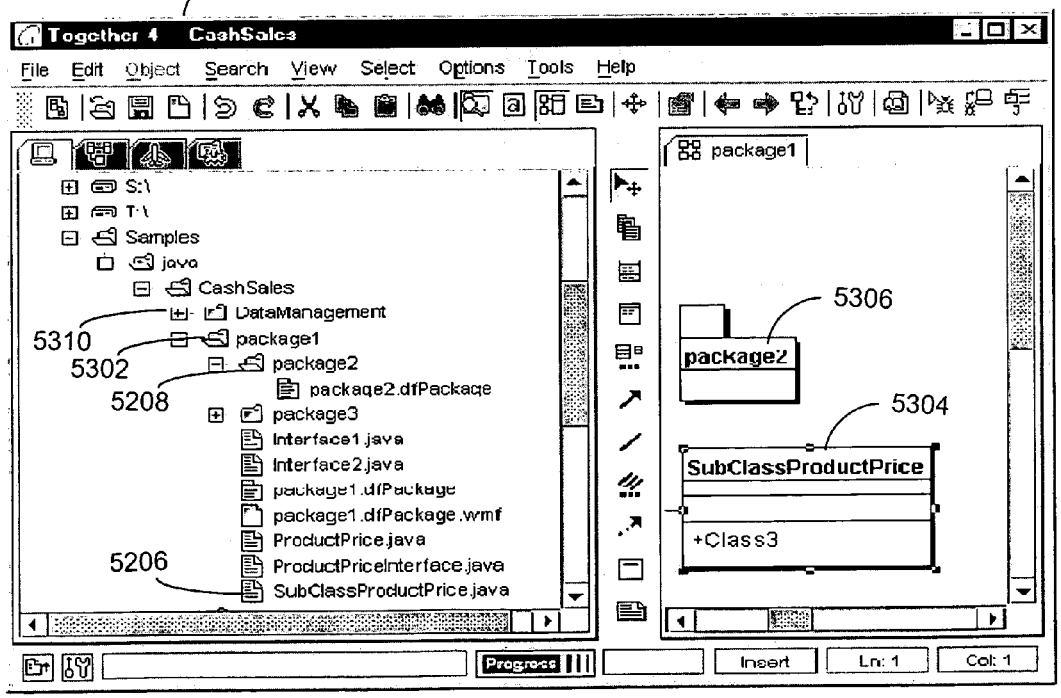
FIG. 53 depicts an exemplary user interface displayed by the software development tool in FIG. 2 after removing a first file associated with the source element from within the directory associated with the destination element that is a package.

If the destination element is a package, the software development tool removes a first file that includes the source code associated with the source element from a directory associated with the destination element to another directory (step 4918). In one implementation depicted in FIG. 53, the software development tool removes the first file 5206 from a directory 5208 to another directory 5302 based on a programmer completing the action of dragging and dropping the notation 5202 associated with the source element on an unoccupied area of the graphical form 5210. In this implementation, the other directory 5302 includes the directory 5208 associated with the destination element ("Package2") and the first file 5206. However, it is contemplated that the software development tool may remove the first file 5206 to another directory, such as the directory 5310 ("DataManagement" package) based on a programmer dragging and dropping the notation 5202 on a symbol associated with directory 5310. Thus, a programmer that finds the source element no longer relates to the destination element package can easily move the source element from the destination element package to another package to group the source element with classes or interfaces that are more related to the source element.

The software development tool also displays a graphical representation of the source code corresponding to the source element (step 4910), and modifies the graphical representation of the destination element to reflect the movement of the source code corresponding to the source element (step 4912). For example, in FIG. 53 the software development tool displays the first diagram 5304 to graphically represent the source code of the source element, named "SubClassProductPrice," stored in the first file 5206. The software development tool modifies the graphical representation of the destination element, "Package2," by redisplaying the second diagram 5306 without the graphical notation 5202 to reflect that the first file 5206 is removed from the directory 5208 corresponding to the destination element, "Package2."

Figure 54:
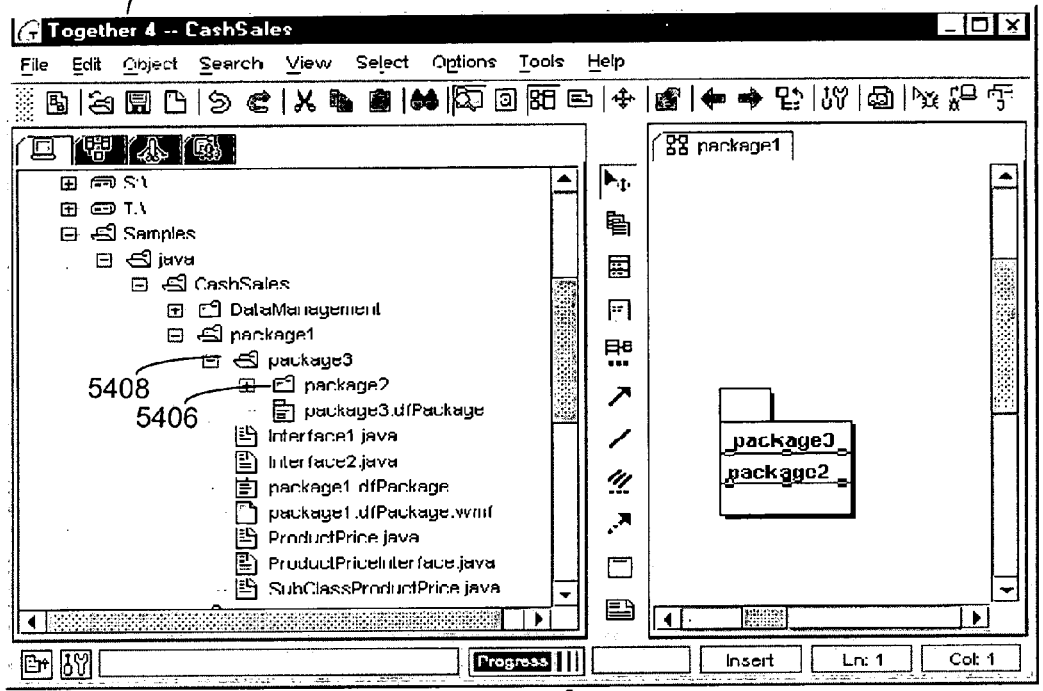
FIG. 54 depicts an exemplary user interface displayed by the software development tool depicted in FIG. 2, where the user interface displays an identification of the source element and an identification of the destination element.
Figure 55:
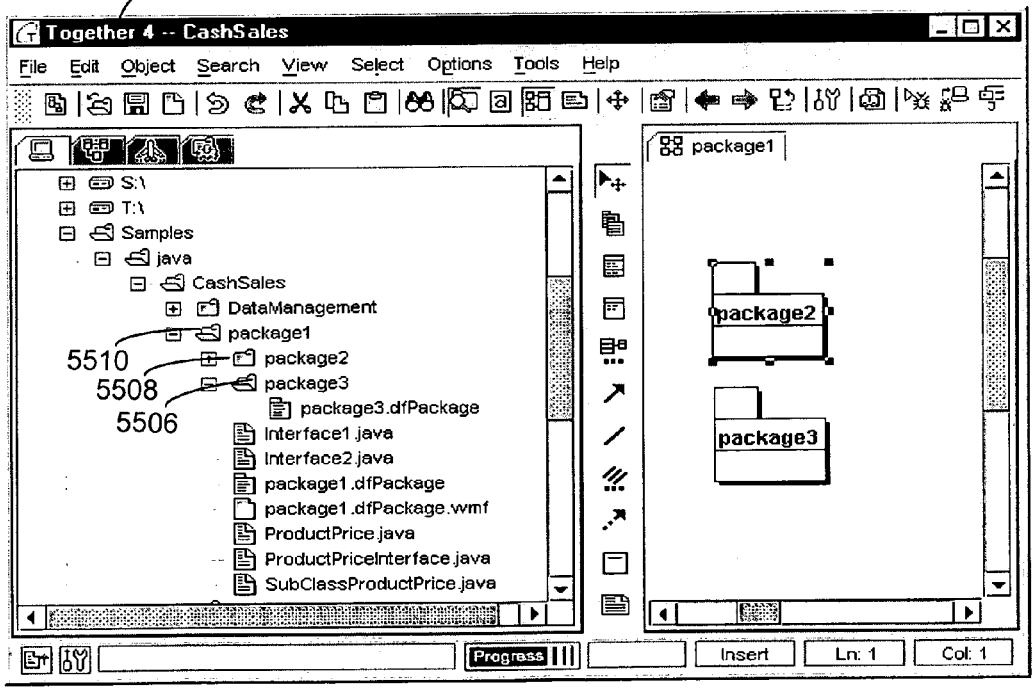
FIG. 55 depicts an exemplary user interface displayed by the software development tool in FIG. 2 after removing a first directory associated with a source element within the second directory associated with the destination element when it is determined that both elements are packages.

As illustrated in FIGS. 54 and 55, when it is determined that the source element is not a class or an interface, the software development tool knows that neither the source nor the destination element is a class or an interface. The software development tool then determines whether the source element is a package (step 4920). When it is determined that the source element is a package, the software development tool next determines whether the destination element is also a package (step 4922). When it is determined that the destination element is a package, the software development tool removes a directory associated with the source element from within a second directory associated with the destination element to a third directory.

While various embodiments of the present invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a data processing system including a software development project having a plurality of elements, each element having corresponding code stored in a source code file that includes names and a graphical representation stored in a graphical view file that includes symbols having display coordinates, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including a first element and second element by using the names and display coordinates correlated by the transient meta model;

receiving a request to form a link;

receiving an indication of a first of the plurality of elements;

receiving an indication of a second of the plurality of elements; and in response to receiving the request, the indication of the first element, and the indication of the second element, generating new code independent of the graphical representation and adding the new code to the first element to reflect the link to the second element and modifying the graphical representation of the code associated with the first element to reflect the link to the second element.

2. The method of claim 1, wherein the step of adding new code to the first element comprises the steps of:
determining whether linking the first element to the second element would violate a predefined rule; and
when it is determined that linking the first element to the second element would not violate a predefined rule,
adding the new code to the first element to form the link to the second element.

3. The method of claim 2, wherein the step of determining whether linking the first element to the second element would violate a predefined rule comprises the steps of:
determining whether the first element is a class and whether the second element is another class; and
when it is determined that the first element is the class and that the second element is the other class,
identifying the link from the first element to the second element as an inheritance link.

4. The method of claim 3, further comprising the step of identifying a link error when it is determined that the first element is the class and that the second element is not the other class.

5. The method of claim 2, wherein the step of determining whether linking the first element to the second element would violate a predefined rule comprises the steps of:
determining whether the first element is a class and whether the second element is an interface; and
when it is determined that the first element is the class and that the second element is the interface,
identifying the link from the first element to the second element as an implementation link.

6. The method of claim 5, further comprising the step of identifying a link error when it is determined that the first element is the class and that the second element is not the interface.

7. The method of claim 2, wherein the step of determining whether linking the first element to the second element would violate a predefined rule comprises the steps of:
determining whether the first element is an interface and the second element is another interface; and
when it is determined that the first element is the interface and the second element is the other interface,
identifying the link from the first element to the second element as an inheritance link.

8. The method of claim 7, further comprising the step of identifying a link error when it is determined that the first element is the interface and the second element is not the other interface.

9. A method in a data processing system including a software development program having a plurality of elements and having a link between two of the plurality of elements, wherein each element has corresponding code stored in a source code file that includes names along with a graphical representation stored in a graphical view file that includes symbols having display coordinates and the linked elements include a source and a destination, the method comprising the steps of:
generating a transient meta model that stores a language neutral representation of the source code;
reading the graphical view file into the transient meta model to correlate the names and display coordinates of each symbol of the corresponding source code file in the project;
displaying the graphical representation of the corresponding code of each of the plurality of elements including the source and the destination by using the names and display coordinates correlated by the transient meta model;
receiving an identification of the link;
receiving a selection of one of the linked elements;
receiving an identification of another of the plurality of elements that is different than the linked elements, wherein a graphical representation of the corresponding code of the other element is displayed;
determining whether the selected element is the destination; and
when it is determined that the selected element is the destination,
modifying the corresponding code of the other element independently of
the graphical representation in order to reflect a new link between the other element and the destination element and
modifying the graphical representation of the corresponding code of the other element to reflect the new link between the other element and the destination element.

10. The method of claim 9, wherein the modifying step further includes the step of modifying the corresponding code of the source to reflect the removal of the link between the source and the destination.

11. The method of claim 9, wherein the modifying step includes the steps of:
determining whether linking the other element to the destination would violate a predefined rule; and
when it is determined that linking the other element to the destination would not violate a predefined rule,
modifying the corresponding code of the source to reflect the removal of the link between the source and the destination; and
adding new code to the corresponding code of the other element to reflect the new link between the other element and the destination element.

12. The method of claim 11, wherein the step of determining whether linking the other element to the destination would violate a predefined rule, comprises the steps of:
determining whether the other element is a class and whether the destination is another class; and
when it is determined that the other element is the class and that the destination is the other class,
identifying the new link between the other element and the destination as an inheritance link.

13. The method of claim 11, wherein the step of determining whether linking the other element to the destination would violate a predefined rule, comprises the steps of:
determining whether the other element is a class and whether the destination is an interface; and
when it is determined that the other element is the class and that the destination is the interface,
identifying the new link between the other element and the destination as an implementation link.

14. The method of claim 13, further comprising the step of identifying a link error when it is determined that the other element is the class and that the destination is not the interface.

15. The method of claim 11, wherein the step of determining whether linking the other element to the destination would violate a predefined rule, comprises the steps of:
determining whether the other element is an interface and the destination is another interface; and
when it is determined that the other element is the interface and the destination is the other interface, identifying the new link between the other element and the destination as an inheritance link.

16. The method of claim 15, further comprising the step of identifying a link error when it is determined that the other element is not the interface.

17. The method of claim 15, further comprising the step of identifying a link error when it is determined that the destination is not the other interface.

18. A method in a data processing system including a software development project having a plurality of elements and having a link between two of the plurality of elements, wherein each element has corresponding code stored in a source code file that includes names along with a graphical representation stored in a graphical view file that includes symbols having display coordinates and the linked elements include a source and a destination, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including the source and destination by using the names and display coordinates correlated by the transient meta model;

receiving an identification of the link;

receiving a selection of one of the linked elements;

receiving an identification of another of the plurality of elements that is different than the linked elements, wherein a graphical representation of the corresponding code of the other element is displayed;

determining whether the selected element is the source; and when it is determined that the selected element is the source, modifying the corresponding code of the source independently of the graphical representation in order to reflect a new link between the source and the other element and modifying the graphical representation of the corresponding code of the source element to reflect the new link between the source element and the other element.

19. The method of claim 18, further comprising the steps of:

when it is determined that the selected element is the source, determining whether linking the source to the other element would violate a predefined rule; and when it is determined that linking the source to the other element would not violate a predefined rule, modifying the corresponding code of the source to reflect the removal of the link between the source and the destination; and adding new code to the corresponding code of the source to reflect the new link to the other element.

20. The method of claim 19, wherein the step of determining whether linking the source to the other element would violate a predefined rule, comprises the steps of:

determining whether the source is a class and whether the other element is another class; and when it is determined that the source is the class and that the other element is the other class, identifying the new link between the source and the other element as an inheritance link.

21. The method of claim 19, wherein the step of determining whether linking the source to the other element would violate a predefined rule, comprises the steps of:

determining whether the source is a class and whether the other element is an interface; and when it is determined that the source is the class and that the other element is the interface, identifying the new link from the source to the other element as an implementation link.

22. The method of claim 21, further comprising the step of identifying a link error when it is determined that the other element is not the interface.

23. The method of claim 19, wherein the step of determining whether linking the source to the other element would violate a predefined rule, comprises the steps of:

determining whether the source is an interface and the other element is another interface; and when it is determined that the source is the interface and the other element is the other interface, identifying the new link between the source and the other element as an inheritance link.

24. The method of claim 23, further comprising the step of identifying a link error when it is determined that the source is not the interface.

25. The method of claim 23, further comprising the step of identifying a link error when it is determined that the other element is not the other interface.

26. The method of claim 18, further comprising the step of modifying the code corresponding to the source to reflect the removal of the link to the destination.

27. The method of claim 26, further comprising the step of modifying the graphical representation of the corresponding code of the source to reflect the removal of the link between the source and the destination.

28. The method of claim 26, further comprising the step of modifying the graphical representation of the code corresponding the source to reflect the removal of the link to the destination.

29. A method in a data processing system including a software development project having a plurality of elements having a graphical representation stored in a graphical view file that includes symbols having display coordinates and a corresponding code stored in a source code file that includes names, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including a first and second element by using the names and display coordinates correlated by the transient meta model;

receiving an identification of a first of the plurality of elements;

receiving an identification of a second of the plurality of elements;

receiving an indication that the first element is to be included in the second element;

determining whether the inclusion of the first element in the second element would violate a predefined rule; and when it is determined that the inclusion of the first element in the second element would not violate a predefined rule, transferring the code corresponding to the first element into the second element, wherein said code transfer occurs independently of the graphical representation and modifying the graphical representation of the code of the second element to reflect the transfer of the code corresponding to the first element into the second element.

30. The method of claim 29, wherein the step of transferring code comprises the steps of:

removing the code corresponding to the first element from a file;

placing the code corresponding to the first element within the code corresponding to the second element; and deleting the file corresponding to the first element.

31. The method of claim 29, wherein the method further comprises the steps of:

when it is determined that the first element is the class and that the second element is not another class, determining whether the second element is a package; and when it is determined that the second element is a package, moving a file that includes code corresponding to the first element to a directory associated with the second element.

32. A method in a data processing system including a software development project having a plurality of elements, each element having corresponding code stored in a source code file that includes names and a graphical representation stored in a graphical view file that includes symbols having display coordinates, wherein code corresponding to a first of the plurality of elements is nested in the code corresponding to a second of the plurality of elements, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including the first element and the second element by using the names and display coordinates correlated by the transient meta model;

receiving an indication that the first element is to be removed from the second element;

determining whether the removal of the first element from the second element would not violate a predefined rule; and when it is determined that the removal of the first element from the second element would not violate a predefined rule, removing code corresponding to the first element from the second element, wherein said code removal occurs independently of the graphical representation and modifying the graphical representation of the code corresponding to the second element to reflect the removal of the first element from the second element.

33. The method of claim 32, further comprising the step of placing the code corresponding to the first element into a file.

34. The method of claim 32, further comprising the steps of:

when it is determined that the first element is a class and that the second element is not another class, determining whether the second element is a package; and when it is determined that the second element is a package, removing a first file that includes code corresponding to the first element from a directory associated with the second element and placing the first file in another directory.

35. A computer-readable medium containing instructions for controlling a data processing system to perform a method, the data processing system including a software development project having a plurality of elements, each element having corresponding code stored in a source code file that includes names and a graphical representation stored in a graphical view file that includes symbols having display coordinates, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including the first element and the second element by using the names and display coordinates correlated by the transient meta model;

receiving a request to form a link;

receiving an indication of a first of the plurality of elements;

receiving an indication of a second of the plurality of elements; and in response to receiving the request, the indication of the first element, and the indication of the second element, generating new code independent of the graphical representation and adding the new code to the first element to reflect the link to the second element and modifying the graphical representation of the code associated with the first element to reflect the link to the second element.

36. The computer-readable medium of claim 35, wherein the step of adding new code to the first element comprises the steps of:

determining whether linking the first element to the second element would violate a predefined rule; and when it is determined that linking the first element to the second element would not violate a predefined rule, adding the new code to the first element to form the link to the second element.

37. The computer-readable medium of claim 36, wherein the step of determining whether linking the first element to the second element would violate a predefined rule comprises the steps of:

determining whether the first element is a class and whether the second element is another class; and when it is determined that the first element is the class and that the second element is the other class, identifying the link from the first element to the second element as an inheritance link.

38. The computer-readable medium of claim 37, wherein the method further comprises the step of identifying a link error when it is determined that the first element is the class and that the second element is not the other class.

39. The computer-readable medium of claim 36, wherein the step of determining whether linking the first element to the second element would violate a predefined rule comprises the steps of:

determining whether the first element is a class and whether the second element is an interface; and when it is determined that the first element is the class and that the second element is the interface, identifying the link from the first element to the second element as an implementation link.

40. The computer-readable medium of claim 39, wherein the method further comprises the step of identifying a link error when it is determined that the first element is the class and that the second element is not the interface.

41. The computer-readable medium of claim 36, wherein the step of determining whether linking the first element to the second element would violate a predefined rule comprises the steps of:

determining whether the first element is an interface and the second element is another interface; and when it is determined that the first element is the interface and the second element is the other interface, identifying the link from the first element to the second element as an inheritance link.

42. The computer-readable medium of claim 41, wherein the method further comprises the step of identifying a link error when it is determined that the first element is the interface and the second element is not the other interface.

43. A computer-readable medium containing instructions for controlling a data processing system to perform a method, the data processing system including a software development project having a plurality of elements and having a link between two of the plurality of elements, wherein each element has corresponding code stored in a source code file that includes names along with a graphical representation stored in a graphical view file that includes symbols having display coordinates and the linked elements include a source and a destination, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including the source and destination by using the names and display coordinates correlated by the transient meta model;

receiving an identification of the link;

receiving a selection of one of the linked elements;

receiving an identification of another of the plurality of elements that is different than the linked elements, wherein a graphical representation of the corresponding code of the other element is displayed;

determining whether the selected element is the destination; and when it is determined that the selected element is the destination, modifying the corresponding code of the other element independently of the graphical representation in order to reflect a new link between the other element and the destination element and modifying the graphical representation of the corresponding code of the other element to reflect the new link between the other element and the destination element.

44. The computer-readable medium of claim 43, wherein the modifying step further includes the step of modifying the corresponding code of the source to reflect the removal of the link between the source and the destination.

45. The computer-readable medium of claim 43, wherein the method further comprises the step of modifying the graphical representation of the corresponding code of the source to reflect the removal of the link between the source and the destination.

46. The computer-readable medium of claim 43, wherein the modifying step includes the steps of:

determining whether linking the other element to the destination would violate a predefined rule; and when it is determined that linking the other element to the destination would not violate a predefined rule, modifying the corresponding code of the source to reflect the removal of the link between the source and the destination; and adding new code to the corresponding code of the other element to reflect the new link between the other element and the destination element.

47. The computer-readable medium of claim 46, wherein the step of determining whether linking the other element to the destination would violate a predefined rule, comprises the steps of:

determining whether the other element is a class and whether the destination is another class; and when it is determined that the other element is the class and that the destination is the other class, identifying the new link between the other element and the destination as an inheritance link.

48. The computer-readable medium of claim 46, wherein the step of determining whether linking the other element to the destination would violate a predefined rule, comprises the steps of:

determining whether the other element is a class and whether the destination is an interface; and when it is determined that the other element is the class and that the destination is the interface, identifying the new link between the other element and the destination as an implementation link.

49. The computer-readable medium of claim 48, wherein the method further comprises the step of identifying a link error when it is determined that the other element is the class and that the destination is not the interface.

50. The computer-readable medium of claim 46, wherein the step of determining whether linking the other element to the destination would violate a predefined rule, comprises the steps of:

determining whether the other element is an interface and the destination is another interface; and when it is determined that the other element is the interface and the destination is the other interface, identifying the new link between the other element and the destination as an inheritance link.

51. The computer-readable medium of claim 50, wherein the method further comprises the step of identifying a link error when it is determined that the other element is not the interface.

52. The computer-readable medium of claim 50, wherein the method further comprises the step of identifying a link error when it is determined that the destination is not the other interface.

53. A computer-readable medium containing instructions for controlling a data processing system to perform a method, the data processing system including a software development project having a plurality of elements and having a link between two of the plurality of elements, wherein each element has corresponding code stored in a source code file that includes names along with a graphical representation stored in a graphical view file that includes symbols having display coordinates and the linked elements include a source and a destination, the method comprising the steps of:

generating a transient meta model that stores a language neutral representation of the source code;

reading the graphical view file into the transient meta model to correlate the names and display coordinates of each symbol of the corresponding source code in the project;

displaying the graphical representation of the corresponding code of each of the plurality of elements including the source and destination by using the names and display coordinates correlated by the transient meta model;

receiving an identification of the link;

receiving a selection of one of the linked elements;

receiving an identification of another of the plurality of elements that is different than the linked elements, wherein a graphical representation of the corresponding code of the other element is displayed;

determining whether the selected element is the source; and when it is determined that the selected element is the source, modifying the corresponding code of the source independently of the graphical representation in order to reflect a new link between the source and the other element and modifying the graphical representation of the corresponding code of the source to reflect the new link between the source and the other element.

54. The computer-readable medium of claim 53, wherein the method further comprises the steps of:

when it is determined that the selected element is the source, determining whether linking the source to the other element would violate a predefined rule; and when it is determined that linking the source to the other element would not violate a predefined rule, modifying the corresponding code of the source to reflect the removal of the link between the source and the destination; and adding new code to the corresponding code of the source to reflect the new link to the other element.

55. The computer-readable medium of claim 54, wherein the step of determining whether linking the source to the other element would violate a predefined rule, comprises the steps of:

determining whether the source is a class and whether the other element is another class; and when it is determined that the source is the class and that the other element is the other class, identifying the new link between the source and the other element as an inheritance link.

56. The computer-readable medium of claim 54, wherein the step of determining whether linking the source to the other element would violate a predefined rule, comprises the steps of:

determining whether the source is a class and whether the other element is an interface; and when it is determined that the source is the class and that the other element is the interface, identifying the new link from the source to the other element as an implementation link.

57. The computer-readable medium of claim 56, wherein the method further comprises the step of identifying a link error when it is determined that the other element is not the interface.

58. The computer-readable medium of claim 54, wherein the step of determining whether linking the source to the other element would violate a predefined rule, comprises the steps of:

determining whether the source is an interface and the other element is another interface; and when it is determined that the source is the interface and the other element is the other interface, identifying the new link between the source and the other element as an inheritance link.

59. The computer-readable medium of claim 58, wherein the method further comprises the step of identifying a link error when it is determined that the source is not the interface.

60. The computer-readable medium of claim 58, wherein the method further comprises the step of identifying a link error when it is determined that the other element is not the other interface.

61. The computer-readable medium of claim 53, wherein the method further comprises the step of modifying the code corresponding to the source to reflect the removal of the link to the destination.

62. The computer-readable medium of claim 61, wherein the method further comprises the step of modifying the graphical representation of the code corresponding to the source to reflect the removal of the link to the destination.

63. A computer-readable medium containing instructions for controlling a data processing system to perform a method, the data processing system including a software development project having a plurality of elements having a graphical representation stored in a graphical view file that includes symbols having display coordinates and a corresponding code stored in a source code file that includes names, the method comprising the steps of:

generating a transient meta model that stores a language neutral representation of the source code;

reading the graphical view file into the transient meta model to correlate the names and display coordinates of each symbol of the corresponding source code file in the project;

displaying the graphical representation of the corresponding code of each of the plurality of elements including a first and second element by using the using the names and display coordinates correlated by the transient meta model;

receiving an identification of a first of the plurality of elements;

receiving an identification of a second of the plurality of elements;

receiving an indication that the first element is to be included in the second element;

determining whether the inclusion of the first element in the second element would violate a predefined rule; and when it is determined that the inclusion of the first element in the second element would not violate a predefined rule, transferring the code corresponding to the first element into the second element, wherein the code transfer occurs independently of the graphical representation and modifying the graphical representation of the code of the second element to reflect the transfer of the code corresponding to the first element into the second element.

64. The computer-readable medium of claim 63, wherein the step of transferring code comprises the steps of:
removing the code corresponding to the first element from a file corresponding to the second element;
placing the code corresponding to the first element within the code corresponding to the second element; and
deleting the file corresponding to the first element.

65. The computer-readable medium of claim 63, wherein the method further comprises the steps of:
when it is determined that the first element is the class and that the second element is not the other class,
determining whether the second element is a package; and
when it is determined that the second element is a package,
moving a file that includes code corresponding to the first element to a directory associated with the second element.

66. A computer-readable medium containing instructions for controlling a data processing system to perform a method, the data processing system including a software development project having a plurality of elements, each element having corresponding code stored in source code file that includes names and a graphical representation stored in a graphical view file that includes symbols and display coordinates, wherein code corresponding to a first of the plurality of elements is nested in the code corresponding to a second of the plurality of elements, the method comprising the steps of:
generating a transient meta model that stores a language neutral representation of the source code;
reading the graphical view file into the transient meta model to correlate the names and display coordinates of each symbol of the corresponding source code file in the project;
displaying the graphical representation of the corresponding code of each of the plurality of elements including the first element and the second element by using the names and display coordinates correlated by the transient meta model;
receiving an indication that the first element is to be removed from the second element;
determining whether the removal of the first element from the second element would violate a predefined rule; and
when it is determined that the removal of the first element from the second element would not violate a predefined rule,
removing the code corresponding to the first element from the second element, wherein the code removal occurs independently of the graphical representation and
modifying a graphical representation of the code corresponding to the second element to reflect the removal of the first element from the second element.

67. The computer-readable medium of claim 66, wherein the method further comprises the step of placing the code corresponding to the first element into a file.

68. The computer-readable medium of claim 66, wherein the method further comprises the steps of:
when it is determined that the first element is the class and that the second element is not another class,
determining whether the second element is a package; and when it is determined that the second element is a package, removing a first file that includes code corresponding to the first element from a directory associated with the second element and placing the first file in another directory.

69. A data processing system for developing a software project comprising:
a secondary storage device further comprising a plurality of elements, each element having corresponding code stored in a source file that includes names and a graphical representation stored in a graphical view file that includes symbols having display coordinates;
a memory device further comprising a program that generates a transient meta model that correlates the names and display coordinates of each symbol of the corresponding source code file in the project,
that displays the graphical representation of the corresponding code of each of the plurality of elements including a first element and a second element, by using the symbols and display coordinates correlated by the transient meta model,
that receives a request to form a link,
that receives an indication of a first of the plurality of elements,
that receives an indication of a second of the plurality of elements,
that determines whether linking the first element to the second element would violate a predefined rule,
that generates new code independent of the graphical representation and adds the new code to the first element to reflect the link to the second element when it is determined that linking the first element to the second element would not violate a predefined rule, and
that modifies the graphical representation of the code associated with the first element to reflect the link to the second element; and
a processor for running the program.

70. The data processing system of claim 69, wherein when the program determines whether linking the first element to the second element would violate a predefined rule, the program determines whether the first element is a class and whether the second element is another class, and when it is determined that the first element is the class and that the second element is the other class, the program identifies the link from the first element to the second element as an inheritance link.

71. The data processing system of claim 69, wherein when the program determines whether linking the first element to the second element would violate a predefined rule, the program determines whether the first element is a class and whether the second element is an interface, and when it is determined that the first element is the class and that the second element is the interface, the program identifies the link from the first element to the second element as an implementation link.

72. The data processing system of claim 69, wherein when the program determines whether linking the first element to second element would violate a predefined rule, the program determines whether the first element is an interface and the second element is another interface, and when it is determined that the first element is the interface and the second element is the other interface, the program identifies the link from the first element to the second element as an inheritance link.

73. The data processing system in claim 69, further comprising a language-neutral representation of the source code, wherein the language neutral representation of the source code is used to generate a graphical representation of the source code and a textual representation of the source code.

74. The data processing system in claim 73, wherein modifications to the textual representation of the source code will immediately modify the corresponding graphical representation of the source code and vice versa, thereby allowing simultaneous viewing of the textual and graphical representations of the source code.

75. The data processing system in claim 73, wherein the language neutral representation of the source code is generated from a multiplicity of programming languages.

76. The data processing system in claim 69, wherein the source code is used directly to generate a graphical representation of the source code and a textual representation of the source code.

77. The data processing in claim 76, wherein modifications to the textual representation of the source code will immediately modify the corresponding graphical representation of the source code and vice versa, thereby allowing simultaneous viewing of the textual and graphical representation of the source code.

78. The data processing system in claim 76, wherein the language neutral representation of the source code is generated from a multiplicity of programming languages.

79. A data processing system for developing a software project comprising:

a secondary storage device further comprising a plurality of elements and having a link between two of the plurality of elements, wherein each element has corresponding code stored in a source code file that includes names with a graphical representation stored in a graphical view file that includes symbols having display coordinates and the linked elements include a source and a destination;

a memory device further comprising a program that generates a transient meta model that correlates the symbols associated with the display coordinates, that displays the graphical representation of the corresponding code of each of the plurality of elements including the source and the destination by using the symbols and display coordinates correlated by the transient meta model, that receives a selection of one of the linked elements, that receives an identification of another of the plurality of elements that is different than the linked elements, wherein a graphical representation of the corresponding code of the other element is displayed, that determines whether the selected element is the destination, and that when it is determined that the selected element is the destination, generates new code independently of the graphical representation and adds the new code to the code corresponding to the other element to reflect the new link between the other element and the destination when it is determined that the selected element is the destination, removes a portion of the corresponding code of the source that reflects the link between the source and the destination, modifies the graphical representation of the corresponding code of the source to reflect the removal of the link to the destination, and modifies the graphical representation of the corresponding code of the other element to reflect the new link; and a processor for running the program.

80. The data processing system of claim 79, wherein when it is determined that the other element is the class and that the destination is not the other class, the program further determines whether the destination is an interface, and when it is determined that the destination is the interface, the program identifies the new link between the other element and the destination as an implementation link.

81. The data processing system of claim 79, wherein when it is determined that the other element is not the class and that the destination is not the other class, the program further determines whether the other element is an interface and whether the destination is another interface, and when it is determined that the other element is the interface and that the destination is the other interface, the program identifies the new link between the other element and the destination as an inheritance link.

82. The data processing system of claim 79, wherein when it is determined that the other element is a class and that the destination is another class, the program identifies the new link between the other element and the destination as an inheritance link.

83. The data processing system in claim 79, further comprising a language-neutral representation of the source code, wherein the language neutral representation of the source code is used to generate a graphical representation of the source code and a textual representation of the source code.

84. The data processing system in claim 79, wherein the source code is used directly to generate a graphical representation of the source code and a textual representation of the source code.

85. A data processing system for developing a software project comprising:

a secondary storage device further comprising a plurality of elements, each element having corresponding code stored in a source code file that includes names and a graphical representation stored in a graphical view file that includes symbols having display coordinates; a memory device further comprising a program that generates a transient meta model that correlates the symbols associated with the display coordinates, that displays the graphical representation of the code of a first of the plurality of elements and a graphical representation of the code of a second of the plurality of elements by using the symbols and display coordinates correlated by the transient meta model, that receives an indication that the first element is to be included in the second element, that determines whether inclusion of the first element in the second element would violate a predefined rule, that transfers code corresponding to the first element into the second element when it is determined that the inclusion of the first element in the second element would not violate a predefined rule, wherein the code transfer occurs independently of the graphical representation, and that modifies a graphical representation of the code of the second element to reflect the transfer of the first element into the second element; and a processor for running the program.

86. The data processing system of claim 85, wherein the program removes the code corresponding to the first element from a file, places the code corresponding to the first element within the code corresponding to the second element, and deletes the file corresponding to the first element.

87. The data processing system in claim 85, further comprising a language-neutral representation of the source code, wherein the language neutral representation of the source code is used to generate a graphical representation of the source code and a textual representation of the source code.

88. The data processing system in claim 87, wherein modifications to the textual representation of the source code will immediately modify the corresponding graphical representation of the source code and vice versa, thereby allowing simultaneous viewing of the textual and graphical representations of the source code.

89. The data processing system in claim 87, wherein the language neutral representation of the source code is generated from a multiplicity of programming languages.

90. The data processing system in claim 85, wherein the source code is used directly to generate a graphical representation of the source code and a textual representation of the source code.

91. A data processing system for developing a software project comprising:
   a secondary storage device further comprising a plurality of elements having corresponding code stored in a source code file that includes names and graphical representations stored in a graphical view file that includes symbols having display coordinates, wherein a first of the plurality of elements is nested within a second of the plurality of elements; a memory device further comprising a program that generates a transient meta model that correlates the symbols associated with the display coordinates, that displays the graphical representation of the code of a first of the plurality of elements and a graphical representation of the code of a second of the plurality of elements by using the symbols and display coordinates correlated by the transient meta model, that receives an indication that the first element is to be removed from the second element, that determines whether the removal of the first element from the second element would violate a predefined rule, and
      that removes the code corresponding to the first element from the second element when it is determined that the removal of the first element from the second element would not violate a predefined rule, wherein the code removal occurs independently of each graphical representation,
      that modifies the graphical representation of the second element to reflect the removal of the first element from the second element, and
      that places the code corresponding to the first element into a file; and
   a processor for running the program.

92. The data processing system of claim 91, wherein the first element is a class and the second element is not another class, the program further determines whether the second element is a package, and when it is determined that the second element is a package, the program removes the first file corresponding to the first element from a directory associated with the second element.

93. The data processing system of claim 91, wherein the method further comprises the step of placing the code corresponding to the first element into a file.

94. The data processing system of claim 91, further comprising a language-neutral representation of the source code, wherein the language neutral representation of the source code is used to generate a graphical representation of the source code and a textual representation of the source code.

95. The data processing system of claim 94, wherein modifications to the textual representation of the source code will immediately modify the corresponding graphical representation of the source code and vice versa, thereby allowing simultaneous viewing of the textual and graphical representations of the source code.

96. The data processing system in claim 94, wherein the language neutral representation of the source code is generated from a multiplicity of programming languages.

97. The data processing system in claim 91, wherein the source code is used directly to generate a graphical representation of the source code and a textual representation of the source code.

98. A system including a software development project having a plurality of elements, each element having corresponding code stored in a source code file that includes names and a graphical representation stored in a graphical view file that includes symbols having display coordinates, the system comprising:
   a memory device further comprising a program that generates a transient meta model for correlating the names and display coordinates of each symbol of the corresponding source code file in the project;
   a computer monitor for displaying the graphical representation of the corresponding code of each of the plurality of elements by using the names and display coordinates correlated by the transient meta model;
   means for receiving a request to form a link;
   means for receiving an indication of a first of the plurality of elements;
   means for receiving an indication of a second of the plurality of elements; and
   means for generating new code independent of the graphical representation and
   adding the new code to the first element to reflect the link to the second element in response to receiving the request, the indication of the first element, and the indication of the second element; and
   means for modifying the graphical representation of the code associated with the first element to reflect the link to the second element.

99. A data processing system for developing a software project comprising:
   a secondary storage device further comprising a plurality of elements and having a link between two of the plurality of elements, wherein each element has corresponding code stored in a source file that includes names and a graphical representation stored in a graphical view file that includes symbols having display coordinates and the linked elements include a source and a destination;
   a memory device further comprising a program that generates a transient meta model that correlates the symbols that correspond to the display coordinates,
      that displays the graphical representation of the corresponding code of each of the plurality of elements including the source and the destination by using the symbols and display coordinates correlated by the transient meta model,
      that receives a selection of one of the linked elements,
      that receives an identification of another of the plurality of elements that is different than the linked elements, wherein a graphical representation of the corresponding code of the other element is displayed, that determines whether the selected element is the source, that when the element is the source,
- removes a portion of the corresponding code of the source that reflects the link between the source and the destination,
- generates new code independently of the graphical representation and adds the, new code to the code corresponding to the source to reflect the new link between the source and the other element,
- modifies the graphical representation of the corresponding code of the source to reflect the removal of the link to the destination, and
- modifies the graphical representation of the corresponding code of the source to reflect the new link to the other element; and a processor for running the program.

100. The data processing system of claim 99, wherein when it is determined that the source is the class and that the other element is not the other class, the program further determines whether the other element is in an interface, and when it is determined that the other element is the interface, the program identifies the new link between the source and the other element as an implementation link.

101. The data processing system of claim 99, wherein when it is determined that the source is not the class and that the other element is not the other class, the program further determines whether the source is an interface and the other element is another interface, and when it is determined that the source is the interface and the other element is the other interface, the program identifies the new link between the source and the other element as an inheritance link.

102. The data processing system of claim 99, wherein when it is determined that the source is a class and that the other element is another class, the program identifies the new link between the source and the other element as an inheritance link.

103. The data processing system of claim 99, further comprising a language-neutral representation of the source code, wherein the language neutral representation of the source code is used to generate a graphical representation of the source code and a textual representation of the source code.

104. The data processing system in claim 103, wherein modifications to the textual representation of the source code will immediately modify the corresponding graphical representation of the source code and vice versa, thereby allowing simultaneous viewing of the textual and graphical representations of the source code.

105. The data processing system in claim 103, wherein the language neutral representation of the source code is generated from a multiplicity of programming languages.

106. The data processing in claim 99, wherein the source code is used directly to generate a graphical representation of the source code and a textual representation of the source code.

107. A system including a software development project having a plurality of elements and having a link between two of the plurality of elements, wherein each element has corresponding code stored in a source code file that includes names and a graphical representation stored in a graphical view file that includes symbols having display coordinates and the linked elements include a source and a destination, the system comprising:

a memory device further comprising a program that generates a transient meta model for correlating the names and display coordinates of each symbol of the corresponding source code file project;

a computer monitor for displaying, the graphical representation of the corresponding code of each of the plurality of elements including the source and the destination by using the names and display coordinates correlated by the transient meta model;

means for receiving an identification of the link;

means for receiving a selection of one of the linked elements;

means for receiving an identification of another of the plurality of elements that is different than the linked elements, wherein a graphical representation of the corresponding code of the other element is displayed;

means for determining whether the selected element is the destination; and means for:
- modifying the corresponding code of the other element to reflect a new link between the other element and the destination elements, wherein the code modification occurs independently of the graphical representation, and
- modifying the graphical representation of the corresponding code of the other element to reflect the new link between the other element and the destination element when it is determined that the selected element is the destination.

108. A system including a software development project having a plurality of elements and having a link between two of the plurality of elements, wherein each element has corresponding code stored in a source code file that includes names having a graphical representation stored in a graphical view file that includes symbols having display coordinates and the linked elements include a source and a destination, the system comprising:

a memory device further comprising a program that generates a transient meta model for correlating the names and display coordinates of each symbol of the corresponding source code file in the project;

a computer monitor for displaying a computer monitor for, the graphical representation of the corresponding code of each of the plurality of elements including the source and destination by using the names and display coordinates correlated by the transient meta model;

means for receiving an identification of the link;

means for receiving a selection of one of the linked elements;

means for receiving an identification of another of the plurality of elements that is different than the linked elements, wherein a graphical representation of the corresponding code of the other element is displayed;

means for:
- modifying the corresponding code of the source to reflect a new link between the source and the other element wherein the corresponding code modification occurs independently of the graphical representation, and
- modifying the graphical representation of the corresponding code of the source to reflect the new link between the source and the other element, when it is determined that the selected element is the source.

109. A system including a software development project having a plurality of elements, each having a graphical representation the system comprising:

a memory device further comprising a program that generates a transient meta model for correlating the names and display coordinates of each symbol of the corresponding source code file in the project:
a computer monitor for displaying, the graphical representation of the corresponding code of each of the plurality of elements including a first and a second element by using the names and display coordinates correlated by the transient meta model;
means for receiving an identification of a first of a plurality of elements;
means for receiving an identification of a second of the plurality of elements;
means for receiving an indication that the first element is to be included in the second element;
means for transferring code corresponding to the first into the second element,
wherein the code transfer occurs independently of the graphical representation; and
means for modifying the graphical representation of the code of the second element to reflect the transfer of the code corresponding to the first element into the second element.

110. A system including a software development project having a plurality of elements, each element having corresponding code and a graphical representation, wherein code corresponding to a first of the plurality of elements is nested in code corresponding to a second of the plurality of elements, the system comprising:
a memory device further comprising a program that generates a transient meta model for correlating the names and display coordinates of each symbol of the corresponding source code file in the project;
a computer monitor for displaying, the graphical representation of the corresponding code of each of the plurality of elements including the first element and the second element by using the names and display coordinates correlated by the transient meta model;
means for receiving an indication that the first element is removed from the second element;
means for removing the code corresponding to the first element from the second element, wherein said code removal occurs independently of the graphical representation; and
means for modifying a graphical representation of the code corresponding to the second element to reflect the removal of the first element from the second element.

* * * * *